(12) United States Patent
Kramme et al.

(10) Patent No.: US 11,978,064 B2
(45) Date of Patent: *May 7, 2024

(54) IDENTIFYING FALSE POSITIVE GEOLOCATION-BASED FRAUD ALERTS

(71) Applicant: State Farm Mutual Automobile Insurance Company, Bloomington, IL (US)

(72) Inventors: Timothy Kramme, Parker, TX (US); Elizabeth A. Flowers, Bloomington, IL (US); Reena Batra, Alpharetta, GA (US); Miriam Valero, Bloomington, IL (US); Puneit Dua, Bloomington, IL (US); Shanna L. Phillips, Bloomington, IL (US); Russell Ruestman, Minonk, IL (US); Bradley A. Craig, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/745,541

(22) Filed: May 16, 2022

(65) Prior Publication Data

US 2022/0351216 A1 Nov. 3, 2022

Related U.S. Application Data

(63) Continuation of application No. 15/466,014, filed on Mar. 22, 2017, now Pat. No. 11,334,894.
(Continued)

(51) Int. Cl.
*G06Q 30/018* (2023.01)
*G06N 5/046* (2023.01)
(Continued)

(52) U.S. Cl.
CPC ........ *G06Q 30/0185* (2013.01); *G06N 5/046* (2013.01); *G06N 20/00* (2019.01);
(Continued)

(58) Field of Classification Search
None
See application file for complete search history.

(56) References Cited

U.S. PATENT DOCUMENTS

| 5,467,341 A | 11/1995 | Matsukane et al. |
| 5,708,422 A | 1/1998 | Blonder et al. |

(Continued)

FOREIGN PATENT DOCUMENTS

| CA | 2741408 A1 | 4/2010 |
| EP | 3203436 | 5/2022 |

(Continued)

OTHER PUBLICATIONS

"Laxmi Arun, Mahima M.S., Rashmi R., Roshini Prasad G., Sachin Jain S., Implementation of Location Based Authentication for a Remote Client, May 2014" (Year: 2014).*

(Continued)

*Primary Examiner* — Kito R Robinson
*Assistant Examiner* — Toan Duc Bui
(74) *Attorney, Agent, or Firm* — Lee & Hayes P.C.

(57) ABSTRACT

In a computer-implemented method of using customer data to determine that geolocation-based fraud alerts are false positives, it may be determined that an electronic fraud alert is a geolocation-based alert generated based upon an unexpected or abnormal transaction location. In response, customer data may be obtained from two or more sources via radio frequency links. It may then be determined that the customer data from the sources indicates that a customer is traveling. In response, it may be determined that a customer location indicated by the customer data corresponds to the (Continued)

transaction location. In response to determining that the customer location corresponds to the transaction location, the electronic fraud alert may be marked as a false positive, and the electronic fraud alert may be prevented from being transmitted to a mobile device of the customer, in order to reduce an amount of false positives that are transmitted to customers.

19 Claims, 21 Drawing Sheets

Related U.S. Application Data

(60) Provisional application No. 62/365,699, filed on Jul. 22, 2016, provisional application No. 62/331,530, filed on May 4, 2016, provisional application No. 62/318,423, filed on Apr. 5, 2016, provisional application No. 62/313,196, filed on Mar. 25, 2016.

(51) Int. Cl.
*G06N 20/00* (2019.01)
*G06Q 20/10* (2012.01)
*G06Q 20/20* (2012.01)
*G06Q 20/24* (2012.01)
*G06Q 20/32* (2012.01)
*G06Q 20/34* (2012.01)
*G06Q 20/40* (2012.01)
*G06Q 30/0207* (2023.01)
*G06Q 30/0241* (2023.01)

(52) U.S. Cl.
CPC ........... *G06Q 20/102* (2013.01); *G06Q 20/20* (2013.01); *G06Q 20/24* (2013.01); *G06Q 20/3224* (2013.01); *G06Q 20/34* (2013.01); *G06Q 20/401* (2013.01); *G06Q 20/4016* (2013.01); *G06Q 20/407* (2013.01); *G06Q 20/409* (2013.01); *G06Q 30/0225* (2013.01); *G06Q 30/0248* (2013.01)

(56) References Cited

U.S. PATENT DOCUMENTS

| | | | |
|---|---|---|---|
| 5,748,780 A | 5/1998 | Stolfo | |
| 5,774,882 A | 6/1998 | Keen et al. | |
| 5,819,226 A | 10/1998 | Gopinathan et al. | |
| 5,825,863 A | 10/1998 | Walker | |
| 5,862,183 A | 1/1999 | Lazaridis et al. | |
| 6,018,723 A | 1/2000 | Siegel et al. | |
| 6,094,643 A | 7/2000 | Anderson et al. | |
| 6,119,103 A | 9/2000 | Basch et al. | |
| 6,170,744 B1 | 1/2001 | Lee et al. | |
| 6,215,358 B1 | 4/2001 | Hon et al. | |
| 6,269,169 B1 | 7/2001 | Funk et al. | |
| 6,301,579 B1 | 10/2001 | Becker | |
| 6,330,546 B1 | 12/2001 | Gopinathan et al. | |
| 6,437,812 B1 | 8/2002 | Giles et al. | |
| 6,666,841 B2 | 12/2003 | Gharib et al. | |
| 6,839,682 B1 | 1/2005 | Blume et al. | |
| 6,948,656 B2 | 9/2005 | Williams | |
| 7,251,624 B1 | 7/2007 | Lee et al. | |
| 7,377,425 B1 | 5/2008 | Ma et al. | |
| 7,428,984 B1 | 9/2008 | Crews et al. | |
| 7,480,631 B1 | 1/2009 | Merced et al. | |
| 7,494,052 B1 | 2/2009 | Carpenter et al. | |
| 7,548,886 B2 | 6/2009 | Kirkland et al. | |
| 7,552,865 B2 | 6/2009 | Varadarajan et al. | |
| 7,668,769 B2 | 2/2010 | Baker et al. | |
| 7,707,108 B2 | 4/2010 | Brown et al. | |
| 7,735,721 B1 | 6/2010 | Ma et al. | |
| 7,788,195 B1 | 8/2010 | Subramanian et al. | |
| 7,849,029 B2 | 12/2010 | Crooks et al. | |
| 7,857,212 B1 | 12/2010 | Matthews | |
| 7,865,427 B2 | 1/2011 | Wright et al. | |
| 7,870,078 B2 | 1/2011 | Clark et al. | |
| 7,962,418 B1 | 6/2011 | Wei et al. | |
| 8,073,691 B2 | 12/2011 | Rajakumar | |
| 8,078,515 B2 | 12/2011 | John | |
| 8,140,418 B1 | 3/2012 | Casey et al. | |
| 8,145,561 B1 | 3/2012 | Zhu | |
| 8,162,125 B1 | 4/2012 | Csulits et al. | |
| 8,306,889 B2 | 11/2012 | Leibon et al. | |
| 8,352,315 B2 | 1/2013 | Faith et al. | |
| 8,380,629 B2 | 2/2013 | Carlson et al. | |
| 8,413,234 B1 | 4/2013 | Zang et al. | |
| 8,458,069 B2 | 6/2013 | Adjaoute | |
| 8,478,688 B1 | 7/2013 | Villa et al. | |
| 8,478,692 B2 | 7/2013 | Carlson et al. | |
| 8,484,132 B1 | 7/2013 | Christiansen et al. | |
| 8,600,789 B1 | 12/2013 | Frew et al. | |
| 8,650,080 B2 | 2/2014 | O'Connell et al. | |
| 8,712,912 B2 | 4/2014 | Carlson et al. | |
| 8,745,698 B1 | 6/2014 | Ashfield et al. | |
| 8,748,688 B1 | 6/2014 | Miller et al. | |
| 8,748,692 B2 | 6/2014 | Suzuki | |
| 8,751,398 B2 | 6/2014 | Dispensa et al. | |
| 8,773,564 B2 | 7/2014 | Parks | |
| 8,805,737 B1 | 8/2014 | Chen et al. | |
| 8,983,868 B1 | 3/2015 | Sehrer | |
| 9,148,869 B2 | 9/2015 | Van Heerden et al. | |
| 9,213,990 B2 | 12/2015 | Adjaoute | |
| 9,286,618 B2 | 3/2016 | Lo Faro et al. | |
| 9,330,416 B1 | 5/2016 | Zaslavsky et al. | |
| 9,367,843 B2 | 6/2016 | Jurss | |
| 9,392,008 B1 | 7/2016 | Michel et al. | |
| 9,472,194 B2 | 10/2016 | Jones | |
| 9,483,765 B2 | 11/2016 | Sahadevan et al. | |
| 9,485,265 B1 | 11/2016 | Saperstein et al. | |
| 9,519,903 B2 | 12/2016 | Karnan et al. | |
| 9,569,767 B1 | 2/2017 | Lewis et al. | |
| 9,607,318 B1 | 3/2017 | Gerchikov et al. | |
| 9,633,322 B1 | 4/2017 | Burger | |
| 9,691,066 B2 | 6/2017 | McGuinness et al. | |
| 9,721,253 B2 | 8/2017 | Gideoni et al. | |
| 9,779,403 B2 | 10/2017 | Ranganath et al. | |
| 9,786,015 B1 | 10/2017 | Roumeliotis | |
| 9,818,105 B2 | 11/2017 | Jung et al. | |
| 9,858,575 B2 | 1/2018 | Meredith et al. | |
| 9,883,040 B2 | 1/2018 | Strong et al. | |
| 9,916,606 B2 | 3/2018 | Stroh | |
| 9,934,498 B2 | 4/2018 | Jung et al. | |
| 9,947,055 B1 | 4/2018 | Roumeliotis | |
| 9,953,326 B2 | 4/2018 | Plymouth et al. | |
| 10,013,646 B2 | 7/2018 | Ching | |
| 10,037,532 B2 | 7/2018 | Birukov et al. | |
| 10,043,071 B1 | 8/2018 | Wu | |
| 10,169,761 B1 | 1/2019 | Burger | |
| 10,373,140 B1 | 8/2019 | Chang et al. | |
| 10,373,160 B2 | 8/2019 | Ranganathan | |
| 10,452,908 B1 | 10/2019 | Ramanathan et al. | |
| 10,565,585 B2 | 2/2020 | Sharan et al. | |
| 10,733,435 B1 | 8/2020 | Ketharaju et al. | |
| 10,949,852 B1 | 3/2021 | Kramme et al. | |
| 11,170,375 B1 | 11/2021 | Kramme et al. | |
| 11,334,894 B1 | 5/2022 | Kramme et al. | |
| 11,631,269 B1 | 4/2023 | Ketharaju et al. | |
| 2002/0099649 A1 | 7/2002 | Lee et al. | |
| 2002/0133721 A1 | 9/2002 | Adjaoute | |
| 2002/0147694 A1 | 10/2002 | Dempsey et al. | |
| 2002/0169717 A1 | 11/2002 | Challener | |
| 2003/0033228 A1 | 2/2003 | Bosworth-Davies et al. | |
| 2003/0144952 A1 | 7/2003 | Brown et al. | |
| 2003/0172036 A1 | 9/2003 | Feigenbaum | |
| 2003/0182194 A1* | 9/2003 | Choey | G06Q 20/326 705/16 |
| 2004/0085195 A1* | 5/2004 | McKibbon | B60R 25/33 340/426.36 |
| 2004/0254868 A1 | 12/2004 | Kirkland et al. | |
| 2005/0097046 A1 | 5/2005 | Singfield | |
| 2005/0097051 A1 | 5/2005 | Madili, Jr. et al. | |

(56) References Cited

U.S. PATENT DOCUMENTS

| | | |
|---|---|---|
| 2005/0137982 A1 | 6/2005 | Michelassi et al. |
| 2005/0154676 A1 | 7/2005 | Ronning et al. |
| 2005/0182712 A1 | 8/2005 | Angell |
| 2005/0188349 A1 | 8/2005 | Bent et al. |
| 2006/0041464 A1 | 2/2006 | Powers et al. |
| 2006/0041506 A1 | 2/2006 | Mason et al. |
| 2006/0041508 A1 | 2/2006 | Pham et al. |
| 2006/0065717 A1 | 3/2006 | Hurwitz et al. |
| 2006/0202012 A1 | 9/2006 | Grano et al. |
| 2006/0282660 A1 | 12/2006 | Varghese et al. |
| 2007/0094137 A1 | 4/2007 | Phillips et al. |
| 2007/0100773 A1 | 5/2007 | Wallach |
| 2007/0106582 A1 | 5/2007 | Baker et al. |
| 2007/0179849 A1 | 8/2007 | Jain |
| 2007/0187491 A1 | 8/2007 | Godwin et al. |
| 2007/0192240 A1 | 8/2007 | Crooks |
| 2007/0226095 A1 | 9/2007 | Petriuc |
| 2007/0244782 A1 | 10/2007 | Chimento |
| 2007/0275399 A1 | 11/2007 | Lathrop et al. |
| 2007/0288641 A1 | 12/2007 | Lee et al. |
| 2008/0005037 A1 | 1/2008 | Hammad et al. |
| 2008/0059351 A1 | 3/2008 | Richey et al. |
| 2008/0106726 A1 | 5/2008 | Park |
| 2008/0140576 A1 | 6/2008 | Lewis |
| 2008/0288299 A1 | 11/2008 | Schultz |
| 2008/0290154 A1 | 11/2008 | Barnhardt et al. |
| 2009/0018934 A1 | 1/2009 | Peng et al. |
| 2009/0018940 A1 | 1/2009 | Wang et al. |
| 2009/0044279 A1 | 2/2009 | Crawford et al. |
| 2009/0083080 A1 | 3/2009 | Brooks |
| 2009/0099884 A1 | 4/2009 | Hoefelmeyer et al. |
| 2009/0106134 A1 | 4/2009 | Royyuru |
| 2009/0192855 A1 | 7/2009 | Subramanian et al. |
| 2009/0204254 A1 | 8/2009 | Weber |
| 2009/0323972 A1 | 12/2009 | Kohno et al. |
| 2010/0023455 A1 | 1/2010 | Dispensa et al. |
| 2010/0023467 A1 | 1/2010 | Iwakura et al. |
| 2010/0094767 A1 | 4/2010 | Miltonberger |
| 2010/0114774 A1 | 5/2010 | Linaman et al. |
| 2010/0114776 A1 | 5/2010 | Weller et al. |
| 2010/0274691 A1 | 10/2010 | Hammad et al. |
| 2010/0293090 A1 | 11/2010 | Domenikos et al. |
| 2010/0305993 A1 | 12/2010 | Fisher |
| 2010/0320266 A1 | 12/2010 | White |
| 2011/0055074 A1 | 3/2011 | Chen et al. |
| 2011/0066493 A1 | 3/2011 | Faith et al. |
| 2011/0184845 A1 | 7/2011 | Bishop |
| 2011/0196791 A1 | 8/2011 | Dominguez |
| 2011/0208601 A1 | 8/2011 | Ferguson et al. |
| 2011/0211746 A1 | 9/2011 | Tran |
| 2011/0225064 A1 | 9/2011 | Fou |
| 2011/0238510 A1 | 9/2011 | Rowen et al. |
| 2011/0238566 A1 | 9/2011 | Santos |
| 2011/0238575 A1 | 9/2011 | Nightengale et al. |
| 2011/0258118 A1 | 10/2011 | Ciurea |
| 2011/0264612 A1 | 10/2011 | Ryman-Tubb |
| 2012/0036037 A1 | 2/2012 | Xiao et al. |
| 2012/0047072 A1 | 2/2012 | Larkin |
| 2012/0054834 A1 | 3/2012 | King |
| 2012/0070062 A1 | 3/2012 | Houle et al. |
| 2012/0109821 A1 | 5/2012 | Barbour et al. |
| 2012/0158566 A1 | 6/2012 | Fok et al. |
| 2012/0173570 A1 | 7/2012 | Golden |
| 2012/0209773 A1* | 8/2012 | Ranganathan ......... G06Q 20/40 705/44 |
| 2012/0214442 A1 | 8/2012 | Crawford et al. |
| 2012/0216260 A1 | 8/2012 | Crawford et al. |
| 2012/0226613 A1 | 9/2012 | Adjaoute |
| 2012/0245967 A1 | 9/2012 | Dispensa et al. |
| 2012/0254243 A1 | 10/2012 | Zeppenfeld et al. |
| 2012/0278249 A1 | 11/2012 | Duggal et al. |
| 2013/0013491 A1 | 1/2013 | Selway et al. |
| 2013/0018781 A1 | 1/2013 | Prada Peyser et al. |
| 2013/0024339 A1 | 1/2013 | Choudhuri et al. |
| 2013/0024358 A1 | 1/2013 | Choudhuri et al. |
| 2013/0024373 A1 | 1/2013 | Choudhuri et al. |
| 2013/0046692 A1 | 2/2013 | Grigg et al. |
| 2013/0085942 A1 | 4/2013 | Shirol |
| 2013/0104251 A1 | 4/2013 | Moore et al. |
| 2013/0197998 A1 | 8/2013 | Buhrmann et al. |
| 2013/0218758 A1 | 8/2013 | Koenigsbrueck et al. |
| 2013/0262311 A1 | 10/2013 | Buhrmann et al. |
| 2013/0290119 A1 | 10/2013 | Howe et al. |
| 2013/0297501 A1 | 11/2013 | Monk et al. |
| 2014/0012701 A1 | 1/2014 | Wall et al. |
| 2014/0012738 A1 | 1/2014 | Woo |
| 2014/0052621 A1 | 2/2014 | Love |
| 2014/0058962 A1 | 2/2014 | Davoodi et al. |
| 2014/0067656 A1 | 3/2014 | Cohen Ganor et al. |
| 2014/0074762 A1 | 3/2014 | Campbell |
| 2014/0101050 A1 | 4/2014 | Clarke et al. |
| 2014/0114840 A1 | 4/2014 | Arnold et al. |
| 2014/0122325 A1 | 5/2014 | Zoldi et al. |
| 2014/0189829 A1 | 7/2014 | Mclachlan et al. |
| 2014/0200929 A1 | 7/2014 | Fitzgerald et al. |
| 2014/0201126 A1 | 7/2014 | Zadeh et al. |
| 2014/0207637 A1 | 7/2014 | Groarke |
| 2014/0207674 A1 | 7/2014 | Schroeder et al. |
| 2014/0244317 A1 | 8/2014 | Roberts et al. |
| 2014/0244503 A1 | 8/2014 | Sadlier |
| 2014/0250011 A1 | 9/2014 | Weber |
| 2014/0266669 A1* | 9/2014 | Fadell ................. G08B 27/003 340/501 |
| 2014/0279312 A1 | 9/2014 | Mason et al. |
| 2014/0279494 A1 | 9/2014 | Wiesman et al. |
| 2014/0279503 A1 | 9/2014 | Bertanzetti et al. |
| 2014/0282856 A1 | 9/2014 | Duke et al. |
| 2014/0310160 A1 | 10/2014 | Kumar et al. |
| 2014/0310176 A1 | 10/2014 | Saunders et al. |
| 2014/0324677 A1 | 10/2014 | Walraven et al. |
| 2014/0337217 A1 | 11/2014 | Howe et al. |
| 2014/0337243 A1 | 11/2014 | Dutt et al. |
| 2014/0358592 A1* | 12/2014 | Wedig ..................... G06Q 40/08 705/4 |
| 2014/0373114 A1 | 12/2014 | Franca-Neto et al. |
| 2015/0012436 A1 | 1/2015 | Poole et al. |
| 2015/0026027 A1 | 1/2015 | Priess et al. |
| 2015/0026047 A1 | 1/2015 | Johnson, Jr. |
| 2015/0032604 A1 | 1/2015 | Kearns et al. |
| 2015/0032621 A1* | 1/2015 | Kar ..................... G06Q 20/4016 705/44 |
| 2015/0039504 A1 | 2/2015 | Ebbert |
| 2015/0039513 A1 | 2/2015 | Adjaoute |
| 2015/0046216 A1 | 2/2015 | Adjaoute |
| 2015/0046220 A1 | 2/2015 | Gerard et al. |
| 2015/0058119 A1 | 2/2015 | Atli et al. |
| 2015/0081349 A1 | 3/2015 | Johndrow et al. |
| 2015/0089615 A1 | 3/2015 | Krawczyk et al. |
| 2015/0106216 A1 | 4/2015 | Kenderov |
| 2015/0106260 A1 | 4/2015 | Andrews et al. |
| 2015/0106268 A1 | 4/2015 | Carroll et al. |
| 2015/0120502 A1 | 4/2015 | Jung et al. |
| 2015/0134512 A1 | 5/2015 | Mueller |
| 2015/0142595 A1 | 5/2015 | Acuna-Rohter |
| 2015/0148061 A1 | 5/2015 | Koukoumidis et al. |
| 2015/0161611 A1 | 6/2015 | Duke et al. |
| 2015/0178715 A1 | 6/2015 | Buhrmann et al. |
| 2015/0178733 A1 | 6/2015 | Kozloski et al. |
| 2015/0186888 A1 | 7/2015 | Katz et al. |
| 2015/0186891 A1 | 7/2015 | Wagner et al. |
| 2015/0193768 A1 | 7/2015 | Douglas et al. |
| 2015/0199699 A1* | 7/2015 | Milton ................. H04W 4/029 705/7.34 |
| 2015/0199738 A1 | 7/2015 | Jung et al. |
| 2015/0213246 A1 | 7/2015 | Turgeman et al. |
| 2015/0227934 A1 | 8/2015 | Chauhan |
| 2015/0227935 A1 | 8/2015 | Adjaoute |
| 2015/0235221 A1 | 8/2015 | Murphy, Jr. et al. |
| 2015/0242856 A1 | 8/2015 | Dhurandhar et al. |
| 2015/0254659 A1 | 9/2015 | Kulkarni et al. |
| 2015/0262184 A1 | 9/2015 | Wang et al. |
| 2015/0269578 A1 | 9/2015 | Subramanian et al. |
| 2015/0276237 A1* | 10/2015 | Daniels ............... F24D 19/1009 237/2 A |

(56) References Cited

U.S. PATENT DOCUMENTS

| | | |
|---|---|---|
| 2015/0286827 A1 | 10/2015 | Fawaz et al. |
| 2015/0363833 A1 | 12/2015 | Basheer et al. |
| 2015/0365388 A1 | 12/2015 | Little et al. |
| 2015/0379430 A1 | 12/2015 | Dirac et al. |
| 2015/0379517 A1 | 12/2015 | Jin et al. |
| 2016/0044048 A1 | 2/2016 | Hamidi et al. |
| 2016/0055568 A1 | 2/2016 | Vidal et al. |
| 2016/0063501 A1 | 3/2016 | Kalyan et al. |
| 2016/0063502 A1 | 3/2016 | Adjaoute |
| 2016/0071017 A1 | 3/2016 | Adjaoute |
| 2016/0071105 A1 | 3/2016 | Groarke et al. |
| 2016/0072800 A1 | 3/2016 | Soon-Shiong et al. |
| 2016/0078014 A1 | 3/2016 | Avasarala et al. |
| 2016/0078443 A1 | 3/2016 | Tomasofsky et al. |
| 2016/0086184 A1 | 3/2016 | Carpenter et al. |
| 2016/0086185 A1 | 3/2016 | Adjaoute |
| 2016/0103982 A1 | 4/2016 | Boss et al. |
| 2016/0104163 A1 | 4/2016 | Aquino et al. |
| 2016/0132851 A1 | 5/2016 | Desai et al. |
| 2016/0132882 A1 | 5/2016 | Choudhuri et al. |
| 2016/0132886 A1 | 5/2016 | Burke et al. |
| 2016/0140561 A1 | 5/2016 | Cowan |
| 2016/0140562 A1 | 5/2016 | Birukov et al. |
| 2016/0148127 A1 | 5/2016 | Harkey et al. |
| 2016/0162895 A1 | 6/2016 | Nuzum et al. |
| 2016/0171498 A1 | 6/2016 | Wang et al. |
| 2016/0171499 A1 | 6/2016 | Meredith et al. |
| 2016/0171570 A1 | 6/2016 | Dogin |
| 2016/0191548 A1 | 6/2016 | Smith et al. |
| 2016/0203490 A1 | 7/2016 | Gupta et al. |
| 2016/0210631 A1 | 7/2016 | Ramasubramanian et al. |
| 2016/0210857 A1* | 7/2016 | Gao ................. G08G 1/093 |
| 2016/0232465 A1 | 8/2016 | Kurtz et al. |
| 2016/0247143 A1 | 8/2016 | Ghosh |
| 2016/0253731 A1 | 9/2016 | Ketchel, III et al. |
| 2016/0283945 A1 | 9/2016 | Gonzalez |
| 2016/0292666 A1 | 10/2016 | Chauhan |
| 2016/0300214 A1 | 10/2016 | Chaffin et al. |
| 2016/0342963 A1 | 11/2016 | Zoldi et al. |
| 2017/0011382 A1 | 1/2017 | Zoldi et al. |
| 2017/0070484 A1 | 3/2017 | Kruse et al. |
| 2017/0103398 A1 | 4/2017 | Napsky et al. |
| 2017/0178134 A1 | 6/2017 | Senci et al. |
| 2017/0193727 A1 | 7/2017 | Van Horn et al. |
| 2017/0201498 A1 | 7/2017 | Baig et al. |
| 2017/0221062 A1 | 8/2017 | Katz et al. |
| 2017/0236125 A1 | 8/2017 | Guise et al. |
| 2017/0243220 A1 | 8/2017 | Phillips et al. |
| 2017/0261852 A1 | 9/2017 | Kato et al. |
| 2017/0270526 A1 | 9/2017 | Fitzgerald |
| 2017/0286962 A1 | 10/2017 | Lai et al. |
| 2017/0323345 A1 | 11/2017 | Flowers et al. |
| 2018/0053114 A1 | 2/2018 | Adjaoute |
| 2018/0060839 A1 | 3/2018 | Murali |
| 2018/0158062 A1 | 6/2018 | Kohli |
| 2018/0182029 A1 | 6/2018 | Vinay |
| 2018/0232605 A1 | 8/2018 | Chen et al. |
| 2019/0188212 A1 | 6/2019 | Miller et al. |
| 2021/0065186 A1 | 3/2021 | Kramme et al. |
| 2021/0158355 A1 | 5/2021 | Kramme et al. |
| 2021/0264429 A1 | 8/2021 | Kramme et al. |
| 2021/0264458 A1 | 8/2021 | Kramme et al. |
| 2021/0374753 A1 | 12/2021 | Kramme et al. |
| 2021/0374764 A1 | 12/2021 | Kramme et al. |
| 2022/0122071 A1 | 4/2022 | Kramme et al. |
| 2022/0366433 A1 | 11/2022 | Kramme |
| 2023/0088436 A1 | 3/2023 | Kramme |
| 2023/0316284 A1 | 10/2023 | Kramme |
| 2023/0316285 A1 | 10/2023 | Kramme |
| 2023/0316286 A1 | 10/2023 | Kramme |

FOREIGN PATENT DOCUMENTS

| | | |
|---|---|---|
| WO | WO2006021088 A1 | 3/2006 |
| WO | WO2008027998 | 3/2008 |
| WO | WO2009048843 A1 | 4/2009 |

OTHER PUBLICATIONS

Office Action for U.S. Appl. No. 17/078,744, dated Oct. 5, 2022, Kramme, "Reducing False Positives Using Customer Data and Machine Learning", 25 pages.

Office Action for U.S. Appl. No. 17/080,476, dated Oct. 20, 2022, Kramme, "Reducing False Positives Using Customer Feedback and Machine Learning", 23 Pages.

Office Action for U.S. Appl. No. 17/166,854, dated Oct. 6, 2022, Kramme, "Document-Based Fraud Detection", 10 pages.

Office Action for U.S. Appl. No. 17/541,748, dated Nov. 10, 2022, "Identifying Application-Related Fraud", 9 pages.

Office Action for U.S. Appl. No. 16/988,157, dated Jan. 19, 2023, Kramme, "Preempting or Resolving Fraud Disputes Relating to Billing Aliases", 27 Pages.

Office Action for U.S. Appl. No. 17/541,748, dated Mar. 23, 2023, Kramme, "Identifying Application-Related Fraud", 11 Pages.

Office Action for U.S. Appl. No. 17/080,476, dated May 20, 2022, Kramme, "Reducing False Positives Using Customer Feedback and Machine Learning", 22 pages.

Office Action for U.S. Appl. No. 15/465,838, dated Jul. 15, 2022, Kramme, "Detecting Financial Fraud Using Spending Pattern Data for Individual Cardholders", 23 pages.

Gallagher, Location Based Authorization, Master Project Plan B 2002, 28 Pages.

Final Office Action dated Feb. 20, 2021 for U.S. Appl. No. 15/465,842 "Automated Fraud Classification Using Machine Learning" Kramme, 23 pages.

Office Action for U.S. Appl. No. 16/988,157, dated Aug. 1, 2022, Kramme, "Preempting or Resolving Fraud Disputes Relating to Billing Aliases", 32 pages.

Office Action for U.S. Appl. No. 17/134,901, dated Aug. 10, 2022, Kramme, "Reducing False Positive Fraud Alerts for Online Financial Transactions", 16 pages.

Office Action for U.S. Appl. No. 17/166,854, dated Apr. 13, 2023, Kramme, "Document-Based Fraud Detection", 11 pages.

Office Action for U.S. Appl. No. 15/466,002, dated Jun. 6, 2019, Kramme, "Reducing False Positive Fraud Alerts for Card-Present Financial Transactions", 25 pages.

Office Action for U.S. Appl. No. 15/465,838, dated Jul. 1, 2019, Kramme, "Detecting Financial Fraud Using Spending Pattern Data for Individual Cardholders", 39 pages.

Office Action for U.S. Appl. No. 15/466,014, dated Jul. 12, 2019, Kramme, "Identifying False Positive Geolocation-Based Fraud Alerts", 25 pages.

Non Final Office Action dated Jul. 14, 2020 for U.S. Appl. No. 15/465,838 "Detecting Financial Fraud Using Spending Pattern Data for Individual Cardholders" Kramme, 56 pages.

Non Final Office Action dated Jul. 21, 2020 for U.S. Appl. No. 15/465,981 "Identifying Fraudulent Instruments and Identification" Kramme, 33 pages.

Office Action for U.S. Appl. No. 15/465,880, dated Aug. 20, 2019, Kramme, "Preempting or Resolving Fraud Disputes Relating To Introductory Offer Expirations", 27 pages.

Office Action for U.S. Appl. No. 15/465,863, dated Aug. 30, 2019, Kramme, "Identifying Application-Related Fraud", 21 pages.

Office Action for U.S. Appl. No. 15/465,981, dated Aug. 6, 2019, Kramme, "Identifying Fraudulent Instruments and Identification", 42 pages.

Programmableweb, "MasterCard Merchant Identifier API", retrieved from <<https://web.archive.org/web/20151014154922/http://www.programmableweb.com/api/mastercard-merchant-identifier>>, Oct. 14, 2015, 3 pages.

Rege, "What's Love Got to Do with it? Exploring Online Dating Scams and Identity Fraud", International Journal of Cyber Criminology, vol. 3, Jul.-Dec. 2009, pp. 494-512.

(56) References Cited

OTHER PUBLICATIONS

Rong, et al. "A Machine Learning Approach for Instance Matching Based on Similarity Metrics," Nov. 11, 2012. In: Cudré-Mauroux P. et al. (eds) The Semantic Web—ISWC 2012. Lecture Notes in Computer Science, vol. 7649. Springer, Berlin, Heidelberg, pp. 460-475.
Rong,et al. "A Machine Learning Approach for Instance Matching Based on Similarity Metrics", Cudre'-Maroux, P. et al. (eds) ISWC 2012, Part 1, LNCS, vol. 7649, pp. 460-475, 2012.
Rowan, et al., "Evaluation of Machine Learning Tools for Distinguishing Fraud from Error", Journal of Business & Economics Research—Sep. 2013, vol. 11, No. 9, 2013, pp. 393-400.
sas.com, "Machine Learning What it is & Why it Matters", retrieved from <<https://www.sas.com/en_us/insights/analytics/machine-learning.html>>, Mar. 18, 2016, 11 pages.
Singh,et al., "Fraud Detection by Monitoring Customer Behavior and Activities", International Journal of Computer Applications, vol. 111, No. 11, Feb. 2015, pp. 23-32.
"Tips for Managing Rewards Credit Cards", Apr. 13, 2014, Frequent Flyer Tales blog, retrieved from Internet Archive Wayback Machine: https://web.archive.org/web/20140413142932/https://www.rewardexpert.com/blog/tips-for-managing-rewards-credit-cards/ (Year: 2014).
Wang, et al., "A Brief Review of Machine Learning and its Application". International Conference on Information Engineering and Computer Science, Dec. 2009, 4 pages.
Yair Finzi, "Fraud Losses and False Positives: The Numbers", Secured Touch, retrieved at <<https://blog.securedtouch.com/fraud-losses-and-positives-numbers>>, 2015, 9 pgs.
Yair Finzi, "Why Businesses are Struggling to Fight Mobile Fraud?", Secured Touch, retrieved at <<https://blog.securedtouch.com/why-businesses-are-struggling-to-fight-mobile-fraud>>, 2015, 8 pgs.
Office Action for U.S. Appl. No. 15/465,871, dated Oct. 31, 2019, Kramme, "Preempting or Resolving Fraud Disputes Relating to Billing Aliases", 31 pages.
Office Action for U.S. Appl. No. 15/465,827, dated Oct. 9, 2019, Kramme, "Reducing False Positives Using Customer Data and Machine Learning", 36 pages.
Final Office Action dated Nov. 12, 2020 for U.S. Appl. No. 15/465,981, "Identifying Fraudulent Instruments and Identification", Kramme, 33 pages.
Final Office Action dated Nov. 13, 2020 for U.S. Appl. No. 15/465,871, "Preempting or Resolving Fraud Disputes Relating To Billing Aliases", Kramme, 26 pages.
Non Final Office Action dated Nov. 17, 2020 for U.S. Appl. No. 15/465,821, "Reducing False Positives Based Upon Customer Online Activity", Kramme, 19 pages.
Office Action for U.S. Appl. No. 15/465,868, dated Nov. 19, 2018, Kramme, "Facilitating Fraud Dispute Resolution Using Machine Learning", 29 pages.
Office Action for U.S. Appl. No. 15/465,842, dated Nov. 27, 2019, Kramme, "Automated Fraud Classification Using Machine Learning", 30 pages.
Office Action for U.S. Appl. No. 15/465,880, dated Dec. 12, 19, dated Dec. 12, 19, Kramme, "Preempting or Resolving Fraud Disputes Relating To Introductory Offer Expirations", 39 pages.
Office action for U.S. Appl. No. 15/465,977, dated Dec. 12, 2019, Kramme, "Document-Based Fraud Detection", 10 pages.
Final Office Action dated Dec. 15, 2020 for U.S. Appl. No. 15/466,014, "Identifying False Positive Geolocation-Based Fraud Alerts", Kramme, 25 pages.
Non Final Office Action dated Dec. 18, 2019 for U.S. Appl. No. 15/465,856 "Identifying Potential Chargeback Scenarios Using Machine Learning" Kramme, 22 pages.
Non Final Office Action dated Dec. 18, 2019 for U.S. Appl. No. 15/465,863 "Identifying Application-Related Fraud" Kramme, 17 pages.
Non Final Office Action dated Dec. 19, 2019 for U.S. Appl. No. 15/465,821 "Reducing False Positives Based Upon Customer Online Activity" Kramme, 22 pages.
Non Final Office Action dated Dec. 22, 2020 for U.S. Appl. No. 15/465,856, "Identifying Potential Chargeback Scenarios Using Machine Learning", Kramme, 23 pages.
Non Final Office Action dated Dec. 22, 2020 for U.S. Appl. No. 15/465,880, "Preempting or Resolving Fraud Disputes Relating to Introductory Offer Expirations", Kramme, 58 pages.
Non Final Office Action dated Dec. 22, 2020 for Applicatin U.S. Appl. No. 15/466,002, "Reducing False Positive Fraud Alerts for Card-Present Financial Transactions", Kramme, 53 pages.
Office Action for U.S. Appl. No. 15/466,002, dated Dec. 27, 2018, Kramme, "Reducing False Positive Fraud Alerts for Card-Present Financial Transactions", 35 pages.
Office Action for U.S. Appl. No. 15/466,009, dated Dec. 27, 2018, Kramme, "Reducing False Positive Fraud Alerts for Online Financial Transactions", 33 pages.
Office Action for U.S. Appl. No. 17/078,744, dated Dec. 27, 2021, Kramme, "Reducing False Positives Using Customer Data and Machine Learning", 28 pages.
Final Office Action dated Dec. 30, 2020 for U.S. Appl. No. 15/465,838, "Detecting Financial Fraud Using Spending Pattern Data for Individual Cardholders", Kramme, 60 pages.
Office Action for U.S. Appl. No. 15/465,838, dated Dec. 4, 2019, Kramme, "Detecting Financial Fraud Using Spending Pattern Data for Individual Cardholders", 45 Pages.
Final Office Action dated Feb. 2, 2021 for U.S. Appl. No. 15/465,842 "Automated Fraud Classification Using Machine Learning" Kramme, 23 pages.
Office Action for U.S. Appl. No. 15/465,838, dated Feb. 1, 2022, Kramme, "Detecting Financial Fraud Using Spending Pattern Data for Individual Cardholders", 41 pages.
Office Action for U.S. Appl. No. 17/134,901, dated Feb. 18, 2022, Kramme, "Reducing False Positive Fraud Alerts for Online Financial Transactions", 10 pages.
Office Action for U.S. Appl. No. 15/465,981, dated Feb. 20, 2019, Kramme, "Identifying Fraudulent Instruments and Identification", 41 pages.
Final Office Action dated Feb. 24, 2020 for U.S. Appl. No. 15/466,002 "Reducing False Positive Fraud Alerts for Card-Present Financial Transactions" Kramme, 29 pages.
Office Action for U.S. Appl. No. 15/465,977, dated Feb. 25, 2019, Kramme, "Document-Based Fraud Detection", 8 pages.
Non Final Office Action dated Feb. 3, 2020 for U.S. Appl. No. 15/465,858 "Identifying Chargeback Scenarios Based Upon Non-Compliant Merchant Computer Terminals" Kramme, 48 pages.
Non Final Office Action dated Feb. 5, 2020 for U.S. Appl. No. 15/465,827 "Reducing False Positives Using Customer Data and Machine Learning" Kramme, 34 pages.
Non Final Office Action dated Mar. 12, 2020 for U.S. Appl. No. 15/466,009 "Reducing False Positive Fraud Alerts for Online Financial Transactions" Kramme, 24 pages.
Office Action dated Mar. 16, 2021 for U.S. Appl. No. 15/465,821 "Reducing False Positives Based Upon Customer Online Activity" Kramme, 20 pages.
Office Action for U.S. Appl. No. 15/465,838, dated Mar. 20, 2019, Kramme, "Detecting Financial Fraud Using Spending Pattern Data for Individual Cardholders", 28 pages.
Office Action for U.S. Appl. No. 15/465,838, dated Mar. 23, 2022, Kramme, "Detecting Financial Fraud Using Spending Pattern Data for Individual Cardholders", 46 pages.
Office Action for U.S. Appl. No. 15/465,821, dated Mar. 5, 2019, Kramme, "Reducing False Positives Based Upon Customer Online Activity", 21 pages.
Office Action for U.S. Appl. No. 15/465,880, dated Apr. 15, 2019, Kramme, "Preempting or Resolving Fraud Disputes Relating to Introductory Offer Expirations", 25 pages.
Office Action for U.S. Appl. No. 15/465,868, dated Apr. 18, 2019, Kramme, "Facilitating Fraud Dispute Resolution Using Machine Learning", 29 pages.
Office Action for U.S. Appl. No. 15/465,871, dated Apr. 24, 2019, Kramme, "Preempting or Resolving Fraud Disputes Relating to Billing Aliases", 35 pages.
Final Office Action dated Apr. 28, 2020 for U.S. Appl. No. 15/465,863 "Identifying Application-Related Fraud" Kramme, 14 pages.

(56) References Cited

OTHER PUBLICATIONS

Office Action for U.S. Appl. No. 17/078,744, dated Apr. 29, 2022, Kramme, "Reducing False Positives Using Customer Data and Machine Learning", 25 pages.
Office Action for U.S. Appl. No. 15/465,871, dated Apr. 3, 2020, Kramme, "Preempting or Resolving Fraud Disputes Relating To Billing Aliases", 38 pages.
Office Action for U.S. Appl. No. 15/465,863, dated Apr. 30, 2019, Kramme, "Identifying Application-Related Fraud", 19 pages.
Non Final Office Action dated Apr. 8, 2020 for U.S. Appl. No. 15/466,014 "Identifying False Positive Geolocation-Based Fraud Alerts" Kramme, 26 pages.
Final Office Action dated Apr. 9, 2020 for U.S. Appl. No. 15/465,821 "Reducing False Positives Based Upon Customer Online Activity" Kramme, 23 pages.
Non Final Office Action dated Apr. 9, 2020 for U.S. Appl. No. 15/465,977 "Document-Based Fraud Detection" Kramme, 10 pages.
Office Action for U.S. Appl. No. 15/465,827, dated May 1, 2019, Kramme, "Reducing False Positives Using Customer Data and Machine Learning", 32 pages.
Final Office Action dated May 21, 2020 for U.S. Appl. No. 15/465,856 "Identifying Potential Chargeback Scenarios Using Machine Learning" Kramme, 22 pages.
Final Office Action dated May 28, 2020 for U.S. Appl. No. 15/465,842 "Automated Fraud Classification Using Machine Learning" Kramme, 32 pages.
Office Action for U.S. Appl. No. 15/465,977, dated Jun. 11, 2019, Kramme, "Document-Based Fraud Detection", 10 pages.
Office Action for U.S. Appl. No. 15/466,009, dated Jun. 17, 2019, Kramme, "Reducing False Positive Fraud Alerts for Online Financial Transactions", 25 pages.
Office Action for U.S. Appl. No. 15/465,821, dated Jun. 27, 2019, Kramme, "Reducing False Positives Based Upon Customer Online Activity", 24 pages.
Office Action for U.S. Appl. 16/988,157, dated Aug. 25, 2023, Timothy Kramme, "Preempting or Resolving Fraud Disputes Relating to Billing Aliases", 31 pages.
Office Action for U.S. Appl. No. 17/993,758, dated Sep. 26, 2023, Timothy Kramme, "Reducing False Positives Using Customer Feedback and Machine Learning", 22 pages.
Office Action for U.S. Appl. No. 17/166,854, dated Aug. 1, 2023, Kramme, "Document-Based Fraud Detection", 14 Pages.
Abdelhalim, et al., "The Impact of Google Hacking on Identiy and Application Fraud", 2007 IEEE Pacific Rim Conference on Communications, Computers and Signal Processing, Aug. 2007, pp. 240-244.
Aimeur, et al. "The ultimate invasion of privacy: Identity theft", Ninth Annual International Conference on Privacy, Security, and Trust, Montreal, Quebec, Jul. 21, 2011, pp. 24-31.
Aimeur, et al. "The ultimate invasion of privacy: Identity theft", Ninth Annual International Conference on Privacy, Security, and Trust, Montreal, Quebec, 2011, pp. 24-31.
Angelopoulou, "Analysis of Digital Evidence in Identity Theft Investigations", Order No. U580269, University of South Wales, ( United Kingdom, Ann Arbor, Jul. 2010, 405 pgs.
Anonymous, "Senate Bill aids in cyber fraud prosecution", Toldeo Business Journal, vol. 28.1, Jan. 9, 2012, 2 pgs.
Baesens, et al., "Fraud Analytics: Using Descriptive, Predictive, and Social Networking Techniques: A guide to Date Science for Fraude Detection", retrieved at <<https://www.dataminingapps.com/wp-content/uploads/2015/08/68614_excerpt-1pdf>>, 2015, pp. 24-26.
Bhatla T.P., "Understanding Credit Card Frauds", Cards Business Review #2003-01, Jun. 2003, 17 pages.
Bose, "Intelligent Technologies for Managing Fraud and Identity Theft", Third International Conference on Information Technology: New Generations (ITNG'06), Apr. 2006, pp. 446-451.
Carneiro, "A Data Mining Approach to Fraud Detection in e-tail", Integrated Master in Industrial Engineering and Management, Jan. 2016, 71 pages.
Cheney, "identity Theft: Do Definitions Still Matter?", Federal Reserve Bank of Philadelphia, Payment Card Center Discussion Paper. Aug. 2005, 22 pages.
Cho, et al., "Detection and Response of Identity Theft within a Company Utilizing Location Information," International Conference on Platform Technology and Service (PlatCon), Feb. 2016 , 5 pages.
Cornelius, "Online Identity Theft Victimization: An Assessment of Victims and Non-Victims Level of Cyber Security Knowledge", Order No. 10253894, Colorado Technical University, Ann Arbor, Dec. 2016, 137 pgs.
Council, "How to Extract Reliable Data from Invoices" retrieved on Dec. 5, 2019, at <<https://www.parascript.com/blog/how-to-extract-reliable-date-from-invoices/>>Parascript blog. Mar. 10, 2016, pp. 1-4.
Credit Card Accountability Responsibility and Disclosure Act of 2009, 123 Stat. 1734, Public Law 111-24, 111th Congress, May 22, 2009 (Year: 2009).
Expert System, "What is Machine Learning? A definition", Mar. 7, 2017, retrieved on Jan. 31, 2020: <<https://expertsystem.com/machine-learning-definition/>>.
Fawcett, et al., "Adaptive Fraud Detection", Data Mining, and Knowledge Discovery 1, retrieved at <<http://citeseerx.ist.psu.edu/viewdoc/download?doi=10.1.1.123.1281&rep=rep1&type=pdf>>, 1997, pp. 291-316.
Gold, "Identity Crisis?", Engineering & Technology, vol. 8, No. 10, Nov. 2013, pp. 32-35.
Ji, et al., "Systems Plan for Combating identity Theft—A Theoretical Framework," 2007 International Conference on Wireless Communications, Networking and Mobile Computing, Shanghai, Sep. 2007, pp. 6402-6405.
Joe-Uzuegbu, et al., "Application virtualization techniques for malware forensics in social engineering," 2015 International Conference on Cyberspace (CYBER-Abuja), Abuja, Nov. 4, 2015, pp. 45-56.
Joe-Uzuegbu, et al., "Application virtualization techniques for malware forensics in social engineering," 2015 International Conference on Cyberspace (CYBER-Abuja), Abuja, 2015, pp. 45-56.
Kejriwal, et al.,"Semi-supervised Instance Matching Using Boosted Classifiers", The Semantic Web, Latest Advances and New Domains, ESWC 2015, Lecture Notes in Computer Science, vol. 9088, May 31, 2015, pp. 1-15.
Kejriwal, et al.,"Semi-supervised Instance Matching Using Boosted Classifiers", The Semantic Web, Latest Advances and New Domains, ESWC 2015, Lecture Notes in Computer Science, vol. 9088, 2015, pp. 1-15.
Kossman, "7 merchant tips to understanding EMV fraud liability shift", CreditCards.com, Oct. 1, 2015, retrieved from <<https://www.creditcards.com/credit-card-news/understanding-emv-fraud-liability-shift-1271.php>>.
ProgrammableWeb website, "MasterCard Merchant Identifier API", Oct. 14, 2015, <<https://web.archive.org/web/20151014154922/http://www.programmableweb.com/api/mastercard-merchant-identifier>>, 3 pages.
Van der Merwe, et al., "Phishing in the System of Systems Settings: Mobile Technology", 2005 IEEE International Conference on Systems, Man and Cybernetics, Oct. 2005, vol. 1. pp. 492-498.
Neira, "Identity Theft: Inside The Mind of a Cybercriminal", Order No. 10109629, Utica College, Ann Arbor, May 2016, 60 pgs.
Office Action dated Jan. 7, 2021 for U.S. Appl. No. 15/465,868, Kramme, "Facilitating Fraud Dispute Resolution Using Machine Learning", 16 pages.
Non Final Office Action dated Feb. 20, 2020 for U.S. Appl. No. 15/465,868 "Facilitating Fraud Dispute Resolution Using Machine Learning" Kramme, 39 pages.
Final Office Action dated Mar. 5, 2020 for U.S. Appl. No. 15/465,838, "Detecting Financial Fraud Using Spending Pattern Data for Individual Cardholders", Kramme, 52 pages.
Office Action for U.S. Appl. No. 15/466,002, dated Apr. 8, 2021, Kramme, "Reducing False Positive Fraud Alerts for Card-Present Financial Transactions", 75 pages.

(56) References Cited

OTHER PUBLICATIONS

Office Action for U.S. Appl. No. 15/465,880, dated May 12, 2021, Kramme, "Preempting or Resolving Fraud Disputes Relating to Introductory Offer Expirations", 36 pages.
Final Office Action dated Jun. 2, 2020 for U.S. Appl. No. 15/465,858, "Identifying Chargeback Scenarios Based Upon Non-Compliant Merchant Computer Terminals", Kramme, 13 pages.
Final Office Action dated Jun. 10, 2020 for U.S. Appl. No. 15/465,880, "Preempting or Resolving Fraud Disputes Relating To Introductory Offer Expirations", Kramme, 37 pages.
Office Action for U.S. Appl. No. 15/465,868, dated Jun. 17, 2021, Kramme. "Facilitating Fraud Dispute Resolution Using Machine Learning", 29 pages.
Office Action for U.S. Appl. No. 15/465,856, dated Jul. 6, 2021, Kramme, "Identifying Potential Chargeback Scenarios Using Machine Learning", 25 pages.
Final Office Action dated Jul. 23, 2020 for U.S. Appl. No. 15/465,868, "Facilitating Fraud Dispute Resolution Using Machine Learning", Kramme, 68 pages.
Final Office Action dated Jul. 24, 2020 for U.S. Appl. No. 15/931,560, "Identifying Chargeback Scenarios Based Upon Non-Compliant Merchant Computer Terminals", Kramme, 61 pages.
Office Action for U.S. Appl. No. 16/988,157, dated Aug. 18, 2021, Kramme, "Preempting or Resolving Fraud Disputes Relating to Billing Aliases", 28 pages.
Final Office Action dated Aug. 24, 2020 for U.S. Appl. No. 15/466,009, "Reducing False Positive Fraud Alerts for Online Financial Transactions", Kramme, 27 pages.
Non Final Office Action dated Aug. 26, 2020 for U.S. Appl. No. 15/466,014, "Identifying False Positive Geolocation-Based Fraud Alerts", Kramme, 26 pages.
Non Final Office Action dated Aug. 27, 2020 for U.S. Appl. No. 16/540,505, "Reducing False Positives Using Customer Feedback and Machine Learning", Kramme, 33 pages.
Office Action for U.S. Appl. No. 15/465,838, dated Sep. 16, 2021, Kramme, "Detecting Financial Fraud Using Spending Pattern Data for Individual Cardholders", 45 pages.
Office Action for U.S. Appl. No. 17/080,476, dated Jan. 18, 2022, Kramme, "Reducing False Positives Using Customer Feedback and Machine Learning", 24 pages.
Office Action for U.S. Appl. No. 16/988,157, dated Jan. 24, 2022, Kramme, "Preempting or Resolving Fraud Disputes Relating to Billing Aliases", 31 pages.
Office Action for U.S. Appl. No. 15/466,014, dated Jan. 25, 2019, Kramme, "Identifying False Positive Geolocation-Based Fraud Alerts", 32 pages.
Office Action for U.S. Appl. No. 15/465,981, dated Oct. 6, 2021, Kramme, "Identifying Fraudulent Instruments and Identification", 35 pages.
Office Action for U.S. Appl. No. 15/466,002, dated Oct. 16, 2019, Kramme, "Reducing False Positive Fraud Alerts for Card-Present Financial Transactions", 26 pages.
Non Final Office Action dated Oct. 20, 2020 for U.S. Appl. No. 16/899,486, "Reducing False Positives Using Customer Data and Machine Learning", Kramme, 11 pages.
Office Action dated Oct. 29, 2020 for U.S. Appl. No. 15/465,858 "Identifying Chargeback Scenarios Based Upon Non-Compliant Merchant Computer Terminals" Kramme, 14 pages.
Office Action dated Oct. 29, 20 for U.S. Appl. No. 15/931,560, "Identifying Chargeback Scenarios Based Upon Non-Compliant Merchant Computer Terminals", Kramme, 15 pages.

* cited by examiner

220

222
INTEREST-BASED FACTORS

Cardholder searched online for purchased product/service
+94

Cardholder visited website associated with merchant
+71

Cardholder endorsed (e.g., "liked") merchant or product/service provided by merchant via social media account
+56

Cardholder visited website associated with competitor of merchant
+50

Cardholder searched online for different product/service in same price range as transaction
+5

Cardholder entered search terms indicative of need for product/service provided by merchant ("need score" = $X$)
**+0.2\*$X$**

224
LOCATION-BASED FACTORS

Cardholder checked in to flight near location where transaction was initiated
+80

Cardholder visited website associated with place near or in which transaction was initiated
+63

Cardholder endorsed (e.g., "liked") place, near or in which transaction was initiated, via social media account
+28

Search term included name of
purported applicant
+60

Search term also included word
"address" or "residence"
+24

Search term also included word
"employer" or "job" or "career"
+9

COUNTERFEIT FACTORS — 292

- Dimensions and/or angles outside tolerance +82
- Color matching outside tolerance +74
- Line thickness outside tolerance +55
- Font matching outside tolerance +50

FORGERY FACTORS — 294

- Signature match outside tolerance +99
- Handwriting match outside tolerance +59
- Information format mismatch (e.g., "9.12.16" versus "9/12/2016") +28

*FIG. 4F*

IDENTIFYING FALSE POSITIVE GEOLOCATION-BASED FRAUD ALERTS

CROSS-REFERENCE TO RELATED APPLICATIONS

This application is a continuation of, and claims priority to, U.S. application Ser. No. 15/466,014, filed on Mar. 22, 2017, and entitled, "Identifying False Positive Geolocation-Based Fraud Alerts" which claims the benefit of U.S. Provisional Patent Application No. 62/313,196, filed on Mar. 25, 2016 and entitled "Reducing Financial Fraud Using Machine Learning and Other Techniques," U.S. Provisional Patent Application No. 62/318,423, filed on Apr. 5, 2016 and entitled "Reducing Financial Fraud Using Machine Learning and Other Techniques," U.S. Provisional Patent Application No. 62/331,530, filed on May 4, 2016 and entitled "Reducing Financial Fraud Using Machine Learning and Other Techniques," and U.S. Provisional Patent Application No. 62/365,699, filed on Jul. 22, 2016 and entitled "Detecting and/or Preventing Financial Fraud Using Geolocation Data," the entire disclosures of which are hereby incorporated by reference herein for all purposes.

FIELD OF THE DISCLOSURE

The present disclosure generally relates to financial fraud and, more specifically, to processing techniques for reducing false positive fraud alerts.

BACKGROUND

Financial fraud, in its many forms, is a problem of enormous magnitude and scope, causing billions of dollars in economic losses and impacting many millions of people. Types of financial fraud include use of a lost or stolen card, account takeover, skimming, chargeback ("friendly") fraud, counterfeiting, forgeries and application (e.g., loan application) fraud, to name just a few. The problem only continues to grow as various technological advances, intended to improve convenience and efficiency in the marketplace, provide new opportunities for bad actors. For example, an ever-increasing amount of fraud may be linked to online transactions made via the Internet.

Various software applications have been developed to detect potentially fraudulent transactions. For example, dollar amounts and geographic locations have generally been used to flag particular credit or debit card transactions, with cardholders then being contacted by employees of the card issuer to determine whether the transactions were indeed fraudulent. To ensure that most instances of fraud are captured, however, such techniques generally have a low threshold for triggering a fraud alert. As a result, numerous fraud alerts are false positives. The prevalence of false positives leads to a large cost in terms of the drain on human resources (e.g., calling customers to discuss each suspect transaction, and/or other manual investigation techniques), and considerable distraction or annoyance for cardholders. To provide a solution to these shortcomings in the field of automated fraud detection, innovative processing techniques capable of reducing false positives are needed.

BRIEF SUMMARY

The present embodiments may, inter alia, use new processing techniques to reduce false positive fraud alerts. For example, fraud alerts may be generated, or fraud alerts based upon various other triggers (e.g., presence of a large transaction, presence of a transaction initiated in a different state or country, cardholder reporting of unrecognized or fraudulent charges, etc.) may be either confirmed or ruled out (e.g., identified as a false positive), using location information.

In one embodiment, a computer-implemented method of using customer data to determine that geolocation-based fraud alerts are false positives may include: (1) determining, by one or more processors, that an electronic fraud alert is a geolocation-based fraud alert generated based upon an unexpected or abnormal transaction location; (2) in response to determining that the electronic fraud alert is a geolocation-based fraud alert, obtaining, by the one or more processors and via one or more radio frequency links, customer data from two or more sources; (3) determining, by the one or more processors, that the customer data from the two or more sources indicates that a customer is traveling; (4) in response to determining that the customer data indicates that the customer is traveling, determining, by the one or more processors, that a customer location indicated by the customer data corresponds to the transaction location; and/or (5) in response to determining that the customer location corresponds to the transaction location, (i) marking, by the one or more processors, the electronic fraud alert as a false positive and (ii) causing, by the one or more processors, the electronic fraud alert to not be transmitted to a mobile device of the customer in order to reduce an amount of false positives that are transmitted to customers. The method may include additional, less, or alternate actions, including those discussed elsewhere herein.

In another embodiment, a computer system is configured to use customer data to determine that geolocation-based fraud alerts are false positives. The computer system includes one or more processors and a memory storing instructions. The instructions, when executed by the one or more processors, cause the computer system to: (1) determine that an electronic fraud alert is a geolocation-based fraud alert generated based upon an unexpected or abnormal transaction location; (2) in response to determining that the electronic fraud alert is a geolocation-based fraud alert, obtain, via one or more radio frequency links, customer data from two or more sources; (3) determine that the customer data from the two or more sources indicates that a customer is traveling; (4) in response to determining that the customer data indicates that the customer is traveling, determine that a customer location indicated by the customer data corresponds to the transaction location; and/or (5) in response to determining that the customer location corresponds to the transaction location, (i) mark the electronic fraud alert as a false positive and (ii) cause the electronic fraud alert to not be transmitted to a mobile device of the customer in order to reduce an amount of false positives that are transmitted to customers. The computer system may include additional, less, or alternate functionality, including that discussed elsewhere herein.

In another embodiment, a non-transitory, computer-readable medium storing instructions that, when executed by one or more processors, cause the one or more processors to: (1) determine that an electronic fraud alert is a geolocation-based fraud alert generated based upon an unexpected or abnormal transaction location; (2) in response to determining that the electronic fraud alert is a geolocation-based fraud alert, obtain, via one or more radio frequency links, customer data from two or more sources; (3) determine that the customer data from the two or more sources indicates that a customer is traveling; (4) in response to determining that the customer data indicates that the customer is traveling, determine that a customer location indicated by the customer data corresponds to the transaction location; and/or (5) in response to determining that the customer location corresponds to the transaction location, (i) mark the electronic fraud alert as a false positive and (ii) cause the electronic fraud alert to not be transmitted to a mobile device of the customer in order to reduce an amount of false positives that are transmitted to customers.

BRIEF DESCRIPTION OF THE DRAWINGS

The Figures described below depict various aspects of the systems and methods disclosed herein. It should be understood that each Figure depicts an embodiment of a particular aspect of the disclosed systems and methods, and that each of the Figures is intended to accord with a possible embodiment thereof.

FIGS. 4A-4F depict exemplary factors and algorithms that may be used in connection with various fraud detection, verification and/or classification rule sets, according to different embodiments.

DETAILED DESCRIPTION

I. Exemplary Fraud Detection and/or Classification

Figure 1:
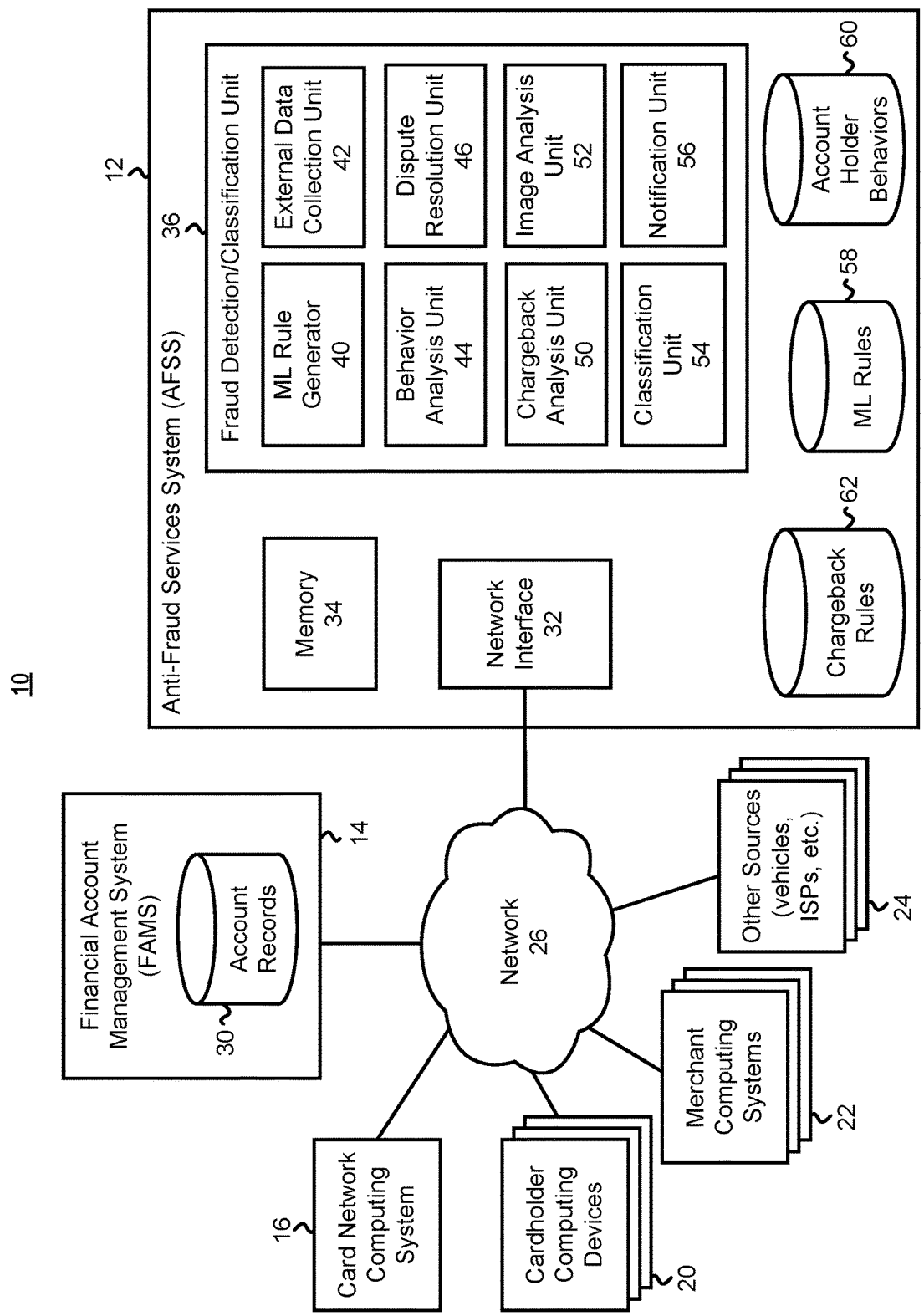
FIG. 1 depicts an exemplary environment in which techniques for fraud detection, verification and/or classification may be implemented, according to one embodiment.

The embodiments described herein relate to, inter alia, wholly or partially automated detection, verification and/or classification of financial fraud. For ease of explanation, and unless otherwise clearly indicated by the context of usage, "detecting" or "determining" fraud may be used herein to refer to initially flagging fraudulent (or potentially fraudulent) activity, to verifying/confirming that suspect/flagged activity was indeed fraudulent, or generally to both. The systems and techniques described herein may be used, for example, to identify, prevent and/or quantify/measure instances of lost or stolen card use, account takeover, counterfeiting, skimming, chargeback ("friendly") fraud, collusive merchant fraud, application (e.g., loan application) fraud, mortgage fraud, and/or one or more other types of fraud relating to existing and/or potential financial transactions and/or accounts. Moreover, those skilled in the art will appreciate that at least some of the technical advancements described below (and/or shown in the accompanying figures) are not necessarily restricted to the financial field.

In some embodiments, a fraud detection and/or classification system may analyze data relating to a number of existing or potential financial accounts. The analysis/processing may be performed in batch processing operations, or substantially in real-time (e.g., as the data is generated and/or as financial transactions occur, etc.), and the data may be obtained from a variety of sources based upon the particular embodiment and/or scenario. In one embodiment, for example, data from financial account records may be analyzed, along with data indicating online activity of an account holder, location data (e.g., global positioning satellite (GPS) data from a smartphone or vehicle of the account holder) and/or other data, to determine whether a particular financial transaction was fraudulent or likely fraudulent. The analysis may be performed automatically after the transaction has been made, or may be performed in response to a person or algorithm flagging the transaction as a potentially fraudulent one, for example.

The analysis may include determining whether the account holder has expressed interest in the object (e.g., product or service) of the transaction or the merchant, and/or determining whether the transaction is consistent with spending patterns associated with the account holder (e.g., spending patterns identified using the account holder's transaction records), for example. In the case of multiple account holders (e.g. multiple credit or debit card holders), accuracy may be improved by identifying spending patterns at the individual level rather than, or in addition to, at the aggregate account level. For example, a maximum amount of money typically spent in a single transaction (e.g., over the course of a one-month window, etc.) may be determined for each of two cardholders listed on a single account, and the maximum amount for the cardholder who purportedly made a particular purchase may be compared to the purchase amount to determine whether fraud is suspected.

In another exemplary embodiment, the locations of authorized cardholders may be analyzed, in conjunction with the locations at which cards were presented to a merchant or merchant device (if a card-present transaction) or the locations of computing devices via which card information was entered (if an online transaction), to determine whether a fraud alert is likely a false positive. Alternatively, such locations may be analyzed to determine whether to block a transaction that is currently in-process (e.g., by issuing a fraud alert to the merchant or card issuer, or by not clearing the transaction, etc.).

By replacing conventional processing techniques with one or more of the processing techniques described herein, problems that have beset the field of fraud detection, classification and/or prevention in the past may be greatly mitigated or eliminated. For example, information that has conventionally been overlooked or ignored may be used to more accurately detect, prevent and/or classify fraud, and/or to reduce false positive fraud alerts. As another example, a significant amount of time may be saved by removing the need for manual investigations, or by reducing the number of instances where manual investigations are required.

II. Exemplary Environment for Implementing Fraud Detection and/or Classification Processing Techniques FIG. 1 depicts an exemplary environment 10 in which techniques for fraud detection and/or classification may be implemented, according to one embodiment. The environment 10 may include an anti-fraud services system (AFSS) 12, a financial account management system (FAMS) 14, a card network computing system 16, a number of cardholder computing devices 20, a number of merchant computing systems 22, a number of other sources 24, and a network 26. It is noted that, in other embodiments and/or scenarios, the environment 10 may include more, fewer and/or different components than those shown in FIG. 1, such as any of those discussed elsewhere herein. For example, the environment 10 may include one or more additional financial account management systems and/or card network computing systems, and/or one or more of the cardholder computing devices 20 may instead be a computing device of a holder of a non-card account (e.g., a checking, savings or loan account) or an applicant for a new account (e.g., a new loan account). As another example, the environment 10 may include a computing system of one or more acquiring/merchant banks, and some or all of the communications with merchant computing systems 22 described below may instead be with the acquiring bank(s).

FAMS 14 may be associated with (e.g., owned and/or maintained by) a bank or other financial entity. For example, FAMS 14 may be a bank that acts as a card issuer associated with a particular type of card network (e.g., VISA®, Mastercard®, etc.), and/or an entity that provides loans (e.g., mortgage, home equity, vehicle, etc.), saving/checking account services, and/or other financial services to customers. FAMS 14 may maintain an account records database 30 that stores various kinds of account information, including account holder information (e.g., names, addresses, etc.) and data indicative of financial transactions made in connection with each account (e.g., dates, amounts and merchants for credit or debit card transactions, dates and amounts for customer deposits and withdrawals, etc.). Account records database 30 may store account information for some or all of the cardholders associated with cardholder computing devices 20, for example. While shown in FIG. 1 as a single entity within FAMS 14, it is understood that account records database 30 may, in some embodiments, be distributed across multiple databases and/or multiple physical/hardware memories, and/or may be wholly or partially external to (e.g., remote from) FAMS 14.

AFSS 12 may generally provide services that help to detect and/or classify fraudulent activity in connection with existing and/or potential (e.g., applied for) financial accounts, such as the accounts managed by FAMS 14. In some embodiments, AFSS 12 is included within FAMS 14. As seen in FIG. 1, AFSS 12 may include a network interface 32, a memory 34, and a fraud detection/classification unit 36.

Network interface 32 may include hardware, firmware and/or software configured to enable AFSS 12 to wirelessly exchange electronic data with one or more other components of environment 10 via network 26. For example, network interface 32 may include an Ethernet port, a modem, a router, and/or one or more other ports and/or transceivers for one or more other wired and/or wireless communication technologies.

Memory 34 may be a computer-readable, non-transitory storage unit or device, or collection of units/devices, and may include persistent (e.g., hard disk) and/or non-persistent memory components. Memory 34 may store instructions that are executable on one or more processors of AFSS 12 (not shown in FIG. 1) to perform various operations, including the instructions of various software applications and data generated and/or used by such applications.

Card network computing system 16 may be a computing system (e.g., one or more servers) of a credit and/or debit card network entity, such as VISA® or Mastercard®, for example. In some embodiments and/or scenarios where the card network entity also acts as the issuer (e.g., American Express® or Discover®), card network computing system 16 may include FAMS 14. Card network computing system 16 may provide various services to FAMS 14 and/or AFSS 12. For example, card network computing system 16 may provide electronic updates to chargeback rules, fraud scores for particular customers and/or transactions, and so on.

Each of cardholder computing devices 20 may be a computing device of a respective holder of a credit or debit card account managed by FAMS 14. For example, one or more of cardholder computing devices 20 may be desktop computers, laptop computers, tablet computers, smartphones, smart watches, and so on. The cardholders (e.g., credit or debit card account holders) may use cardholder computing devices 20 to access (e.g., view, modify, etc.) their account information stored in account records database 30 online via network 26. In some embodiments where AFSS 12 detects and/or classifies activity not related to credit or debit card fraud (e.g., a fraudulent application for a home equity loan, etc.), cardholder computing devices 20 may instead be computing devices of other types of customers or potential customers, such as holders of non-card-based accounts, or individuals who have submitted an online application for a loan, etc., as discussed further below. In some of these embodiments, the environment 10 may omit card network computing system 16.

Each of merchant computing systems 22 may include one or more computing devices associated with a particular provider of products and/or services. For example, some or all of merchant computing systems 22 may include servers associated with online retailers. Alternatively, or additionally, some or all of merchant computing systems 22 may include point-of-sale terminal devices providing credit and/or debit card payment processing features for "card present" transactions. In some embodiments where AFSS 12 detects and/or classifies activity not related to customer purchases (e.g., if AFSS 12 only detects loan application fraud, etc.), the environment 10 may omit merchant computing systems 22.

The other sources 24 may include computing devices and/or systems associated with sources of one or more other types of information. For example, other sources 24 may include vehicle telematics systems (e.g., installed in vehicles of cardholders associated with cardholder computing devices 20), one or more Internet service providers (ISPs) (e.g., ISPs providing Internet access to some or all cardholders), "smart home" system devices (e.g., installed in homes of some or all cardholders), and/or other systems/devices. In some embodiments, the environment 10 does not include the other sources 24.

Network 26 may communicatively couple some or all of the components shown in FIG. 1. For example, FAMS 14 may use network 26 to communicate with AFSS 12, card network computing system 16, cardholder computing devices 20 and/or merchant computing systems 22. As another example, AFSS 12 may use network 26 to communicate with FAMS 14, card network computing system 16, cardholder computing devices 20, merchant computing systems 22 and/or one or more of the other sources 24. While shown as a single entity in FIG. 1, network 26 may include multiple communication networks of one or more types (e.g., one or more wired and/or wireless local area networks (LANs), and/or one or more wired and/or wireless wide area networks (WANs) such as the Internet). Moreover, network 26 may use partially or entirely distinct network components to support communications between different endpoints or computing devices, such as wireless communication or data transmission over one or more radio frequency links and/or wireless communication channels. For example, the portion(s) of network 26 used for communications between FAMS 14 and AFSS 12 may be the same as, or different than, the portion(s) of network 26 used for communications between FAMS 14 and one or more of cardholder computing devices 20 over one or more radio links or wireless communication channels, or between AFSS 12 and one or more of the other sources 24, etc. Those skilled in the art will appreciate different types of networks that are appropriate for network 26, depending upon, for example, how AFSS 12, FAMS 14 and/or other components of environment 10 are localized or distributed across a relatively large geographic area.

Generally, fraud detection/classification unit 36 of AFSS 12 may detect fraudulent activity, confirm whether suspected or reported fraudulent activity is truly fraudulent, and/or classify fraudulent or suspected fraudulent activity. For example, fraud detection/classification unit 36 may analyze each transaction stored in account records database 30 to determine whether that transaction is, or potentially is, fraudulent. Alternatively, fraud detection/classification unit 36 may analyze only those transactions that were flagged as possibly being fraudulent (e.g., by a cardholder calling in to report an unauthorized and/or unrecognized transaction, or by FAMS 14 or AFSS 12 generating a preliminary fraud alert after applying an initial set of rules to a transaction, etc.). Fraud detection/classification unit 36 may also, or instead, analyze location information associated with potential transactions (e.g., GPS or other data indicating cardholder location, transaction data indicating a merchant location for a card-present transaction, etc.), and issue a pre-transaction alert or otherwise prevent a transaction from being fully executed. Fraud detection/classification unit 36 may also, or instead, support additional functionality, such as that described below in connection with the various components of fraud detection/classification unit 36 shown in FIG. 1.

As seen in FIG. 1, fraud detection/classification unit 36 may include a machine learning (ML) rule generator 40, an external data collection unit 42, a behavior analysis unit 44, a dispute resolution unit 46, a chargeback analysis unit 50, an image analysis unit 52, a classification unit 54, and/or a notification unit 56. In other embodiments, fraud detection/classification unit 36 may include more, fewer and/or different components/units than those shown in FIG. 1. In some embodiments, each of ML rule generator 40, external data collection unit 42, behavior analysis unit 44, dispute resolution unit 46, chargeback analysis unit 50, image analysis unit 52, classification unit 54, notification unit 56, and/or other units or components of fraud detection/classification unit 36 may be a software component stored in memory 34 and implemented by one or more processors of one or more computing devices (e.g., servers) included in AFSS 12.

ML rule generator 40 may generally analyze various types of data to generate and/or update fraud detection and/or classification rules to be applied by fraud detection/classification unit 36 and stored in an ML rules database 58. As discussed in further detail below, the rules may be used to detect and/or classify a single type or category of fraudulent activity, or may be used broadly in connection with multiple types or categories of fraudulent activity. ML rule generator 40 may implement any suitable type or types of machine learning. For example, ML rule generator 40 may implement supervised learning techniques, such as decision trees, regression-based models, support vector machines (SVMs) and/or neural networks, and/or unsupervised learning techniques such as Dirichlet process mixture models and/or k-means clustering. Other machine learning techniques are also possible, such as techniques utilizing Bayesian networks, "deep learning" techniques, and so on. While shown in FIG. 1 as a single entity within AFSS 12, it is understood that ML rules database 58 may, in some embodiments, be distributed across multiple databases and/or multiple physical/hardware memories, and/or may be wholly or partially external to (e.g., remote from) AFSS 12.

External data collection unit 42 may generally collect, via network interface 32 and/or from sources internal to AFSS 12, information from various sources (e.g., FAMS 14, cardholder computing devices 20, other sources 24, etc.), and provide that data to other portions of AFSS 12 as needed (e.g., to ML rule generator 40 to generate and/or update rules, and/or to behavior analysis unit 44, dispute resolution unit 46, chargeback analysis unit 50, image analysis unit 52 and/or classification unit 54 to detect and/or classify fraudulent activity). Some data may be collected indirectly. For example, FAMS 14 may collect transaction data from merchant computing systems 22 (and/or from acquiring banks associated with one or more of merchant computing systems 22), and external data collection unit 42 may then collect that data from the account records database 30 of FAMS 14.

Once an initial set of rules has been generated and stored in ML rules database 58, those rules may dictate some or all of the types of data gathered by external data collection unit 42. In some embodiments, however, external data collection unit 42 collects a broad set of data types that may or may not be relevant to fraud determination or classification, and ML rule generator 40 continually analyzes that data to determine which data types are most predictive of fraud and/or fraud type/class.

Behavior analysis unit 44 may generally analyze cardholder-related (or other customer-related) information to identify patterns of behavior, which may then be used by fraud detection/classification unit 36 to detect and/or classify fraudulent activity. For example, behavior analysis unit 44 may analyze information obtained from account records database 30 to identify spending patterns associated with different cardholders. The operation of behavior analysis unit 44, including the types of information analyzed and the ways in which that information is used to arrive at a result (e.g., a pattern of behavior), may be dictated by the rules stored in ML rules database 58.

Data indicative of the behavior patterns identified by behavior analysis unit 44 may be stored in an account holder behaviors database 60, for example. While shown in FIG. 1 as a single entity within AFSS 12, it is understood that account holder behaviors database 60 may, in some embodiments, be distributed across multiple databases and/or multiple physical/hardware memories, and/or may be wholly or partially external to (e.g., remote from) AFSS 12. In one embodiment, for example, account holder behaviors database 60 may be included within account records database 30. In still other embodiments, the environment 10 may not include account holder behaviors database 60, and behavior patterns may be only identified by behavior analysis unit 44 "on the fly" as needed by fraud detection/classification unit 36 (e.g., when needed to analyze a transaction in view of past spending patterns of a particular cardholder, etc.).

In some embodiments, behavior analysis unit 44 may separately analyze the transactions associated with each account holder, even if more than one account holder exists for a particular account. For example, behavior analysis unit 44 may independently analyze the transactions of each cardholder for a credit or debit card account in which each spouse has been issued a credit or debit card in his or her name. Fraud detection/classification unit 36 may then utilize the individual spending patterns when detecting and/or classifying fraud. In one embodiment where fraud detection/classification unit 36 utilizes a dollar amount threshold to detect likely fraudulent transactions, for example, a first threshold may be used for transactions made by a first cardholder listed on an account, and a higher, second threshold may be used for transactions made by a second cardholder listed on the account. Further examples are provided below in connection with FIG. 6, according to various embodiments. In this manner, fraud detection and/or classification may be made more precise than would be the case if spending patterns were only identified at the aggregate level (e.g., using a single dollar amount threshold, regardless of which cardholder made a particular transaction).

Dispute resolution unit 46 may generally analyze financial transaction data and/or other information to automatically generate queries for cardholders or other customers. For example, dispute resolution unit 46 may analyze information obtained from account records database 30. The generated queries may be designed to help fraud detection/classification unit 36 determine whether a particular transaction was fraudulent, or estimate a probability that the transaction was fraudulent, etc. Dispute resolution unit 46 may also process responses from cardholders/customers, and automatically generate additional queries based upon those responses. Examples of the operation of dispute resolution unit 46 are provided below in connection with FIGS. 4E and 9, according to various embodiments.

Chargeback analysis unit 50 may generally analyze financial transaction and/or other information to identify transactions that are good candidates for chargeback payments. For example, chargeback analysis unit 50 may analyze information obtained from account records database 30 to determine whether there is a relatively high probability that the merchant (or an acquiring bank) should be responsible for a chargeback payment to a card issuer associated with FAMS 14. The operation of chargeback analysis unit 50, including the types of information analyzed and the ways in which that information is used to arrive at a result (e.g., flagging a transaction as a chargeback candidate), may be dictated by the rules stored in ML rules database 58. ML rule generator 40 may make use of chargeback rules obtained from a card network entity (e.g., from card network computing system 16), and stored in chargeback rules database 62, to generate and/or update the rules applied by chargeback analysis unit 50. Examples of the operation of chargeback analysis unit 50 are provided below in connection with FIGS. 4B and 7, according to various embodiments.

In some embodiments, transactions flagged by chargeback analysis unit 50 are subject to further, manual review using the chargeback rules stored in chargeback rules database 62. In other embodiments, chargeback analysis unit 50 (or another component of fraud detection/classification unit not shown in FIG. 1) automatically, with little or no manual input/assistance, applies the chargeback rules from chargeback rules database 62 for each flagged transaction. While shown in FIG. 1 as a single entity within AFSS 12, it is understood that chargeback rules database 62 may, in some embodiments, be distributed across multiple databases and/or multiple physical/hardware memories, and/or may be wholly or partially external to (e.g., remote from) AFSS 12.

Image analysis unit 52 may generally analyze image data corresponding to physical documents to identify fraudulent (e.g., counterfeit and/or forged) documents, and/or to flag potentially fraudulent documents for further (e.g., manual) review. For example, image analysis unit 52 may analyze information obtained from merchant computing systems 22 to determine whether there is a relatively high probability that documents presented to the merchants (e.g., personal checks, identification cards, etc.) are fraudulent. Image analysis unit 52 may be configured to analyze only a single type of document, or multiple types of documents. The operation of image analysis unit 52, including the image characteristics analyzed and the ways in which the characteristics may be used to arrive at a result (e.g., flagging a document as potentially fraudulent), may be dictated by the rules stored in ML rules database 58. Examples of the operation of image analysis unit 52 are provided below in connection with FIGS. 4F and 10, according to various embodiments.

Classification unit 54 may generally analyze broad categories of data from various sources (e.g., account records database 30, cardholder computing devices 20, merchant computing systems 22, and/or other sources 24) to categorize/classify types of suspected fraudulent financial activity. Classification unit 54 may classify fraudulent activity only within a particular subset of fraudulent financial activity (e.g., classifying debit and/or credit card transactions as involving a potential case of counterfeiting, skimming, lost/stolen card use, chargeback fraud, etc.), or may classify fraudulent financial activity across a broader spectrum (e.g., including types of identity theft not necessarily tied to a single financial transaction, such as application fraud). In some embodiments, classification unit 54 classifies suspected fraudulent activity in connection with a particular account or transaction in response to being notified of suspect activity (e.g., notified by another component of fraud detection/classification unit 36, or by a manual user input, etc.). In other embodiments, classification unit 54 itself (or another component of fraud detection/classification unit 36) identifies suspect activity before classification unit 54 classifies that activity. Examples of the operation of classification unit 54 are provided below in connection with FIGS. 4C and 11, according to various embodiments.

Notification unit 56 may generally provide alerts, confirmations, and/or other notifications to various individuals (e.g., customers, bank employees associated with FAMS 14, third party employees associated with AFSS 12, etc.). For example, notification unit 56 may generate a notification message stating that a fraud alert associated with a particular transaction is a false positive, and cause network interface 32 to send the message to a computer terminal or to FAMS 14 for display to a system user. As another example, notification unit 56 may cause network interface 32 to send other flagged transactions and/or documents (e.g., chargeback candidates identified by chargeback analysis unit 50, documents that image analysis unit 52 has identified as potentially fraudulent, etc.) to a computer terminal or FAMS 14 for display to a system user. As still another example, notification unit 56 may cause network interface 32 to send FAMS 14 and/or one of merchant computing systems 22 an alert indicating that a transaction that is in-process should be terminated due to suspected fraud. As yet another example, notification unit 56 may cause network interface 32 to send queries generated by dispute resolution unit 46 to various ones of cardholder computing devices 20 for display to cardholders.

The operation of various components of the environment 10 shown in FIG. 1, according to different embodiments and/or scenarios, will be described further below in connection with the remaining figures.

Figure 2:
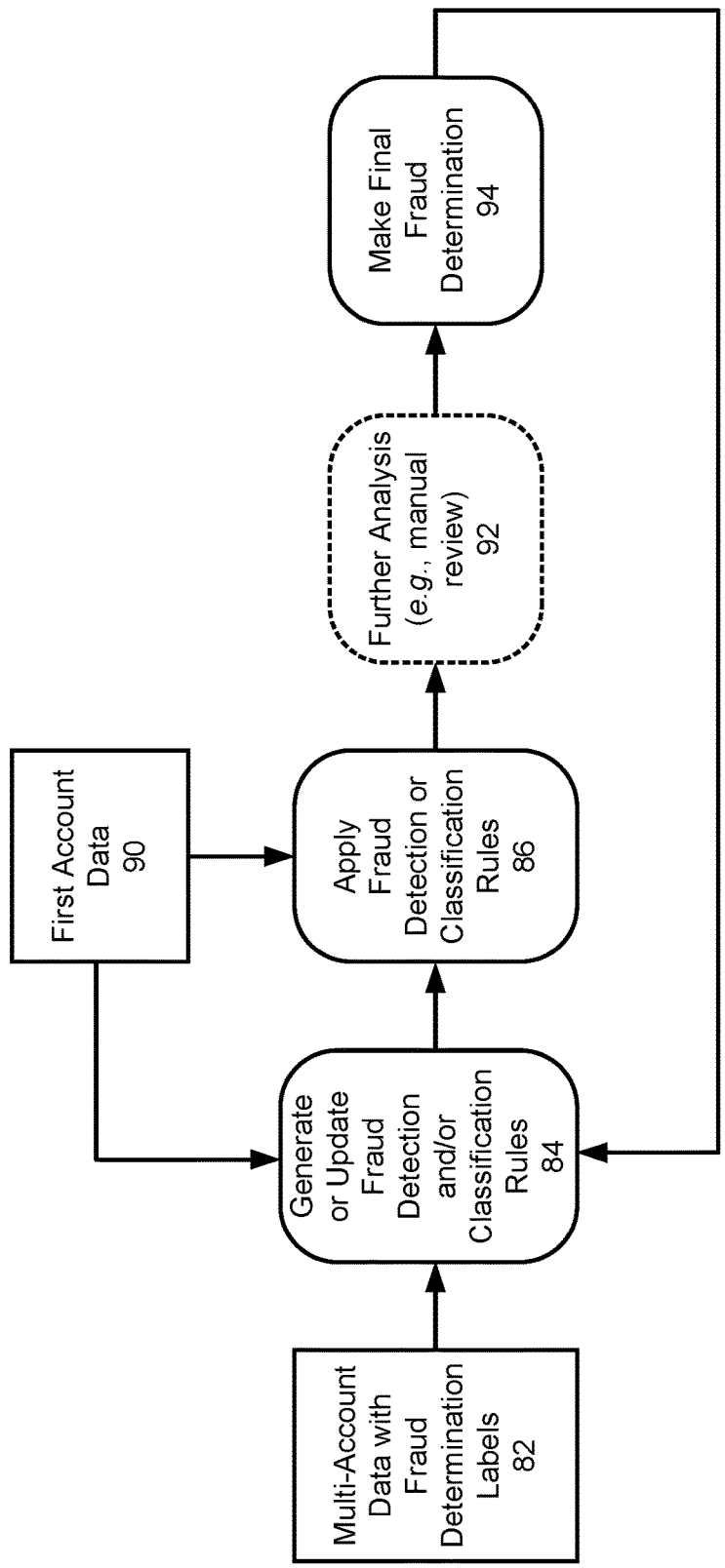
FIG. 2 depicts an exemplary process flow for machine learning of fraud detection, verification and/or classification rules, according to one embodiment.

III. Exemplary Process Flows for Machine Learning of Fraud Detection and/or Classification Rules As discussed above, ML rule generator 40 may generate and/or update rules that are used for one or more of a variety of different purposes relating to fraud detection and/or classification. FIG. 2 depicts one generalized, example process flow 80 for machine learning that may be implemented by ML rule generator 40, and possibly one or more other components of fraud detection/classification unit 36.

In the process flow 80, multi-account data 82 may represent data associated with multiple financial accounts, each with one or more account holders. The financial accounts may be existing or potential accounts, and the account holders may include holders of accounts and/or potential holders of potential accounts. For example, the multi-account data 82 may include existing and/or applied-for credit card accounts, debit card accounts, savings accounts, checking accounts, investment accounts, loan accounts, etc.

Depending upon the embodiment, the multi-account data 82 may include one or more different types of information obtained (e.g., by external data collection unit 42 of FIG. 1) from one or more of FAMS 14, cardholder computing devices 20, merchant computing systems 22, and/or other sources 24. For example, the multi-account data 82 may include transaction data (e.g., transaction dates, amounts, locations, etc.) from account records database 30 of FAMS 14, data indicative of Internet Protocol (IP) addresses of cardholder computing devices 20 and/or devices in merchant computing systems 22, Internet browsing and/or search history data from cardholder computing devices 20 (or from an ISP computer system included in other sources 24, etc.), vehicle telematics data from telematics systems of cardholder vehicles, home occupancy and/or usage data (e.g., smart appliance data) from smart home systems of cardholders, autonomous or smart vehicle data, vehicle navigation system data, mobile device data, mobile device and/or vehicle GPS data, and/or one or more other types of data. In some embodiments, the multi-account data 82 only includes data that account holders or potential account holders have expressly consented to share with an entity associated with FAMS 14 and/or AFSS 12 (e.g., in exchange for fraud protection services). In certain other embodiments, however, express consent is only needed for certain types of information, such as browsing history information, vehicle telematics data, etc.

The multi-account data 82 may be associated with multiple fraud determination labels. The labels may simply reflect whether or not fraud existed (e.g., "fraud" or "no fraud"), or may also indicate a type or class of fraud (e.g., "counterfeiting," "lost or stolen card use," etc.), for example. In one embodiment, each of a number of data sets in the multi-account data 82 is associated with such a label, and includes data relating to a particular financial transaction, financial account, loan application, etc., for which the fraud determination was made (e.g., after a manual and/or automated fraud investigation). The labels may include final fraud determinations that were made via earlier iterations of the process flow 80, and/or external to the process flow 80.

To provide a more detailed example, a first data set associated with a "card present" credit card transaction may include data describing that transaction (e.g., from account records database 30) and data indicative of the cardholder's online browsing activity (e.g., from one of cardholder computing devices 20) for the 15 days immediately preceding the transaction, and be labeled "confirmed fraud." A second data set, associated with another "card present" transaction (for the same account, or for a different account), may include the same general types of data but be labeled "no fraud," and so on. In some embodiments and/or scenarios, the same data may appear in, or be used by, two or more of the data sets. If the two "card present" transactions described above are both associated with the same account, for example, and if the second transaction occurred less than 15 days after the first transaction, some of the same online activity data may be shared by the first and second data sets.

At a process stage 84, the multi-account data 82 may be analyzed to generate fraud detection and/or classification rules (e.g., to be stored in ML rules database 58). Any suitable type of supervised machine learning program/technique(s) may be used, such as SVMs, neural networks, logistic regression, etc. Generally, process stage 84 may serve to identify which type(s) of data is/are probative of whether fraud has occurred (and/or the type/category of fraud that may have occurred), and to determine the data values and/or combinations that are probative of whether fraud has occurred (and/or the type/category of fraud that may have occurred). By analyzing many (e.g., thousands) of positively and negatively labeled data sets in the multi-account data 82, for example, process stage 84 may learn that certain spending patterns within a threshold time of a transaction tend to indicate that the cardholder made the transaction (e.g., thereby indicating that fraud has not occurred, or that a fraud report is itself fraudulent or mistaken, etc.), that certain types of online searches by a cardholder (e.g., including a descriptor of a product purchased in the transaction, or a name of the merchant, etc.) tend to indicate that the cardholder made the transaction, that the cardholder's distance from the site of a "card present" transaction (e.g., as determined from GPS information provided by the cardholder's smartphone, wearable electronics, or vehicle) relates to the probability of fraudulent activity according to a particular equation, and so on. Other specific examples of such rules, and how those rules may be generated, are discussed below in connection with FIGS. 3A-3F and 4A-4F, according to various embodiments.

At process stage 86, the rules generated or updated at process stage 84 may be applied to first account data 90 associated with a particular account and customer(s) (e.g., a customer associated with a particular one of computing devices 20). The types of data included in first account data 90 may depend upon which types of data were determined, by process stage 84, to be relevant to a fraud determination. For example, if the rules give weight to the amount and date of a financial transaction when determining whether the transaction is fraudulent, and also give weight to whether the account holder visits a particular type of website, then the first account data 90 may include the amount and date of one or more transactions, as well as data indicative of visited websites (e.g., Uniform Resource Locators (URLs) and/or content of visited websites, etc.). The first account data 90 may include information obtained (e.g., by external data collection unit 42) from one or more of FAMS 14, one of cardholder computing devices 20 associated with the customer holding the first account, one or more of merchant computing systems 22, and/or one or more of other sources 24, for example.

Process stage 86 may output various different types of information, depending upon the embodiment and/or scenario. For example, depending upon the content of first account data 90 and the rules generated or updated at process stage 84, process stage 86 may generate data indicating that a particular financial transaction associated with first account data 90 is, or is not, fraudulent or potentially fraudulent. Alternatively, or additionally, process stage 86 may generate data indicating a particular classification for fraudulent or suspected fraudulent activity (e.g., a fraudulent transaction) associated with first account data 90.

In some embodiments, further analysis (e.g., a manual review, or further automated review using additional data sources, etc.) may be performed at an additional stage, shown in dashed lines in FIG. 2 as process stage 92. The additional analysis may then be used to make a final fraud determination (e.g., a final decision on whether fraud occurred, and/or on the type of fraud that occurred) at process stage 94. In other embodiments, process stage 92 is omitted from process flow 80, and process stage 94 merely represents the output of process stage 86. The final determination made at process stage 94, along with the first account data 90 used to make that determination, may be fed back into process stage 84 to provide additional labeled data for purposes of updating the rules.

In some embodiments, the process flow 80 includes more, fewer and/or different stages, such as any of those discussed elsewhere herein (e.g., in connection with FIGS. 3A-3F). In one alternative embodiment, process stages 84 and 86 may be combined. For example, the multi-account data 82 may be unlabeled rather than labeled (or the labels may be ignored), and the combined process stage 84, 86 may use unsupervised learning techniques (e.g., clustering techniques) to classify anomalous/outlier financial transactions, accounts, applications, etc., as "suspect" and needing further analysis.

More specific, machine learning-based process flows generally corresponding to process flow 80 of FIG. 2 will now be described with reference to FIGS. 3A-3F. It is noted, however, that other process flows are also within the scope of the invention described herein. Moreover, while FIGS. 3A-3F generally correspond to embodiments in which supervised machine learning techniques are used, other embodiments may instead use unsupervised machine learning techniques, as noted above. In various different embodiments, fraud detection/classification unit 36 may be configured to implement only one of the process flows of FIGS. 3A-3F, or may be configured to implement two or more (e.g., all) of the process flows shown in FIGS. 3A-3F.

A. Exemplary Process Flow for Machine Learning of Fraud Detection Rules Using Online Activity Data Referring first to FIG. 3A, an exemplary process flow 100 may generally be used to detect fraud using customer online activity data. In the process flow 100, multi-customer online activity data 102 may represent data associated with the online activities of a number (e.g., thousands) of customers (e.g., credit or debit cardholders, checking or saving account holders, etc.). The multi-customer online activity data 102 may include data indicating actions that the customers took, and/or web sites visited by the customers, while the customers were connected to the Internet via web browsers (e.g., executing on respective ones of cardholder computing devices 20). For example, the multi-customer online activity data 102 may include URLs of, and/or content (e.g., text) within, web sites visited by customers, search terms entered by customers using search engine tools, search results presented to customers by search engine tools, indications of interactive controls (e.g., virtual buttons) selected by customers on various web pages, and so on.

The multi-customer online activity data 102 may include data obtained (e.g., by external data collection unit 42 of FIG. 1) from cardholder computing devices 20, from one or more ISPs of other sources 24, and/or from a third party aggregator of such information, for example. In some embodiments, the multi-customer online activity data 102 may only include data that customers have expressly consented to share with an entity associated with FAMS 14 and/or AFSS 12 (e.g., in exchange for fraud protection services or other benefits, such as discounts).

As described above in connection with multi-account data 82 of process flow 80, the multi-customer online account data 102 may be associated with multiple fraud determination labels. In some embodiments, each label may be associated with a data set that includes not only the corresponding portion of multi-customer online activity data 102, but also one or more other types of data, such as transaction data (e.g., transaction dates, amounts, locations, etc.) for each customer from account records database 30 of FAMS 14, data indicative of IP addresses of cardholder computing devices 20 and/or devices in merchant computing systems 22, Internet browsing and/or search history data from cardholder computing devices 20 (or from an ISP computer system included in other sources 24, etc.), vehicle telematics data from telematics systems of other sources 24, home occupancy and/or usage data (e.g., smart appliance data) from smart home systems of other sources 24, and so on. The labels may include final fraud determinations that were made via earlier iterations of the process flow 100, and/or external to the process flow 100. Multi-customer online account data 102 may include many (e.g., thousands) of positively and negatively labeled data sets.

At a process stage 104, the multi-customer online activity data 102 may be analyzed to generate fraud detection rules (e.g., to be stored in ML rules database 58). As described above in connection with process stage 84 of process flow 80, any suitable type of supervised machine learning program/technique(s) may be used. Generally, process stage 104 may serve to identify which type(s) of online activity data is/are probative of whether fraud has occurred, and to determine the data values and/or combinations that are probative of whether fraud has occurred. While not shown in FIG. 3A, the fraud detection rules may not only detect fraud, but also classify fraud (e.g., as described below in connection with FIG. 3C), in some embodiments.

At process stage 106, the rules generated or updated at process stage 104 may be applied to first customer online activity data 110. The first customer online activity data 110 may be associated with a particular customer, such as a customer associated with a particular one of computing devices 20, for example. The types of data included in first customer online activity data 110 may depend upon which types of online activity data were determined, by process stage 104, to be relevant to a fraud determination. For example, the first customer online activity data 110 may include information obtained (e.g., by external data collection unit 42) from one of cardholder computing devices 20 (i.e., the device associated with the first customer), and/or from an ISP of other sources 24. Some specific examples of rules that may be generated by process stage 104, and applied at process stage 106, are described below in connection with FIG. 4A.

Process stage 106 may output various different types of information, depending upon the embodiment and/or scenario. For example, depending upon the content of first customer online activity data 110 and the rules, process stage 106 may generate data indicating that a particular financial transaction associated with the first customer is, or is not, fraudulent or potentially fraudulent. Alternatively, or additionally, process stage 106 may generate data indicating a particular classification of fraudulent or potentially fraudulent activity associated with first customer online activity data 110.

Figure 3A:
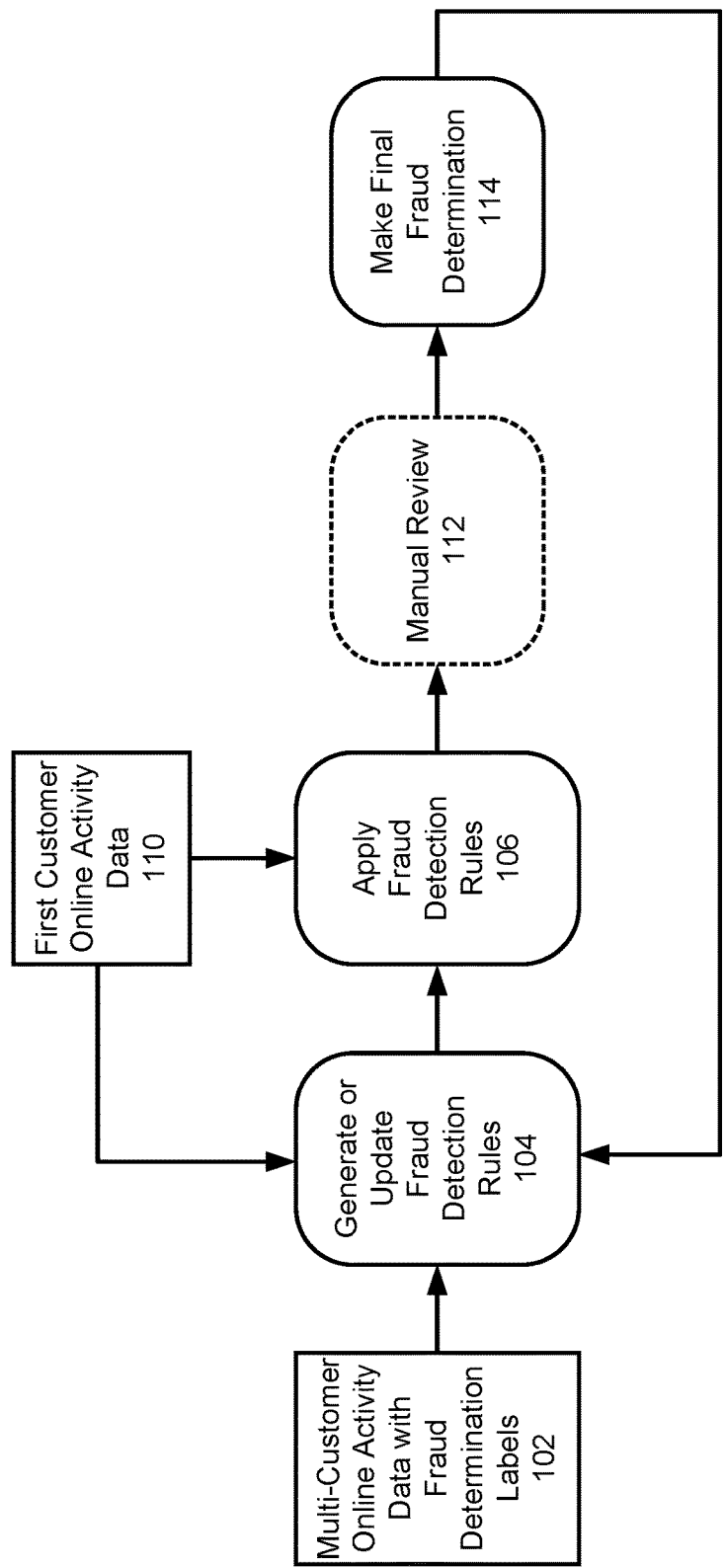
FIGS. 3A-3F depict exemplary process flows for machine learning of particular types of fraud detection, verification and/or classification rules, according to different embodiments.
Figure 3B:
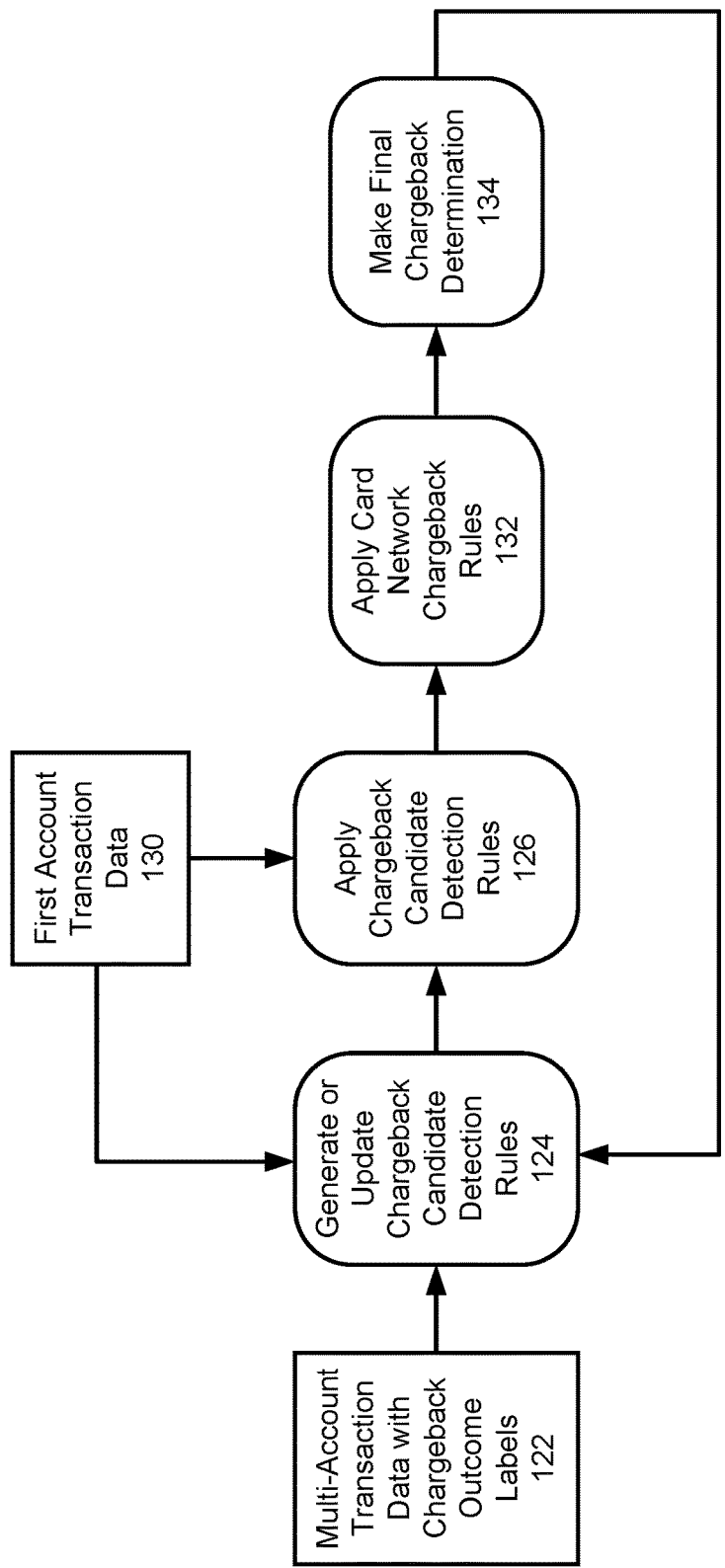
Figure 3C:
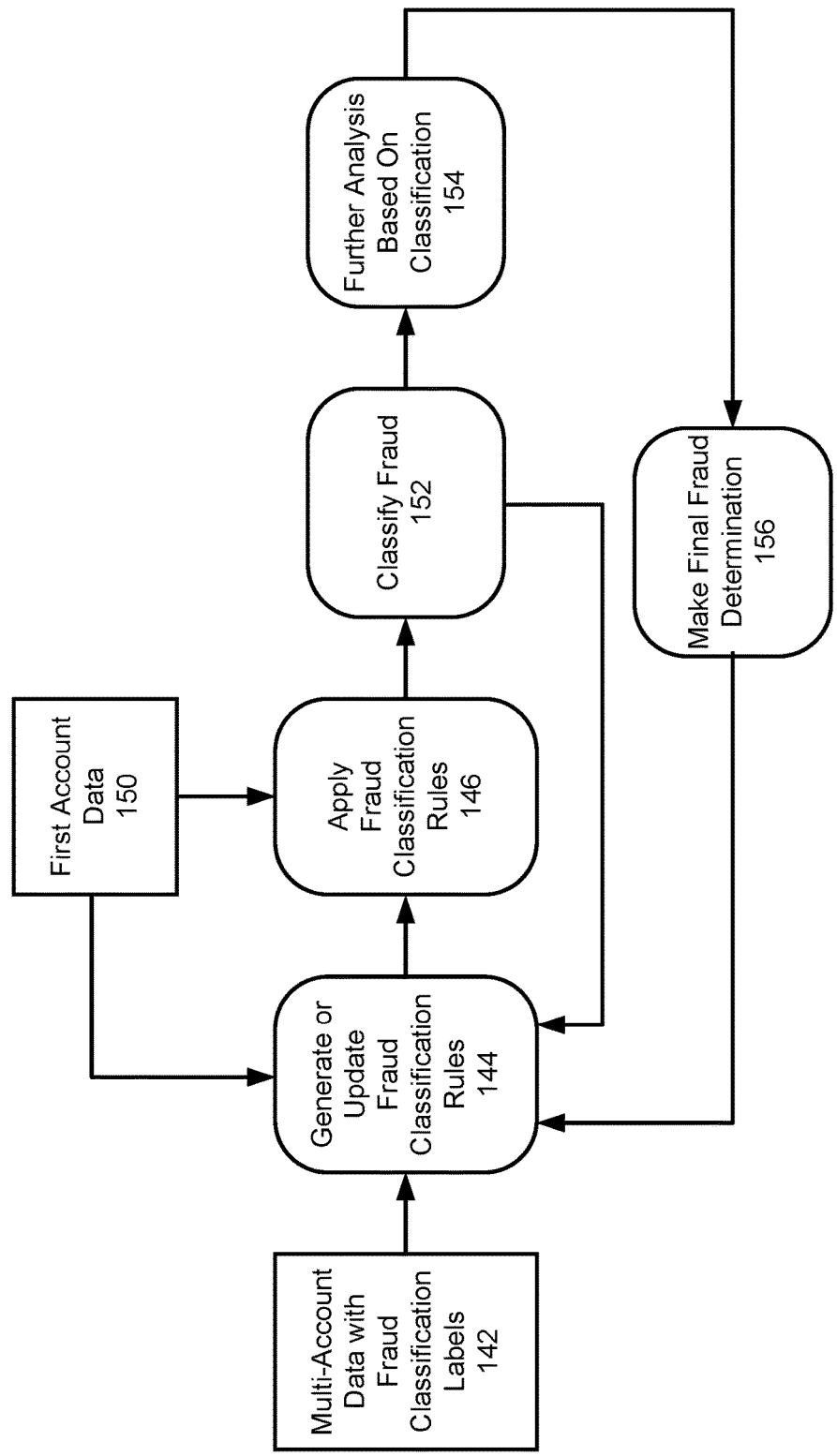

In some embodiments, further analysis (e.g., a manual review, or further automated review using additional data sources, etc.) is performed at an additional stage, shown in dashed lines in FIG. 3A as process stage 112. The additional analysis may then be used to make a final fraud determination (e.g., a final decision on whether fraud occurred, and/or on the type of fraud that occurred) at process stage 114. In other embodiments, process stage 112 is omitted from process flow 100, and process stage 114 merely represents the output of process stage 106.

The final determination made at process stage 114, along with the first customer online activity data 110 (and any other data) used to make that determination, may be fed back into process stage 104 to provide additional labeled data for purposes of updating the rules. In some embodiments, a preliminary fraud determination made at process stage 106 is also fed back into process stage 104, to allow the machine learning program to determine and improve upon past performance/accuracy.

B. Exemplary Process Flow for Machine Learning of Chargeback Candidate Detection Rules Referring next to FIG. 3B, an exemplary process flow 120 may generally be used to identify the financial transactions for which chargebacks (e.g., post-transaction payments from merchants, or acquiring/merchant banks, back to the issuer to return proceeds from transactions) are appropriate. In the process flow 120, multi-account transaction data 122 may represent data associated with the financial transactions involving the accounts of a number (e.g., thousands) of credit or debit cardholders. The multi-account transaction data 122 may include information such as transaction dates, transaction amounts, merchant names (and/or aliases) associated with the transaction, information relating to how the card information was collected by the merchant (e.g., by swiping, an EMV chip reader, manual entry of the card number, etc.), geographic locations of "card present" transactions, and so on. The multi-account transaction data 122 may include data obtained (e.g., by external data collection unit 42 of FIG. 1) from merchant computing systems 22 and/or from acquiring/merchant banks associated with those merchants, for example.

Similar to the labels described above in connection with multi-account data 82 of process flow 80, the multi-account transaction data 122 may be associated with multiple chargeback outcome labels. For example, each label may be associated with a data set that includes the corresponding portion of multi-account transaction data 122. The outcome labels may include final chargeback determinations that were made (in connection with the transactions represented in multi-account transaction data 122) via earlier iterations of the process flow 120, and/or external to the process flow 120. Multi-account transaction data 122 may include many (e.g., thousands) of positively and negatively labeled data sets.

At a process stage 124, the multi-account transaction data 122 may be analyzed to generate chargeback candidate detection rules (e.g., to be stored in ML rules database 58). As described above in connection with process stage 84 of process flow 80, any suitable type of supervised machine learning program/technique(s) may be used. Generally, process stage 124 may serve to identify which type(s) of transaction data is/are probative of whether, under the full chargeback rules of the card network entity, a chargeback is appropriate for a given transaction. Process stage 124 may also determine the transaction data values and/or combinations that are probative of whether a chargeback is appropriate for the transaction.

At a process stage 126, the rules generated or updated at process stage 124 may be applied to first account transaction data 130 to determine whether a transaction associated with the first account is a "good" chargeback candidate. Put differently, process stage 126 may, instead of applying the full chargeback rules of the card network entity (which may be quite lengthy and complex) to the facts surrounding the transaction, use various factors and algorithms developed at process stage 124 to determine whether there exists a relatively high probability that a chargeback would be appropriate for the transaction if the full chargeback rules were applied. The process stage 126 may calculate a percentage probability that the transaction is one in which a chargeback is appropriate, for example.

The first account transaction data 130 may be associated with the account of a particular cardholder or cardholders, such as a cardholder associated with a particular one of cardholder computing devices 20, for example. The types of data included in first account transaction data 130 may depend upon which types of transaction-related data were determined, by process stage 124, to be relevant to a chargeback candidate determination. For example, the first account transaction data 130 may include information obtained (e.g., by external data collection unit 42) from one of merchant computing systems 22 (e.g., the computing system of the merchant involved in the transaction being analyzed) and/or from an acquiring/merchant bank associated with that merchant. The first account transaction data 130 may also include information about one or more other transactions associated with the first account (e.g., data pertaining to other transactions occurring shortly before and/or after the transaction at issue). Some specific examples of rules that may be generated by process stage 124, and applied at process stage 126, are described below in connection with FIG. 4B.

Process stage 126 may output information indicating whether the particular transaction represented by first account transaction data 130 is a "good" candidate for chargeback detection. For example, process stage 126 may output a percentage probability, calculated according to the rules generated or updated at process stage 124, that the transaction is one in which a chargeback is appropriate. As another example, process stage 126 may output a binary indicator of whether the transaction is, or is not, a strong/likely chargeback candidate (e.g., by comparing the percentage probability to a threshold probability).

If the transaction is identified as a chargeback candidate at process stage 126, the full chargeback rules of the card network entity may be applied at a process stage 132. Process stage 132 may include manual application of the full chargeback rules, and/or automated application of the full chargeback rules, in various different embodiments. Based upon the analysis at process stage 132, a final chargeback determination may be made at a process stage 134. The final determination made at process stage 134, along with the first account transaction data 130 (and any other data) used to make that determination, may be fed back into process stage 124 to provide additional labeled data for purposes of updating the rules. In some embodiments, the indication of whether the transaction is a good chargeback candidate generated at process stage 126 may also be fed back into process stage 124, to allow the machine learning program to determine and improve upon past performance/accuracy.

C. Exemplary Process Flow for Machine Learning of Fraud Classification Rules Referring now to FIG. 3C, an exemplary process flow 140 may generally be used to classify instances of suspected or potential fraud. For example, the process flow 140 may represent ongoing, real-time or batch processing of a large amount of data associated with a large number of potential and/or existing financial accounts (e.g., all accounts associated with a particular bank, or all accounts opting in to a fraud protection program, etc.). In this manner, the process flow 140 may be used to initially flag situations for closer investigation, and provide one or more classifications of the type(s) of fraud potentially at issue in order to narrow or otherwise facilitate the investigation. In other embodiments, the process flow 140 may be used to provide a narrower classification (e.g., "skimming") when a broader class of fraud (e.g., credit card fraud) is already suspected.

In the process flow 140, multi-account data 142 may represent data associated with financial accounts of a number (e.g., thousands) of account holders. The financial accounts may be existing or potential accounts, and the account holders may include holders of accounts and/or potential holders of potential accounts. For example, the multi-account data 142 may include existing and/or applied-for credit card accounts, debit card accounts, savings accounts, checking accounts, investment accounts, loan accounts, etc.

Depending upon the embodiment, the multi-account data 142 may include one or more different types of information obtained (e.g., by external data collection unit 42 of FIG. 1) from one or more of FAMS 14, cardholder computing devices 20, merchant computing systems 22, and/or other sources 24. For example, the multi-account data 142 may include transaction data (e.g., transaction dates, amounts, locations, etc.) from account records database 30 of FAMS 14, data indicative of IP addresses of cardholder computing devices 20 and/or devices in merchant computing systems 22, Internet browsing and/or search history data from cardholder computing devices 20 (or from an ISP computer system included in other sources 24, etc.), vehicle telematics data from telematics systems of cardholder vehicles, home occupancy and/or usage data (e.g., smart appliance data) from smart home systems of cardholders, and/or one or more other types of data. Some or all data within multi-account data 142 may be information that account holders or potential account holders have expressly consented to share with an entity associated with FAMS 14 and/or AFSS 12 (e.g., in exchange for fraud protection services).

The multi-account data 142 may be associated with multiple fraud determination labels, each indicating a type or class of fraud (e.g., "counterfeiting," "lost or stolen card use," "skimming," "chargeback fraud," "application fraud," etc.), or indicating a lack of fraud, for example. In one embodiment, each of a number of data sets in the multi-account data 142 is associated with at least one such classification/label, and includes data relating to a particular financial transaction, financial account, loan application, etc., for which the fraud classification or classifications was/were made (e.g., after a previous iteration of process flow 140, or after another manual and/or automated fraud investigation). Multi-account data 142 may include many (e.g., thousands) of data sets labeled with various known fraud classifications.

At a process stage 144, the multi-account data 142 may be analyzed to generate fraud classification rules (e.g., to be stored in ML rules database 58). As described above in connection with process stage 84 of process flow 80, any suitable type of supervised machine learning program/technique(s) may be used. Generally, process stage 144 may serve to identify which type(s) of transaction data is/are probative of the particular type of fraud (if any) that has occurred. Process stage 144 may also determine the data values and/or combinations that are probative of the particular type of fraud (if any) that has occurred.

At a process stage 146, the rules generated or updated at process stage 144 may be applied to first account data 150. The first account data 150 may be associated with a particular account and a particular customer (e.g., a cardholder associated with a particular one of computing devices 20). The types of data included in first account data 150 may depend upon which types of data were determined, by process stage 144, to be relevant to fraud classification. For example, the first account data 150 may include information obtained (e.g., by external data collection unit 42) from one or more of FAMS 14, one of cardholder computing devices 20 (i.e., the device associated with the customer holding or applying for the first account), one or more of merchant computing systems 22, and/or one or more of other sources 24. Some specific examples of rules that may be generated by process stage 144, and applied at process stage 146, are described below in connection with FIG. 4C.

Process stage 146 may output data (e.g., a message or code) that is used to classify suspected fraudulent activity (in connection with the account associated with first account data 150) at a process stage 152. For example, process stage 152 may assign a classification of "counterfeiting" if process stage 146 determined that the first account data 150 indicated a number of circumstances that, according to the rules generated at process stage 144, are known to be correlated with counterfeiting activity (e.g., two "card present" transactions occurring in different states within the same one-hour time period, etc.). In some embodiments and/or scenarios, two or more classifications may concurrently be assigned to first account data 150. For example, process stage 146 may determine a set of probabilities for a set of two or more potential types of fraud, and process stage 152 may assign each classification, with each respective probability, to first account data 150. Moreover, in some embodiments and scenarios, process stage 152 may assign a classification that corresponds to an absence of any suspected fraud (e.g., "no fraud").

At a process stage 154, if process stage 152 assigned a classification other than one indicating the absence of suspected fraud, the first account data 150, and/or other information associated with the account and the suspected class of fraud, may be analyzed in depth to make a final fraud determination at a process stage 156. Generally, the fraud classification may be used to facilitate the analysis at process stage 154, with process stage 154 including manual and/or automated fraud detection techniques. For example, personnel associated with AFSS 12 may use the fraud classification(s) to inform their strategy and/or focus with respect to conducting an in-depth fraud investigation.

The additional analysis at process stage 154 may then result in a final fraud determination at process stage 156. The final determination may indicate both whether fraud occurred and, if so, the class(es)/type(s) of fraud that occurred. The final determination made at process stage 156, and information used to make that determination (e.g., the first account data 150 and potentially other data), may be fed back into process stage 144 to provide additional labeled data for purposes of updating the rules. In some embodiments, the (preliminary) fraud classification made at process stage 152 may also be fed back into process stage 144 to help the machine learning program identify instances in which the preliminary classifications at process stage 152 were incorrect. Process stage 144 may then update the fraud classification rules in ways that seek to prevent or reduce such instances in the future.

D. Exemplary Process Flow for Machine Learning of Application Fraud Detection Rules Referring now to FIG. 3D, an exemplary process flow 160 may generally be used to detect application fraud. "Application fraud" may generally refer to fraud in connection with the application for any type of financial account, loan and/or line of credit (e.g., mortgage loan, vehicle loan, small business loan, payday loan, home equity line of credit, credit card account, debit card account, checking account, savings account, investment account, etc.). In some embodiments and/or scenarios, however, the application may be for non-financial purposes, such as an application for membership in a particular group or institution, for example.

In the process flow 160, multi-applicant search history data 162 may represent data associated with the Internet search history of a number (e.g., thousands) of applicants. The multi-applicant search history data 162 may include search terms entered by the applicants using online search engine tools, for example, and/or the results of such searches (e.g., URLs, titles and/or contents of search results), for example.

The multi-applicant search history data 162 may include data obtained (e.g., by external data collection unit 42 of FIG. 1) from cardholder computing devices 20, from one or more ISPs of other sources 24, and/or from a third party aggregator of such information, for example. In some embodiments, the multi-applicant search history data 162 only includes data that the applicants have expressly consented to share with an entity associated with FAMS 14 and/or AFSS 12 (e.g., in exchange for consideration of their applications).

As described above in connection with multi-account data 82 of process flow 80, the multi-applicant search history data 162 may be associated with multiple fraud determination labels. In some embodiments, each label may be associated with a data set that corresponds to an application submitted by a particular applicant, where the data set includes the corresponding portion of multi-applicant search history data 162 (e.g., the search terms and/or results associated with the particular application). The labels may include final fraud determinations that were made via earlier iterations of the process flow 160, and/or external to the process flow 160. Multi-applicant search history data 162 may include many (e.g., thousands) of positively and negatively labeled data sets.

At a process stage 164, the multi-applicant search history data 162 may be analyzed to generate application fraud detection rules (e.g., to be stored in ML rules database 58). As described above in connection with process stage 84 of process flow 80, any suitable type of supervised machine learning program/technique(s) may be used. Generally, process stage 164 may serve to identify which type(s) of Internet search-related data is/are probative of whether application fraud has occurred, and to determine the data values and/or combinations that are probative of whether application fraud has occurred.

At process stage 166, the rules generated or updated at process stage 164 may be applied to first applicant search history data 170. The first applicant search history data 170 may be associated with a particular application and a particular applicant (e.g., a person associated with a particular one of computing devices 20), for example. The types of data included in first applicant search history data 170 may depend upon which types of Internet search-related data were determined, by process stage 164, to be relevant to a fraud determination. The first applicant search history data 170 may include information obtained (e.g., by external data collection unit 42) from one of computing devices 20 (i.e., the device associated with the first applicant), and/or from an ISP of other sources 24, for example. Some specific examples of rules that may be generated by process stage 164, and applied at process stage 166, are described below in connection with FIG. 4D.

Process stage 166 may output information indicating whether fraud is suspected in connection with the application corresponding to first applicant search history data 170. For example, process stage 166 may output a percentage probability, calculated according to the rules generated or updated at process stage 164, that the application was fraudulently made (e.g., by someone other than the purported applicant or an authorized representative thereof). As another example, process stage 166 may output a binary indicator of whether the application likely was, or likely was not, fraudulently made (e.g., by comparing a percentage probability to a threshold probability).

Figure 3D:
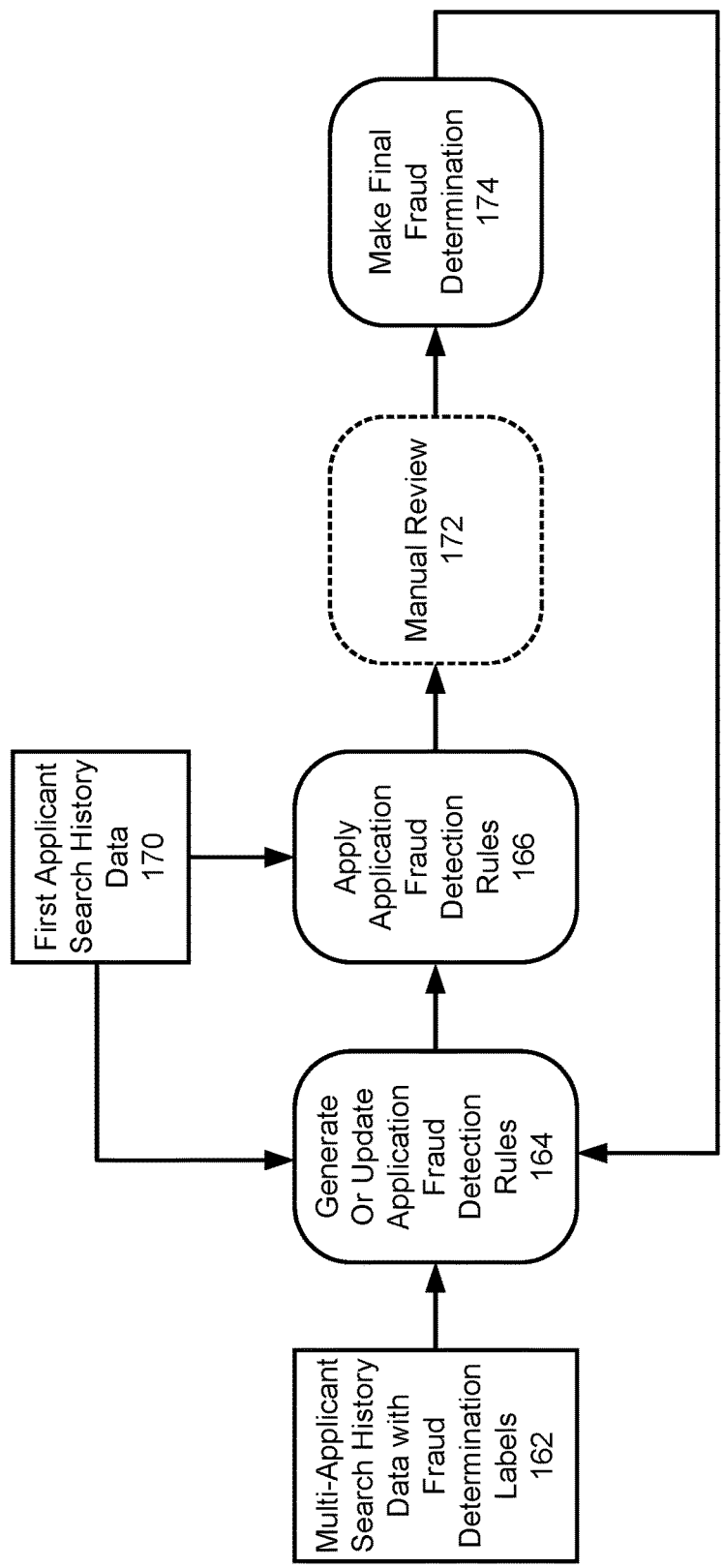

In some embodiments, further analysis (e.g., a manual review, or further automated review using additional data sources, etc.) is performed at an additional stage, shown in dashed lines in FIG. 3D as process stage 172. The additional analysis may then be used to make a final fraud determination (e.g., a final decision on whether application fraud occurred) at process stage 174. In other embodiments, process stage 172 is omitted from process flow 160, and process stage 174 merely represents the output of process stage 166. The final determination made at process stage 174, along with the first applicant search history data 170 (and any other data) used to make that determination, may be fed back into process stage 164 to provide additional labeled data for purposes of updating the rules. In some embodiments, a preliminary fraud determination made at process stage 166 is also fed back into process stage 164, to allow the machine learning program to determine and improve upon past performance/accuracy.

E. Exemplary Process Flow for Machine Learning of Fraud Dispute Resolution Rules Referring now to FIG. 3E, an exemplary process flow 180 may generally be used to facilitate the resolution of fraud disputes (or potential disputes) with customers/account holders. For example, the process flow 180 may be used to determine whether a reportedly unauthorized or fraudulent transaction (e.g., one that the account holder reported as such when looking at his or her account statement) was indeed unauthorized or fraudulent. In some embodiments, the process flow 180 may also, or instead, be used to determine whether an "unrecognized" transaction (i.e., one that the account holder does not recall, but does not necessarily report as fraudulent) was unauthorized or fraudulent.

In the process flow 180, multi-account data 182 may represent data associated with financial accounts of a number (e.g., thousands) of account holders. For example, the multi-account data 182 may include data associated with financial transactions relating to credit card accounts, debit card accounts, savings accounts, checking accounts, etc. For ease of explanation, FIG. 3E will be described with reference to an embodiment in which the accounts are credit card accounts.

In one embodiment, the multi-account data 182 may include transaction data (e.g., transaction dates, amounts, locations, etc.) obtained from FAMS 14 (e.g., by external data collection unit 42 of FIG. 1). In some embodiments, however, the multi-account data 182 also includes information obtained from cardholder computing devices 20, merchant computing systems 22, and/or other sources 24. For example, the multi-account data 182 may include, in addition to transaction data from account records database 30 of FAMS 14, data indicative of IP addresses of cardholder computing devices 20 and/or devices in merchant computing systems 22, Internet browsing and/or search history data from cardholder computing devices 20 (or from an ISP computer system included in other sources 24, etc.), vehicle telematics data from telematics systems of cardholder vehicles, home occupancy and/or usage data (e.g., smart appliance data) from smart home systems of cardholders, autonomous vehicle data, smart vehicle data, mobile device data, vehicle or mobile device GPS data, and/or one or more other types of data. Some or all data within multi-account data 182 may be information that account holders or potential account holders have expressly consented to share with an entity associated with FAMS 14 and/or AFSS 12 (e.g., in exchange for fraud protection services).

As described above in connection with multi-account data 82 of process flow 80, the multi-account data 182 may be associated with multiple fraud determination labels (e.g., "fraud" and "no fraud," and/or more complex labels that indicate type/class, such as "lost/stolen card use," etc.). In some embodiments, each label may be associated with a data set that includes the corresponding portion of multi-account data 182. The labels may include final fraud determinations that were made via earlier iterations of the process flow 180, and/or external to the process flow 180. Multi-account data 182 may include many (e.g., thousands) of positively and negatively labeled data sets.

At a process stage 184, the multi-account data 182 may be analyzed to generate query generation rules (e.g., to be stored in ML rules database 58). As described above in connection with process stage 84 of process flow 80, any suitable type of supervised machine learning program/technique(s) may be used. Generally, process stage 184 may serve to identify which types of information are probative of whether fraud has occurred, and to craft rules that formulate queries to ascertain such information based upon account data.

For example, process stage 184 may determine that, for a suspect "card present" transaction, a verified, non-fraudulent "card present" transaction within 10 miles and 3 hours of the suspect transaction is probative of whether the suspect transaction was fraudulent. Based upon this finding, process stage 184 may also generate a rule specifying that a cardholder should be queried as to whether he/she can confirm making each "card present" transaction within 10 miles and 3 hours of the suspect transaction. As another example, process stage 184 may determine that a merchant using a billing alias different from its legal and/or commonly-known name (e.g., by at least some threshold level of similarity, as measured by number of similar characters, order of characters, etc.) is probative of whether the cardholder authorized a transaction associated with that billing alias. Based upon this finding, process stage 184 may generate a rule specifying that a cardholder should be queried as to whether he/she is aware of a billing alias used for a suspect transaction if that billing alias is sufficiently different from the legal/common name of the merchant.

At process stage 186, the rules generated or updated at process stage 184 may be applied to first account data 190. The first account data 190 may be associated with a particular cardholder, such as a cardholder associated with a particular one of cardholder computing devices 20, for example. The types of data included in first account data 190 may depend upon which types of data were determined, by process stage 184, to be relevant to developing dispute resolution queries. Process stage 186 may generate a set of one or more queries in accordance with the rules and the contents of first account data. Some specific examples of rules that may be generated by process stage 184 and applied at process stage 186, and the queries that may be generated as a result, are described below in connection with FIG. 4E.

At a process stage 192, the generated queries may be sent to the cardholder in one or more of various ways, such as sending the queries via SMS text message and/or email, and/or via a web browser or dedicated application executing on the one of cardholder computing devices 20 that is associated with the cardholder, for example. At a process stage 194, responses to the queries are received from the cardholder (e.g., via inputs made by the cardholder via the web browser or application, or a responsive SMS text message or email, etc.). In some embodiments, the rules generated or updated at process stage 184 specify the manner in which follow-up queries should be generated based upon the responses received at process stage 194, and process stages 192 and 194 may be repeated multiple times.

Figure 3E:
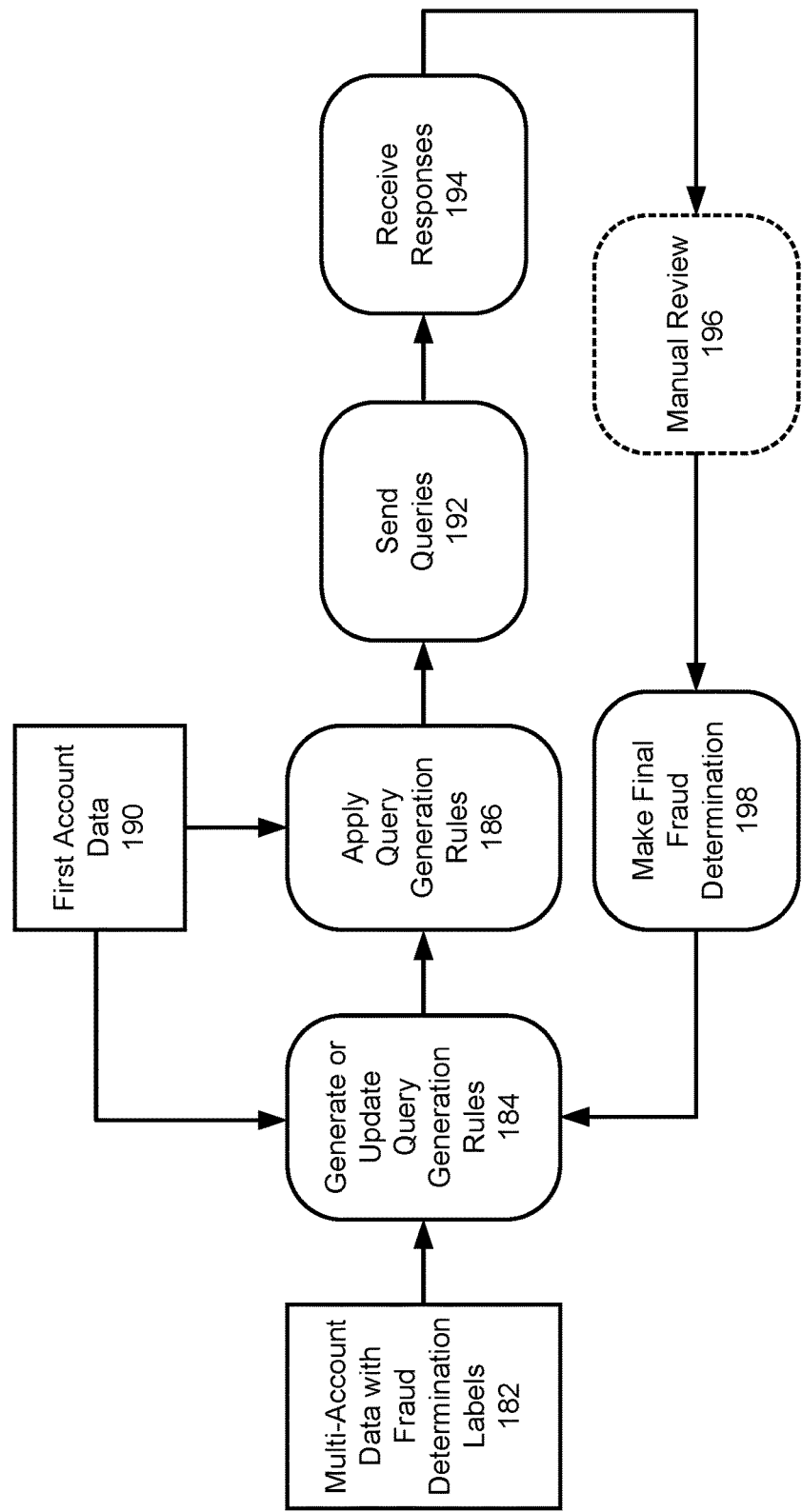
Figure 3F:
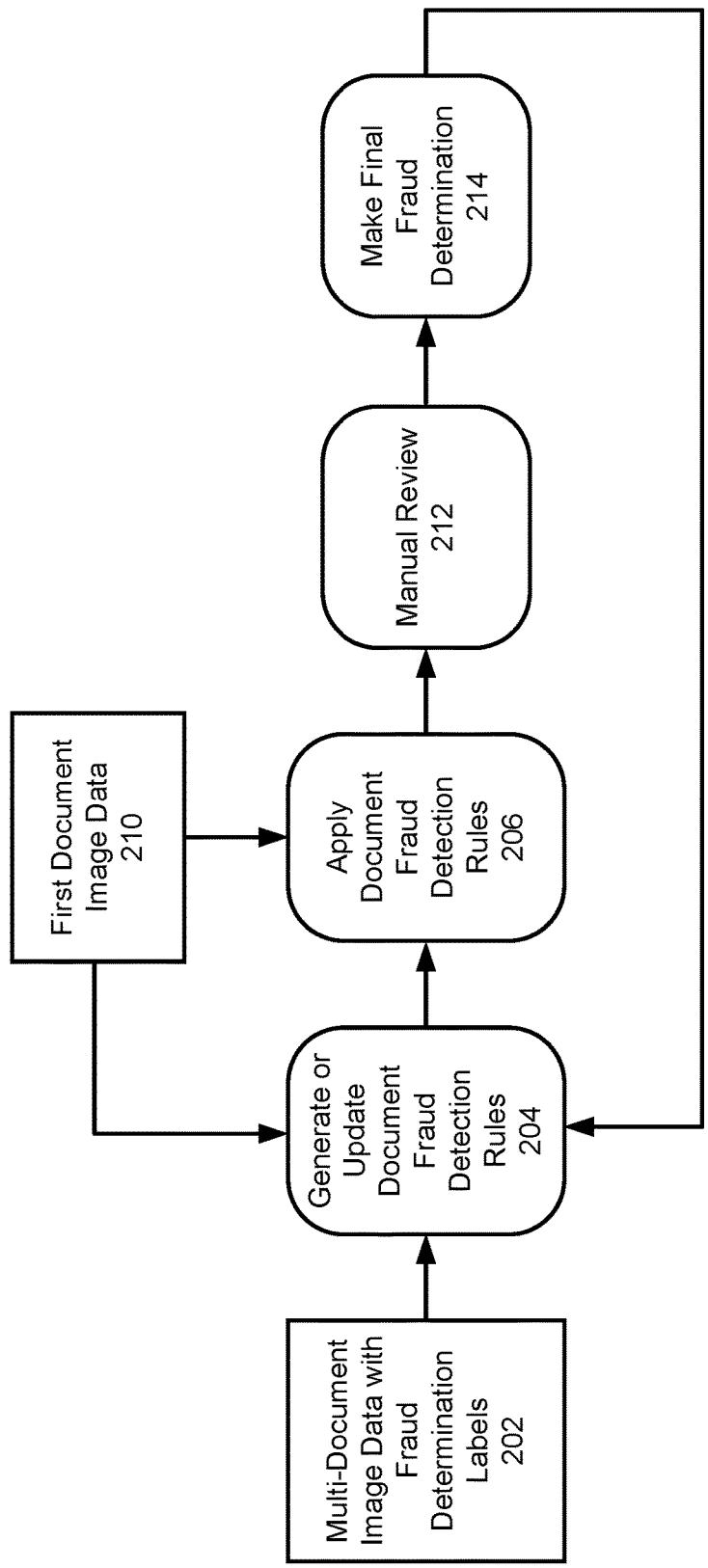

In some embodiments, further analysis (e.g., a manual review, or further automated review using additional data sources, etc.) that makes use of the received responses is performed at an additional stage, shown in dashed lines in FIG. 3E as process stage 196. The additional analysis may then be used to make a final fraud determination (e.g., a final decision on whether fraud occurred, and/or on the type of fraud that occurred) at process stage 198. In other embodiments, process stage 196 is omitted from process flow 180, and process stage 198 is based upon information from the cardholder. For example, the questions generated at process stage 192 may "jog" the cardholder's memory, and cause him or her to indicate that the transaction at issue was authorized. The final determination made at process stage 198, along with the first account data 110 (and any other data used at process stage 196), the queries generated at process stage 186 and/or the responses received at process stage 194, may be fed back into process stage 184 to provide additional labeled data for purposes of updating the rules.

F. Exemplary Process Flow for Machine Learning of Document Fraud Detection Rules Referring now to FIG. 3F, an exemplary process flow 200 may generally be used to detect fraud relating to documents, such as counterfeit and/or forged documents. The process flow 200 may be used in connection with various kinds of documents, such as checks (e.g., personal checks, cashier's checks, etc.), money orders, treasury bills, identification documents (e.g., social security cards, driver's licenses, passports, birth certificates, etc.), certification documents, and so on.

In the process flow 200, multi-document image data 202 may represent digital images of a number (e.g., thousands) of physical documents of one or more types. The multi-document image data 202 may include images in one or more formats, such as raster formats (e.g., JPEG, TIFF, GIF, BMP, PNG, etc.) and/or vector formats (e.g., CGM, SVG, etc.), for example. The multi-document image data 202 may include data obtained (e.g., by external data collection unit 42 of FIG. 1) from merchant computing systems 22 (e.g., point-of-sale devices with cameras for document identification) and/or from FAMS 14 (e.g., images of personal checks), for example. In some embodiments, the multi-document image data 202 may only include data representing images that customers (or other individuals associated with the documents) have expressly consented to share (e.g., as a prerequisite to making a purchase, or in exchange for fraud protection services, etc.).

As described above in connection with multi-account data 82 of process flow 80, the multi-document image data 202 may be associated with multiple fraud determination labels. In some embodiments, each label may be associated with data representing a digital image of a particular document. The labels may include final fraud determinations (e.g., "fraud" or "no fraud," or more complex labels such as "forgery," "counterfeit," "forgery—signature," "counterfeit—angular line offset(s) outside tolerance," etc.) that were made via earlier iterations of the process flow 200, and/or external to the process flow 200. Multi-document image data 202 may include many (e.g., thousands) of positively and negatively labeled data sets.

At a process stage 204, the multi-document image data 202 may be analyzed to generate document fraud detection rules (e.g., to be stored in ML rules database 58). As described above in connection with process stage 84 of process flow 80, any suitable type of supervised machine learning program/technique(s) may be used. Generally, process stage 204 may serve to identify which characteristics of a document are probative of whether the document is counterfeit, and to determine the ranges, tolerances, etc., that are probative of whether the document is counterfeit. In some embodiments, process stage 204 also, or instead, identifies which characteristics of information entered in document fields are probative of whether the document was forged (e.g., drafted or populated by someone other than the person purported to have drafted or populated the document).

At process stage 206, the rules generated or updated at process stage 204 may be applied to first document image data 210. The first document image data 210 may be digital image data corresponding to a particular, physical document. The first document image data 210 may include information obtained (e.g., by external data collection unit 42) from one of merchant computing systems 22 (e.g., for real-time verification of an identification or other document presented during or prior to a sale), or from FAMS 14 (e.g., for real-time or batch-processing verification of a personal check prior to clearing the check), for example. Some specific examples of rules that may be generated by process stage 204, and applied at process stage 206, are described below in connection with FIG. 4F.

Process stage 206 may output information indicating whether fraud is suspected in connection with the document corresponding to first document image data 210. For example, process stage 206 may output two percentage probabilities calculated according to the rules generated or updated at process stage 204, with the first indicating the likelihood that the document is counterfeit and the second indicating the likelihood that the document includes forged content. As another example, process stage 206 may output binary indicators of whether the document likely is, or likely is not, counterfeit and/or includes forged content (e.g., by comparing percentage probabilities to threshold probabilities).

In some embodiments, further analysis (e.g., a manual review, or further automated review using additional data sources, etc.) may be performed at a process stage 212. The additional analysis may then be used to make a final fraud determination (e.g., a final decision on whether the document is fraudulent) at process stage 214. For example, the process stage 206 may act as a filter, and flag only those documents having a relatively high probability of being fraudulent. In this manner, a considerably smaller amount of human and/or processing resources may be consumed at process stage 212.

The final determination made at process stage 214, along with the first document image data 210 used to make that determination, may be fed back into process stage 204 to provide additional labeled data for purposes of updating the rules. In some embodiments, a preliminary fraud determination made at process stage 206 may also be fed back into process stage 204, to allow the machine learning program to determine and improve upon past performance/accuracy.

IV. Exemplary Rules for Fraud Detection and/or Classification

FIGS. 4A-4F depict exemplary factors and algorithms that may be used in connection with various fraud detection and/or classification rules, according to different embodiments. It is noted that the rule sets corresponding to FIGS. 4A-4F are purely for purposes of illustration and are not limiting. Particularly in embodiments where machine learning is utilized, for example, the algorithms and/or factors may be far more complex, and/or less intuitive, than some or all of the examples shown in FIGS. 4A-4F.

A. Exemplary Fraud Detection Rule Set Using Online Activity

Referring first to FIG. 4A, an exemplary rule set 220 (e.g., generated at process stage 104 of FIG. 3A) may use various factors relating to online activity of a cardholder to detect fraud in connection with a particular credit or debit card transaction. The rule set 220 may correspond to a particular embodiment and scenario in which the transaction at issue is a "card present" transaction, and in which the rule set 220 seeks to determine whether the cardholder made or otherwise authorized the transaction. The rule set 220 may be incorporated into a review process that is generally applied to all transactions, a review process applied only to those transactions that were flagged by a preliminary fraud alert, or a review process applied only after a cardholder reports the transaction as unauthorized, for example.

The factors considered under the rule set 220 may include a number of interest-based factors 222 and a number of location-based factors 224. The interest-based factors 222 may relate to the cardholder's interest (or non-interest) in a product or service purchased via the transaction, and/or the merchant providing the product or service, while the location-based factors 224 may relate to the cardholder's location or probable location.

As seen in FIG. 4A, the interest-based factors 222 may include: (1) whether the cardholder searched online for the specific product or service purchased via the transaction at issue (e.g., by determining whether search terms entered by the cardholder included the name of the product or service involved in the transaction, or included a description of the product or service, etc.); (2) whether the cardholder visited a website associated with the merchant (e.g., by comparing URLs of websites visited by the cardholder to a known URL of the merchant's website, or by searching the contents of websites visited by the cardholder for the merchant's name, etc.); (3) whether the cardholder endorsed the merchant, or the product or service provided by the merchant, via a social media account of the cardholder (e.g., by determining whether the cardholder "liked" the merchant, product or service via his or her Facebook® account, etc.); (4) whether the cardholder visited a website associated with a competitor of the merchant (e.g., by comparing URLs of websites visited by the cardholder to known URLs of known competitors' websites, or by searching the contents of websites visited by the cardholder for the competitors' names, etc.); (5) whether the cardholder searched online for a different product or service in the same price range as the transaction amount (e.g., by analyzing search terms and/or results, and/or by analyzing URLs or contents of websites visited by the cardholder and comparing prices of products/services, etc.); and/or (6) whether the cardholder entered search terms indicative of the cardholder's need for the product or service (e.g., by determining that the cardholder entered search terms including "pipe leak" prior to the purchase of new plumbing hardware, or "computer repair" prior to the purchase of a new hard drive, etc.). In other embodiments, the interest-based factors 222 may include more, fewer and/or different factors than those shown in FIG. 4A.

As is also seen in FIG. 4A, the location-based factors 224 may include: (1) whether the cardholder "checked in" to a flight having a destination near the location where the transaction was initiated (e.g., by determining whether the cardholder checked in to a flight having a destination at the city in which the transaction occurred, or within a threshold number of miles of the city in which the transaction occurred, etc.); (2) whether the cardholder visited a website associated with a place near (or in) which the transaction was initiated (e.g., by comparing URLs of websites visited by the cardholder to URLs of websites known to be associated with particular areas, and/or by searching the contents of websites visited by the cardholder for location or area names, etc.); and/or (3) whether the cardholder endorsed a place near (or in) which the transaction was initiated via a social media account of the cardholder (e.g., by determining whether the cardholder "liked" the geographic area, attraction or other place via his or her Facebook® account, etc.). In other embodiments, the location-based factors 224 may include more, fewer and/or different factors than those shown in FIG. 4A.

Generally, the data indicative of whether the circumstance corresponding to each of interest-based factors 222 and/or location-based factors 224 is present/true for a particular cardholder may be included in the first customer online activity data 110 described above in connection with FIG. 3A. For example, external data collection unit 42 of FIG. 1 may obtain the search terms, URLs, user online selections, etc., needed to determine whether the various factors exist, from the cardholder's computing device (e.g., one of cardholder computing devices 20) and/or from an ISP of other sources 24.

As is also seen in FIG. 4A, each of the interest-based factors 222 and location-based factors 224 may be associated with a particular score or weighting value. In the rule set 220 shown in FIG. 4A, a total score may be calculated based upon which factors are, or are not, present (e.g., add 94 points if it is determined that the cardholder searched for the particular lawnmower model that was purchased, add another 80 points if the transaction was a "card present" transaction in the Chicago suburb of Joliet and the cardholder checked in to a flight to Chicago just prior to the transaction, etc.).

In some embodiments, certain factors may instead be associated with negative scores (e.g., minus 80 if the cardholder checked in to a flight with a destination at least 200 miles from the site of the transaction and within one day of the transaction, etc.). Moreover, certain factors may be associated with metrics or algorithms that determine how heavily those factors are weighed. As indicated in FIG. 4A, for example, search terms entered by the cardholder may be used to calculate a "need score" X (e.g., where X is based upon frequency of certain search terms being used, the amount of time spent clicking through search results, the magnitude and/or urgency of a problem indicated by the search terms, etc.), with X then being used to calculate a score equal to 0.2X.

The rule set 220 may then output the total score (e.g., 94+80=+174), a normalized total score, an indication of whether the total score exceeded a threshold (e.g., a threshold of +100), a probability calculated based upon the total score, and/or some other indicator or measure of the existence or likelihood of fraud. In the example shown in FIG. 4A, it can be seen that larger scores generally correspond to a greater probability that the transaction was made or authorized by the cardholder. If the transaction is being automatically reviewed (e.g., to determine whether a fraud alert is appropriate, without any initial input from the cardholder), this may mean that a lower score corresponds to a higher probability of fraud. Conversely, if the cardholder had reported the transaction as being fraudulent, a higher score may correspond to a higher probability of fraud (i.e., fraud on the part of the cardholder).

In some embodiments, the rule set 220 may also include one or more other types of factors not necessarily based upon online activities of the cardholder (e.g., whether GPS of the cardholder's smartphone or vehicle indicates that he or she was in that area shortly before or after the transaction, etc.), and/or may omit either interest-based factors 222 or location-based factors 224.

B. Exemplary Chargeback Candidate Detection Rule Set

Figure 4B:
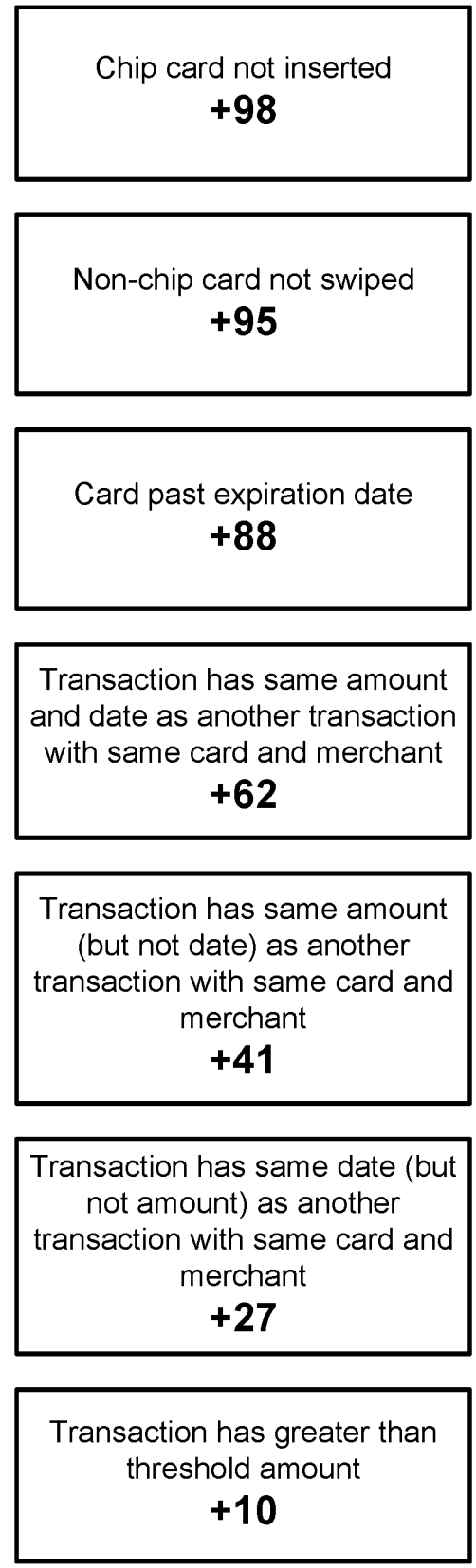

Referring next to FIG. 4B, an exemplary rule set 230 (e.g., generated at process stage 124 of FIG. 3B) may use various factors relating to a transaction between a cardholder and a merchant to determine whether the transaction should be flagged as a candidate for a chargeback (e.g., to determine whether the transaction should be reviewed under a full set of chargeback rules associated with the appropriate card network entity). The rule set 230 may correspond to a particular embodiment and scenario in which the transaction at issue is a "card present" transaction.

As seen in FIG. 4B, the factors considered under the rule set 230 may include: (1) whether an EMV chip card was not inserted in a point-of-sale EMV chip reader device of the merchant; (2) whether a non-EMV card was not swiped in a point-of-sale device of the merchant; (3) whether the card is past its expiration date; (4) whether the transaction is for the same amount and/or date as another transaction involving the same card and merchant (e.g., by analyzing other transactions involving the same account and merchant within a particular time span); and/or (2) whether the transaction is for greater than a threshold amount. For example, one of merchant computing systems 22 of FIG. 1 (or an acquiring/merchant bank) may provide transaction details that include the amounts, dates, etc., to FAMS 14 for storage in account records database 30, and external data collection unit 42 may then retrieve that information from account records database 30. Generally, the data indicative of whether the circumstance corresponding to each of the factors is present/true for a particular transaction may be included in the first account transaction data 130 described above in connection with FIG. 3B. In other embodiments, the factors considered under rule set 230 may include more, fewer and/or different factors than those shown in FIG. 4B.

It is noted that, in some embodiments, one or more factors may simply relate to the desirability (e.g., from a card issuer perspective) of further reviewing whether a chargeback is appropriate, without necessarily relating to the likelihood that a chargeback is appropriate.

As is also seen in FIG. 4B, each of the factors may be associated with a particular score or weighting value. A total score may be calculated based upon which factors are, or are not, present (e.g., add 62 points if it is determined that the transaction has the same amount and date as another transaction occurring close in time and involving the same card and merchant). In some embodiments, certain factors may instead be associated with negative scores, and/or certain factors may be associated with metrics or algorithms that determine how heavily those factors are weighed.

The rule set 230 may then output the total score, a normalized total score, an indication of whether the total score exceeded a threshold, a probability calculated based upon the total score, and/or some other indicator or measure of the likelihood that a chargeback is appropriate for the transaction. In the example shown in FIG. 4B, it can be seen that larger scores generally correspond to a greater probability that a chargeback is appropriate.

C. Exemplary Fraud Classification Rule Set

Figure 4C:
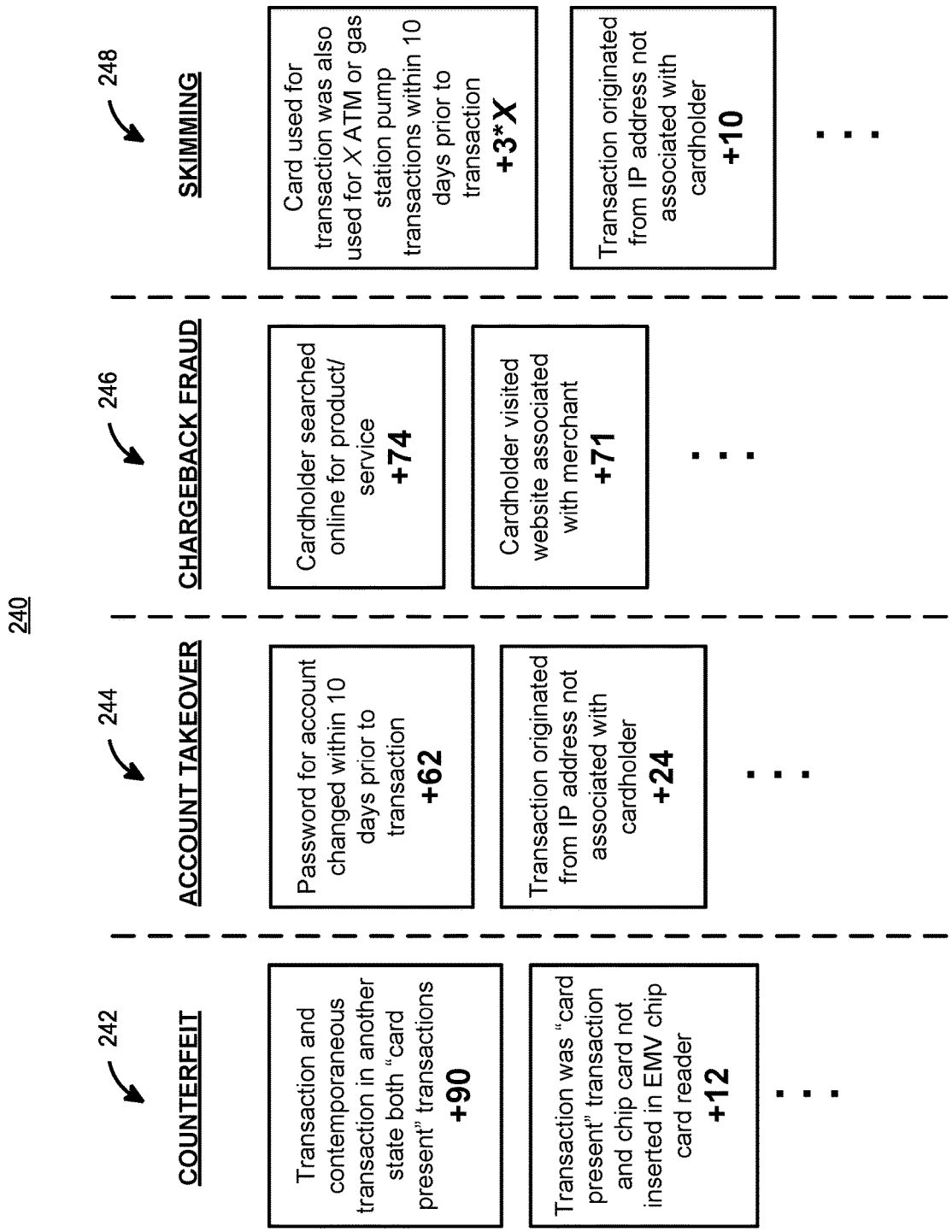

Referring now to FIG. 4C, an exemplary rule set 240 (e.g., generated at process stage 144 of FIG. 3C) may use a diverse array of factors to classify the type(s) of fraudulent activity, if any, that is/are suspected to be associated with an event or series of events. The rule set 240 may correspond to a particular embodiment and scenario in which the event at issue is a financial transaction involving a debit or credit card. In other embodiments and/or scenarios, however, the rule set 240 may classify fraudulent activity with respect to specific other types of events (e.g., loan applications), or may detect a variety of different event types (e.g., various types of financial transactions, loan or credit applications, etc.) and broadly classify fraudulent activity in connection with the detected event types (e.g., lost/stolen card use, application fraud, etc.).

In one embodiment, each potential classification (with the possible exception of "no fraud") may be associated with a number of factors probative of whether that type/class of fraud has occurred. As seen in FIG. 4C, for example, the rule set 240 may include counterfeit factors 242 (e.g., factors indicating that a counterfeit card was used for the transaction), account takeover factors 244 (e.g., factors indicating that the transaction resulted from an unauthorized person gaining online access to the credit or debit card account itself, via phishing, malware or other means), chargeback fraud factors 246 (e.g., factors indicating that the cardholder made or otherwise authorized a purchase that the cardholder later contested) and skimming factors 248 (e.g., factors indicating that the card information used for the transaction was obtained via a skimming card reader device illegally installed in an ATM, gas station pump or other location). In other embodiments, the rule set 240 may also, or instead, include factors corresponding to one or more other fraud classifications (e.g., forgery, lost/stolen card use, etc.).

As seen in FIG. 4C, the counterfeit factors 242 may include: (1) whether the suspect transaction and another, contemporaneous transaction (e.g., occurring within one hour, etc.) in another state are both "card present" transactions; and/or (2) if the suspect transaction is a "card present" transaction, whether the card (if an EMV chip card) was not inserted in an EMV chip card reader. For example, one or more of merchant computing systems 22 of FIG. 1 (or one or more acquiring/merchant banks) may provide transaction details that include whether the transaction was "card present," whether the card was inserted in an EMV chip card reader, etc., to FAMS 14 for storage in account records database 30, and external data collection unit 42 may then retrieve that information from account records database 30. In other embodiments, the counterfeit factors 242 may include more, fewer and/or different factors than those shown in FIG. 4C.

The account takeover factors 244 may include: (1) whether the debit or credit card account password was changed within the 10 days prior to the transaction; and/or (2) whether the transaction was originated from an IP address not associated with the cardholder. For example, external data collection unit 42 may retrieve password change information from account records database 30 of FIG. 1, which may log all password update activity, and/or may retrieve IP address information from one of merchant computing systems 22 (e.g., the computing system of the merchant involved in the transaction). In other embodiments, the account takeover factors 244 may include more, fewer and/or different factors than those shown in FIG. 4C.

The chargeback fraud factors 246 may include: (1) whether the cardholder had searched online for the product or service purchased via the transaction; and/or (2) whether the cardholder had visited a website associated with the merchant involved in the transaction. For example, external data collection unit 42 of FIG. 1 may retrieve online search information (e.g., search terms and/or results) and/or URLs from the one of cardholder computing devices 20 that is associated with the cardholder, and/or from an ISP (of other sources 24) used by the cardholder. In other embodiments, the chargeback fraud factors 246 may include more, fewer and/or different factors than those shown in FIG. 4C.

The skimming factors 248 may include: (1) the number (X) of earlier transactions in which the card used for the transaction at issue was used at an ATM machine or a gas station pump within the 10 days prior to the transaction at issue; and/or (2) whether the transaction at issue originated from an IP address not associated with the cardholder. For example, external data collection unit 42 of FIG. 1 may retrieve transaction data indicating that certain past purchases were made using gas station pump card readers, and/or indicating that the card was used for one or more ATM withdrawals, from account records database 30, and/or may retrieve the originating IP address from the one of merchant computing systems 22 associated with the merchant involved in the transaction at issue. In other embodiments, the skimming factors 248 may include more, fewer and/or different factors than those shown in FIG. 4C.

Generally, the data indicative of whether the circumstance corresponding to each of counterfeit factors 242, account takeover factors 244, chargeback fraud factors 246 and/or skimming factors 248 is present/true for a particular transaction may be included in the first account data 150 described above in connection with FIG. 3C, for example.

As is also seen in FIG. 4C, each of the counterfeit factors 242, account takeover factors 244, chargeback fraud factors 246 and skimming factors 248 may be associated with a particular score or weighting value. The factors for each classification (counterfeit, account takeover, chargeback fraud, skimming) may be used to calculate a total score specific to that classification. In the rule set 240 shown in FIG. 4C, for example, a counterfeit score may be calculated based upon which of factors 242 are, or are not, present, an account takeover score may be calculated based upon which of factors 244 are, or are not, present, and so on. In some embodiments, certain factors may instead be associated with negative scores, and/or certain factors (e.g., the first of skimming factors 248 shown in FIG. 4C) may be associated with metrics or algorithms that determine how heavily those factors are weighed.

For each classification/category, the rule set 240 may output the total score, a normalized total score, an indication of whether the total score exceeded a threshold, a probability calculated based upon the total score, and/or some other indicator or measure of the likelihood that fraud of that particular type/class occurred in connection with the transaction. In the example shown in FIG. 4C, it can be seen that larger scores generally correspond to a greater probability that the respective classification is accurate. Referring back to FIG. 3C, the classification at process stage 152 may be the classification having the highest score and/or probability under rule set 240, or may include the score and/or probability for each classification, the top three classifications, etc.

D. Exemplary Application Fraud Detection Rule Set

Referring now to FIG. 4D, an exemplary rule set 260 may use online search information (e.g., search terms, search results, clicked/selected search results, etc.) to detect whether an application was fraudulent (e.g., not populated and/or submitted by the purported applicant). The rule set 260 may have been generated at process stage 164 of FIG. 3D, for example. The rule set 260 may be incorporated into a review process that is generally applied to all applications received by a particular entity or anti-fraud service, or a review process applied only to those applications that were flagged by a preliminary fraud alert, for example.

The factors considered under the rule set 260 may generally be probative of whether the person that submitted the application (e.g., via a web browser, a dedicated application, as an email attachment, by snail mail, etc.) had performed one or more online searches indicating that he or she was trying to learn more about the purported applicant in order to populate particular fields of the application (e.g., a "home address" field, "employment history" fields, etc.). The "purported applicant" may be a person whose name appears in a name and/or signature field of the application, for example.

As seen in FIG. 4D, the factors of exemplary rule set 260 may include: (1) whether the applicant used search terms that included the name of the purported applicant; (2) whether the search terms also included the words "address" or "residence" (and possibly other synonyms or near-synonyms); and/or (3) whether the search terms also included the words "employer," "job" and/or "career" (and possibly other synonyms or near-synonyms). In other embodiments, the rule set 260 may include more, fewer and/or different factors than those shown in FIG. 4D. For example, the rule set 260 may include one or more factors relating to which search results appeared and/or were selected (e.g., "clicked" on after appearing on a user interface) by the applicant.

Generally, the data indicative of whether the circumstances corresponding to the factors of rule set 260 are present/true for a particular applicant may be included in the first applicant search history data 170 described above in connection with FIG. 3D. For example, external data collection unit 42 of FIG. 1 may obtain the search terms, search results, search result user selections, etc., needed to determine whether the various factors exist, from the applicant's computing device (e.g., similar to one of cardholder computing devices 20) and/or from an ISP of other sources 24. Access to such information may be made a condition of having the application be considered, for example.

As is also seen in FIG. 4D, each of the factors of rule set 260 may be associated with a particular score or weighting value. A total score may then be calculated based upon which factors are, or are not, present. In some embodiments, certain factors may instead be associated with negative scores, and/or certain factors may be associated with metrics or algorithms that determine how heavily those factors are weighed.

The rule set 260 may then output the total score, a normalized total score, an indication of whether the total score exceeded a threshold, a probability calculated based upon the total score, and/or some other indicator or measure of the existence or likelihood of application fraud. In the example shown in FIG. 4D, it can be seen that larger scores may generally correspond to a greater probability that the application was not populated and/or submitted by the purported applicant.

E. Exemplary Fraud Dispute Resolution Rule Set

Figure 4E:
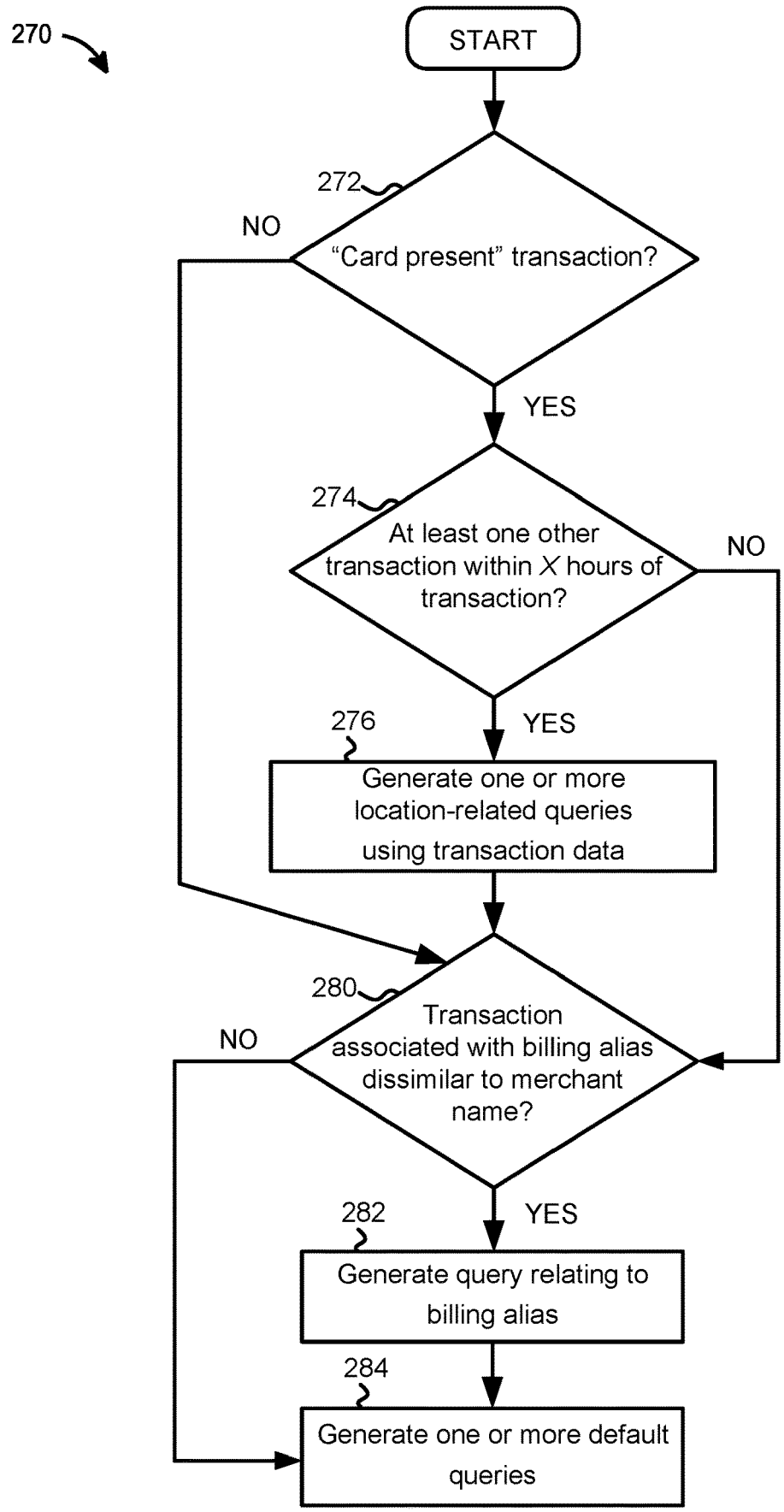

Referring now to FIG. 4E, a flow diagram illustrates at least a portion of a process flow 270 implementing an exemplary rule set for fraud dispute, or potential fraud dispute, resolution (e.g., a rule set generated at process stage 184 of FIG. 3E). The process flow 270 may be used to help resolve a dispute over a contested transaction, or to help a customer recall an unrecognized transaction, for example. FIG. 4E illustrates a process flow, rather than just a set of factors, in order to better illustrate an example process for generating queries based upon the generated rules, according to one embodiment. The process flow 270 may correspond to a particular embodiment and scenario in which the transaction subject to dispute or potential dispute is a credit or debit card transaction.

In the exemplary process flow 270, the rule set may specify that a process stage 272 determines whether the transaction was a "card present" transaction. If not, the rule set may specify that the flow proceed directly to a process stage 280. If so, however, the rule set may specify that the flow instead proceeds to a process stage 274.

The rule set may also specify that process stage 274 determines whether at least one other transaction associated with the cardholder's account occurred within some threshold number of hours (X) of the transaction at issue. If not, the rule set may specify that the flow proceeds directly to process stage 280. If so, however, the rule set may specify that the flow instead proceeds to a process stage 276.

Process stage 276 may generate one or more location-related queries using transaction data associated with the cardholder's account. The queries may ask, for example, whether the cardholder was in (or near) one or more particular geographic areas or locations at various times. If the transaction at issue occurred in San Francisco, for example, with a first other "card present" transaction occurring in Santa Rosa four hours earlier and a second other "card present" transaction occurring in San Jose two hours later, process stage 276 may generate one or more queries asking whether the cardholder made or authorized the earlier and/or later transactions, and/or whether the cardholder traveled on a route from Santa Rosa to San Jose that passed through San Francisco, etc.

In some embodiments, the location-related queries are generated based upon data associated with events or circumstances other than transactions. For example, if the transaction at issue occurred in Sarasota, Florida, and the data considered under the rule set indicates that the cardholder checked in to a flight to Tampa, process stage 276 may generate one or more queries asking whether the cardholder completed the flight, where the cardholder went after landing in Tampa, etc.

The rule set may also specify that process stage 280 determines whether the transaction at issue is associated with a billing alias that is dissimilar to the name of the merchant involved in the transaction. For example, the computing system of the merchant (e.g., one of merchant computing systems 22 of FIG. 1) may have sent to FAMS 14 a transaction record that identified the merchant by the alias, and was presented to the cardholder as an online or paper account statement. The determination at process stage 280 may use the billing alias to identify a legal and/or common name of the merchant (e.g., using a relational database stored in AFSS 12 or FAMS 14), and determine that there is at least some threshold level of dissimilarity (e.g., based upon difference of characters, character ordering, etc.) between the billing alias and the merchant name.

If the billing alias and merchant name are not sufficiently dissimilar, the rule set may specify that the flow proceeds directly to a process stage 284. If sufficiently dissimilar, however, the rule set may specify that the flow instead proceeds to a process stage 282. Process stage 282 may generate a query relating to the billing alias that was presented to the cardholder. For example, the query may ask whether the cardholder is aware that the billing alias is used by that particular merchant. In some embodiments, process stage 282 may instead generate a message that simply informs the cardholder that the billing alias corresponds to the merchant, without posing a question.

The rule set may specify that process stage 284 generates one or more default queries. For example, one default query may ask whether the cardholder lent his or her card to a friend or family member around the time of the transaction. In some embodiments and/or scenarios, process stage 284 may be omitted from process flow 270. Generally, the queries (and possibly non-query messages) generated in process flow 270 may serve to help the cardholder recall whether the transaction was made or authorized, and/or process flow 270 may prompt the cardholder for responses that are considered by others (e.g., personnel of an entity associated with FAMS 14 of FIG. 1) to determine whether the transaction was likely fraudulent.

Although not shown in FIG. 4E, in some embodiments process flow 270 may include a number of iterative stages in which responses are received from the cardholder (e.g., from the respective one of cardholder computing devices 20 in FIG. 1) and used to generate additional, more detailed questions for the cardholder. For example, if a first query asks whether the cardholder recalls personally making another "card present" transaction that occurred at a nearby time and place, and the cardholder responds "no," a new query may be generated asking whether the cardholder recalls personally making the next closest transaction (in terms of time and/or location).

F. Exemplary Document Fraud Detection Rule Set

Referring next to FIG. 4F, an exemplary rule set 290 (e.g., generated at process stage 204 of FIG. 3F) may use various factors relating to an imaged (e.g., photographed or scanned) physical document to determine whether the document should be flagged as a candidate for a more in-depth (e.g., manual) analysis/review for fraud purposes. The rule set 290 may correspond to a particular embodiment and scenario in which the document is one that includes at least a signature field (e.g., a personal check, a driver's license, etc.).

The factors considered under the rule set 290 may include a number of counterfeit factors 292 and a number of forgery factors 294, each of which may be evaluated by image analysis unit 52 of FIG. 1 using one or more image processing techniques. The counterfeit factors 292 may relate to the look, presentation, format and/or structure of the document, while the forgery factors 294 may relate to the substance, style or format of information entered in one or more fields of the document.

As seen in FIG. 4F, the counterfeit factors 292 may include: (1) whether one or more absolute or relative dimensions and/or angles of the document, or of lines, illustrations, patterns, etc. shown on the document (excluding user-entered contents in fields such as the signature line), are outside one or more predetermined tolerances; (2) whether one or more colors on the document are outside a predetermined tolerance (e.g., color/frequency range); (3) whether one or more line thicknesses of the document (excluding user-entered field contents) are outside one or more predetermined tolerances; and/or (4) whether one or more fonts on the document (excluding user-entered field contents) are outside one or more predetermined tolerances. For example, image analysis unit 52 may determine whether the ratio of the document length to the document width is within 0.1% of an expected value. As another example, image analysis unit 52 may determine whether horizontal and vertical lines on the document are within 0.3 degrees of the horizontal and vertical edges of the document, respectively. As yet another example, image analysis unit 52 may determine whether a font used for a field descriptor or other text on the document matches an expected font (e.g., by meeting a similarity threshold measured in any suitable manner). In other embodiments, the counterfeit factors 292 may include more, fewer and/or different factors than those shown in FIG. 4F.

The forgery factors 294 may include: (1) whether a signature entered in a signature field of the document match is outside a predetermined tolerance (e.g., using any suitable signature recognition technique); (2) whether handwriting entered in one or more fields of the document is outside a predetermined tolerance (e.g., by applying a suitable handwriting recognition technique); and/or (3) whether the format of information entered by a user in one or more fields does not match an expected format (e.g., using "9.12.16" rather than the expected "9/12/2016," as established based upon other documents known to have been populated and/or submitted by the purported applicant). In other embodiments, the forgery factors 294 may include more, fewer and/or different factors than those shown in FIG. 4F.

Generally, the data indicative of whether the circumstances corresponding to counterfeit factors 292 and/or forgery factors 294 are present/true for a particular document may be included in the first document image data 210 described above in connection with FIG. 3F. As is also seen in FIG. 4F, each of the counterfeit factors 292 and forgery factors 294 may be associated with a particular score or weighting value. In the rule set 290 shown in FIG. 4F, a total score may be calculated based upon which factors are, or are not, present. In some embodiments, certain factors may instead be associated with negative scores, and/or certain factors may be associated with metrics or algorithms that determine how heavily those factors are weighed.

The rule set 290 may then output the total score, a normalized total score, an indication of whether the total score exceeded a threshold, a probability calculated based upon the total score, and/or some other indicator or measure of the likelihood that the document is fraudulent. Alternatively, the rule set 290 may output a separate total score, normalized score, probability, or other metric, for each of counterfeit factors 292 and forgery factors 294, with the counterfeit metric indicating the likelihood that the document is a counterfeit and the forgery metric indicating the likelihood that the document was fraudulently populated by someone other than the purported person (e.g., by someone other than the person corresponding to the name, signature, address, etc. on the document). In the example shown in FIG. 4F, it can be seen that larger scores generally correspond to a greater probability that the document is fraudulent. In some embodiments, the rule set 290 also includes one or more other types of factors not shown in FIG. 4F, and/or omits either counterfeit factors 292 or forgery factors 294.

V. Exemplary Methods for Fraud Detection & Classification

FIGS. 5-10 depict flow diagrams of various exemplary computer-implemented methods that may be implemented by one or more components of AFSS 12 of FIG. 1. In one embodiment, AFSS 12 implements all of the methods corresponding to FIGS. 5-10. In other embodiments, AFSS 12 implements only a subset (e.g., one, two, etc.) of the methods corresponding to FIGS. 5-10. Each of the methods described below may be implemented by fraud detection/classification unit 36 of FIG. 1, for example.

A. Exemplary False Positive Identification

Figure 5:
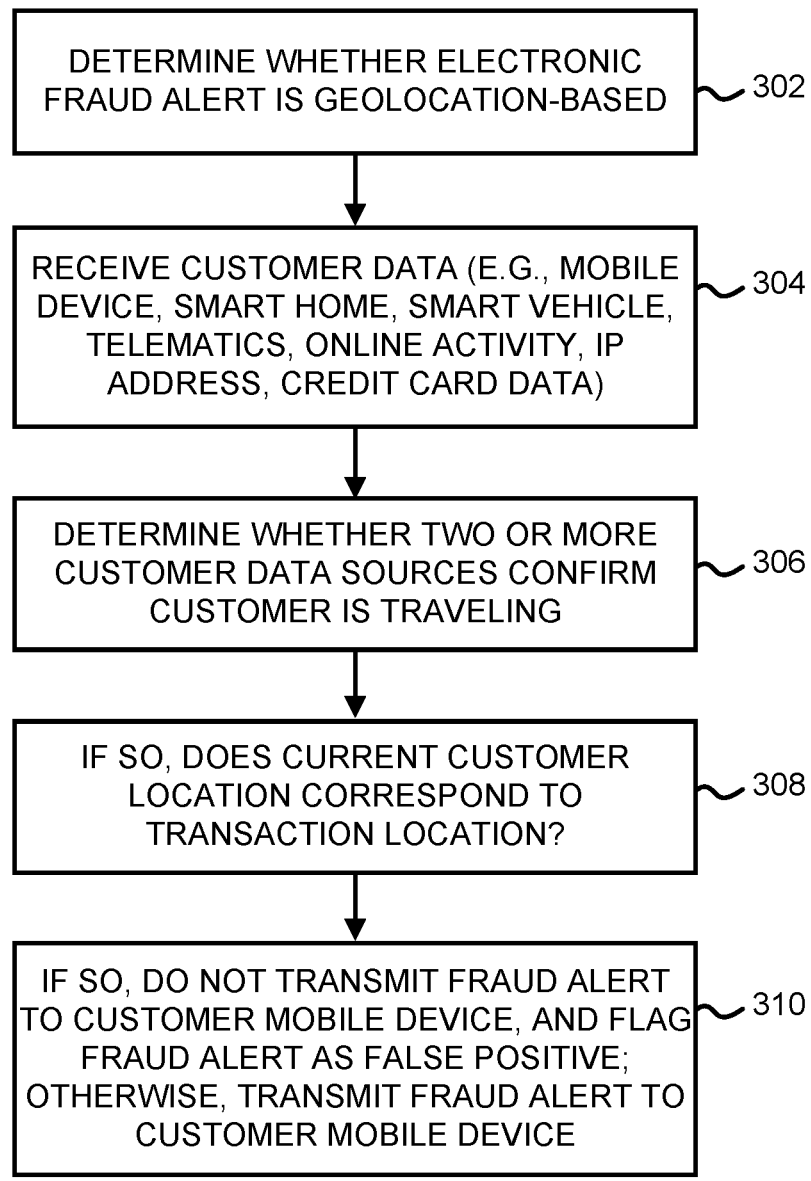
FIGS. 5 and 6 illustrate exemplary computer-implemented methods of using customer data to determine that geolocation-based fraud alerts are false positives, according to different embodiments.

FIG. 5 illustrates an exemplary computer-implemented method 300 of using customer data to determine that geolocation-based fraud alerts are false positives. The method 300 may include, via one or more processors and/or transceivers (or a trained machine learning program), determining whether the electronic fraud alert is geolocation based (block 302), and if so, with customer permission, then receiving customer data (block 304), such as via wireless communication or data transmission over one or more radio links or wireless communication channels. The customer data may be collected or generated via various processors, transceivers, or sensors associated with mobile devices, smart homes, and/or smart vehicles. The customer data may indicate or be associated with telematics, online activity, browsing activity, IP address, credit card, customer location, and/or financial transaction data.

The method 300 may include determining whether two or more of the customer data sources include customer data indicating or confirming that the customer is traveling (block 306). If so, the method 300 may include determining whether the current customer location corresponds to the financial transaction location (block 308). If so, the method 300 may include not transmitting the electronic fraud alert to the customer's mobile device and/or flagging the fraud alert as a false positive; and if not, then transmitting the electronic fraud alert to the customer's mobile device (block 310).

Figure 6:
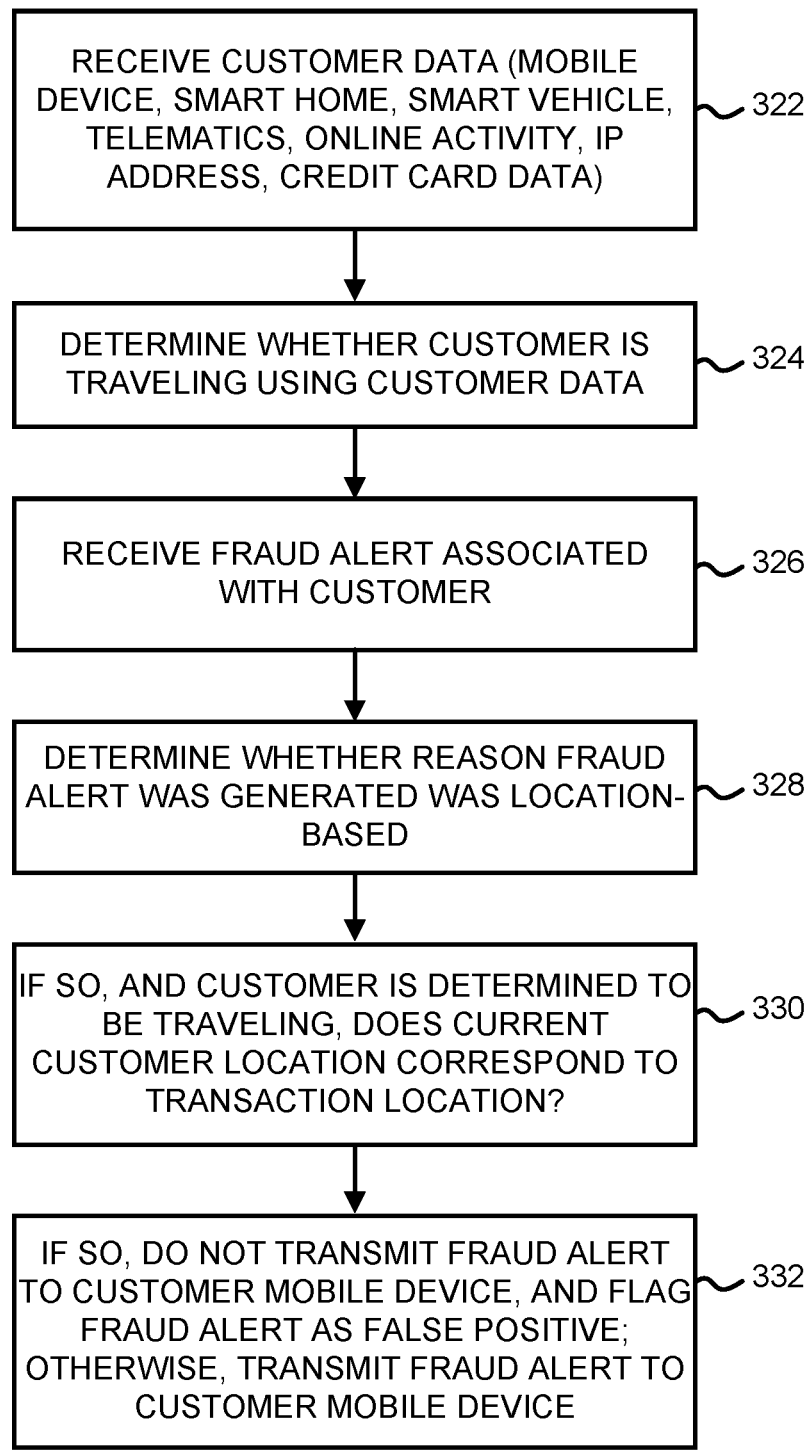

FIG. 6 illustrates another exemplary computer-implemented method 320 of using customer data to determine whether geolocation-based fraud alerts are false positives. The method 320 may include, via one or more processors and/or transceivers, receiving customer data (such as mobile device, smart home, smart vehicle, telematics, online activity, IP address, credit card, location, and/or financial transaction data) (block 322), such as via wireless communication or data transmission over one or more radio links or wireless communication channels. The method 320 may include determining whether the customer is traveling using (or based upon processor analysis of) the customer data (block 324), such as by identifying that the current GPS location of the customer's mobile device and/or vehicle is outside of the customer's home address county or city. The method 320 may include receiving an electronic fraud alert associated with the customer (block 326), such as an alert associated with a potentially unauthorized financial transaction being charged to the customer. The method 320 may include determining whether the reason the electronic fraud alert was generated was location-based (block 328), such as processor or machine learning program determining that a location associated with the financial transaction does not match a home address location or home city of the customer. If so, and if the customer is determined to be traveling, the method 320 may include determining whether the current customer GPS or other location, such as determined from mobile device, IP address, or vehicle location, corresponds to the financial transaction location (block 330). If so, the method 320 may further include not transmitting the electronic fraud alert to the customer's mobile device, and/or flagging the fraud alert as a false positive; and if not, then transmitting the electronic fraud alert to the customer's mobile device (block 332).

In one aspect, a computer-implemented method of using customer data to determine that geolocation-based fraud alerts are false positives may be provided. The method may include (1) determining, via the one or more processors, if an electronic fraud alert is a geolocation-based fraud alert (or otherwise generated based upon an unexpected or abnormal transaction location), such as by inputting the fraud alert and/or financial transaction underlying data into a machine learning program trained to identify geolocation-based fraud alerts; (2) if the electronic fraud alert is geolocation-based, then retrieving or receiving (with customer permission or affirmative consent), via the one or more processors and/or transceivers, two or more sources of customer data over one or more radio frequency links; (3) determining, via the one or more processors, if the customer data from two or more sources indicate or confirm that the customer is traveling (such as not currently at their home address or within a predetermined distance of their home address); (4) if the customer data indicates that the customer is traveling, then determining, via the one or more processors, whether a current customer location indicated by the customer data retrieved matches, or corresponds to, the transaction location; and/or (5) if the current customer location corresponds to the transaction location, then marking, via the one or more processors, the electronic fraud alert as a false positive and not transmitting the electronic fraud alert to a customer mobile device to reduce an amount of false positives that are transmitted to customers.

The method may further include receiving, via one or more processors and/or transceivers, transaction data associated with a financial transaction over a wireless communication channel; and inputting, via the one or more processors, the transaction data into a rules-engine to identify the financial transaction as potentially fraudulent and generate an electronic fraud alert. The customer data may be collected or generated by a mobile device and/or mobile device sensors, and include one or more current or past GPS locations.

The customer data may be collected or generated by a vehicle controller or processor and/or vehicle-mounted sensors, and include one or more current or past GPS locations. The customer data may be collected or generated by a smart home controller and/or home-mounted sensors, and include data indicating whether or not a home of the customer is presently occupied or vacant, and/or how long the home has been vacant. The customer data may include an IP address of a customer computing device, and include one or more current or past GPS locations. The customer data may include online, browsing, and/or social media activity received from a customer computing device. Additionally or alternatively, the customer data may include vehicle telematics data that includes one or more past or current GPS locations.

If the current customer location does not match or correspond to the transaction location, then the method may include marking, via the one or more processors, the electronic fraud alert as verified and transmitting the electronic fraud alert to a customer mobile device to facilitate sending only confirmed fraud alerts to customers. The fraud alert may be determined to be geolocation-based when a financial transaction location is not within a predetermined distance of a customer home address. Additionally or alternatively, the fraud alert may be determined to be geolocation-based when a financial transaction location does not correspond to normal travel activity or locations frequented by, or associated with, the customer.

In another aspect, a computer system configured to use customer data to determine that geolocation-based fraud alerts are false positives may be provided. The computer system may include one or more processors and/or transceivers configured to: determine if an electronic fraud alert is a geolocation-based fraud alert (or otherwise generated based upon an unexpected or abnormal transaction location); if the electronic fraud alert is geolocation-based, then retrieve or receive (with customer permission or affirmative consent) via wireless communication or data transmission two or more sources of customer data over one or more radio frequency links or wireless communication channels; determine if the customer data from two or more sources indicate or confirm that the customer is traveling (such as not currently at their home address or within a predetermined distance of their home address); if the customer data indicates that the customer is traveling, then determine whether a current customer location indicated by the customer data retrieved matches, or corresponds to, the transaction location; and/or if the current customer location corresponds to the transaction location, then mark the electronic fraud alert as a false positive and not transmit the electronic fraud alert to a customer mobile device to reduce an amount of false positives that are transmitted to customers.

B. Exemplary Use of Cardholder Location to Identify or Prevent Fraud

Figure 7:
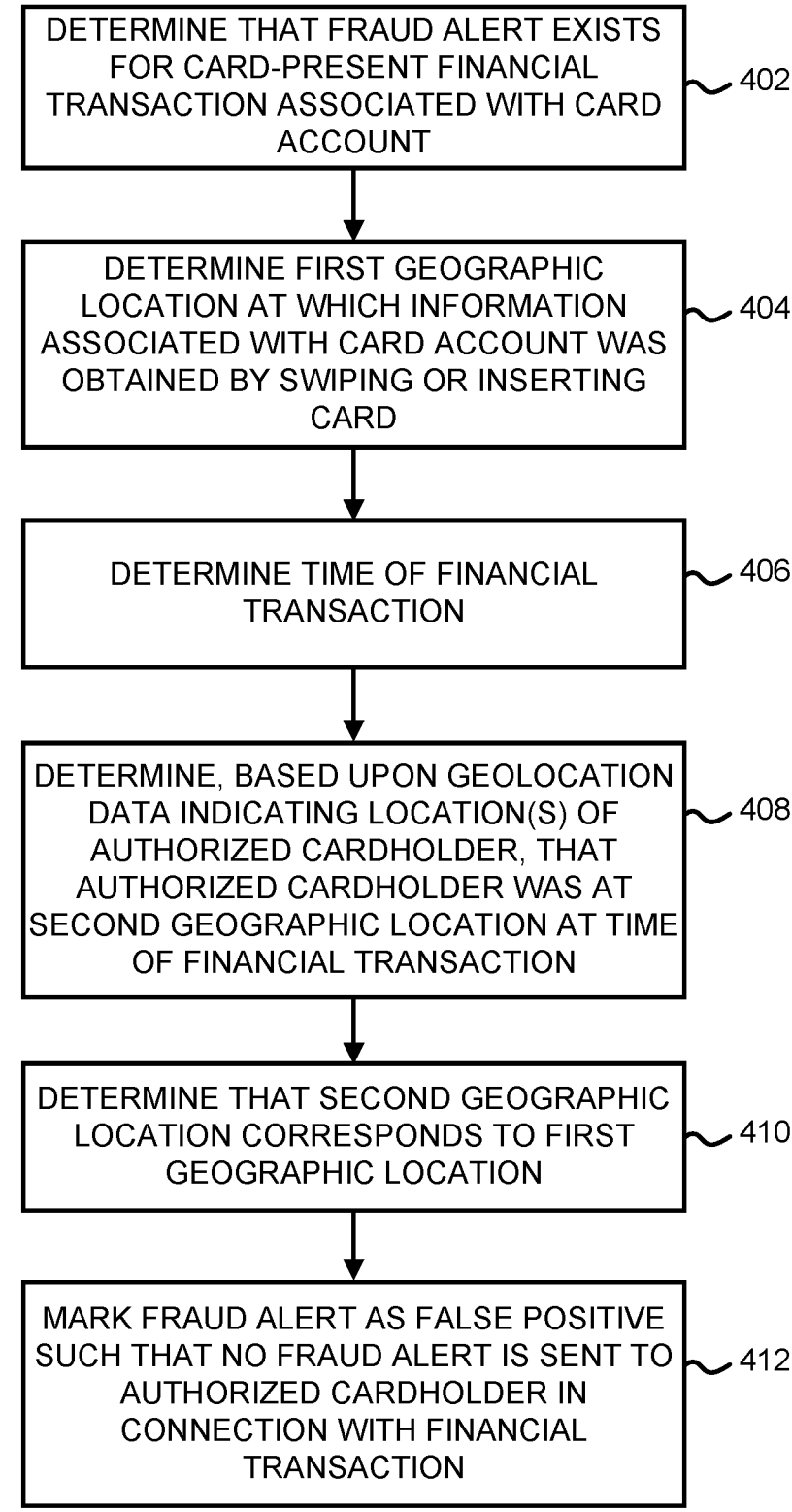
FIGS. 7 through 10 illustrate exemplary computer-implemented methods of using information about the locations of authorized cardholders to prevent false positive fraud alerts, or to block potentially fraudulent financial transactions, according to different embodiments.
Figure 8:
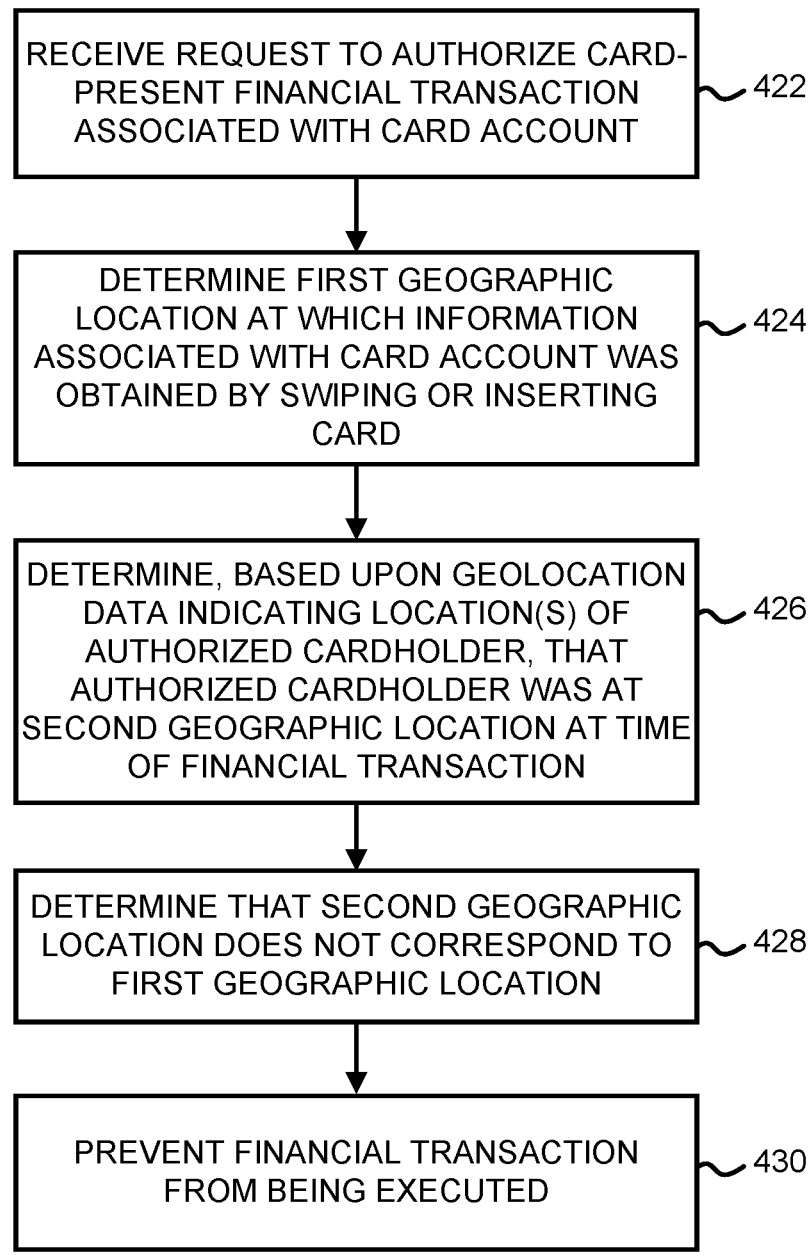

FIGS. 7 through 10 illustrate exemplary computer-implemented methods that use information about the locations of authorized cardholders (e.g., the primary cardholder, or another individual listed on the account) to prevent false positive fraud alerts, or to block potentially fraudulent financial transactions. FIGS. 7 and 8 correspond to card-present financial transactions (e.g., where an individual swipes the card or inserts the card in a chip reader, or where a merchant does so on behalf of that individual after being handed the card), and FIGS. 9 and 10 correspond to online financial transactions (e.g., where an individual types card information into a website page configured to accept such information in connection with a desired transaction). The methods of FIGS. 7 through 10 may be implemented by a card issuer/bank or by another entity (e.g., by an entity associated with FAMS 14 or AFSS 12 of FIG. 1), for example.

Figure 9:
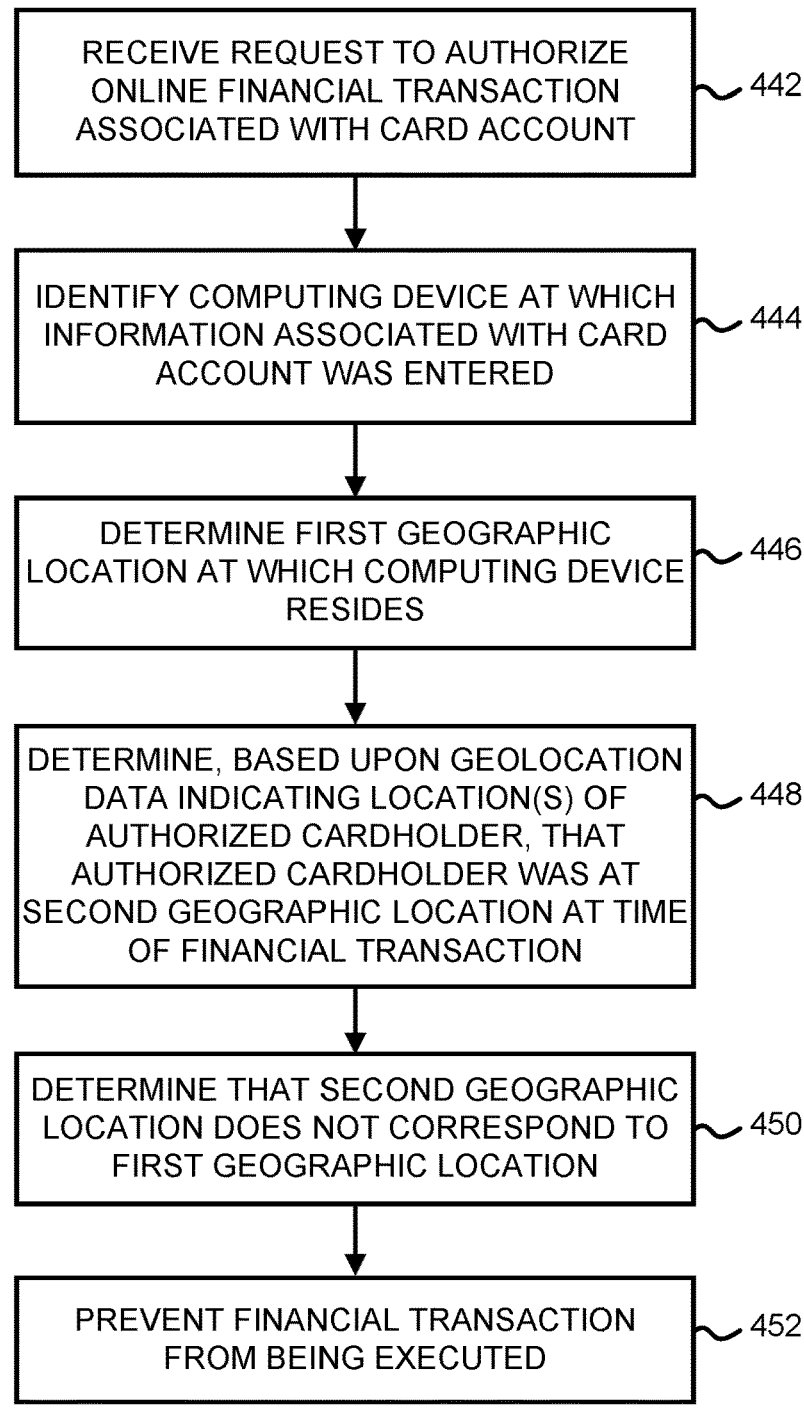
Figure 10:
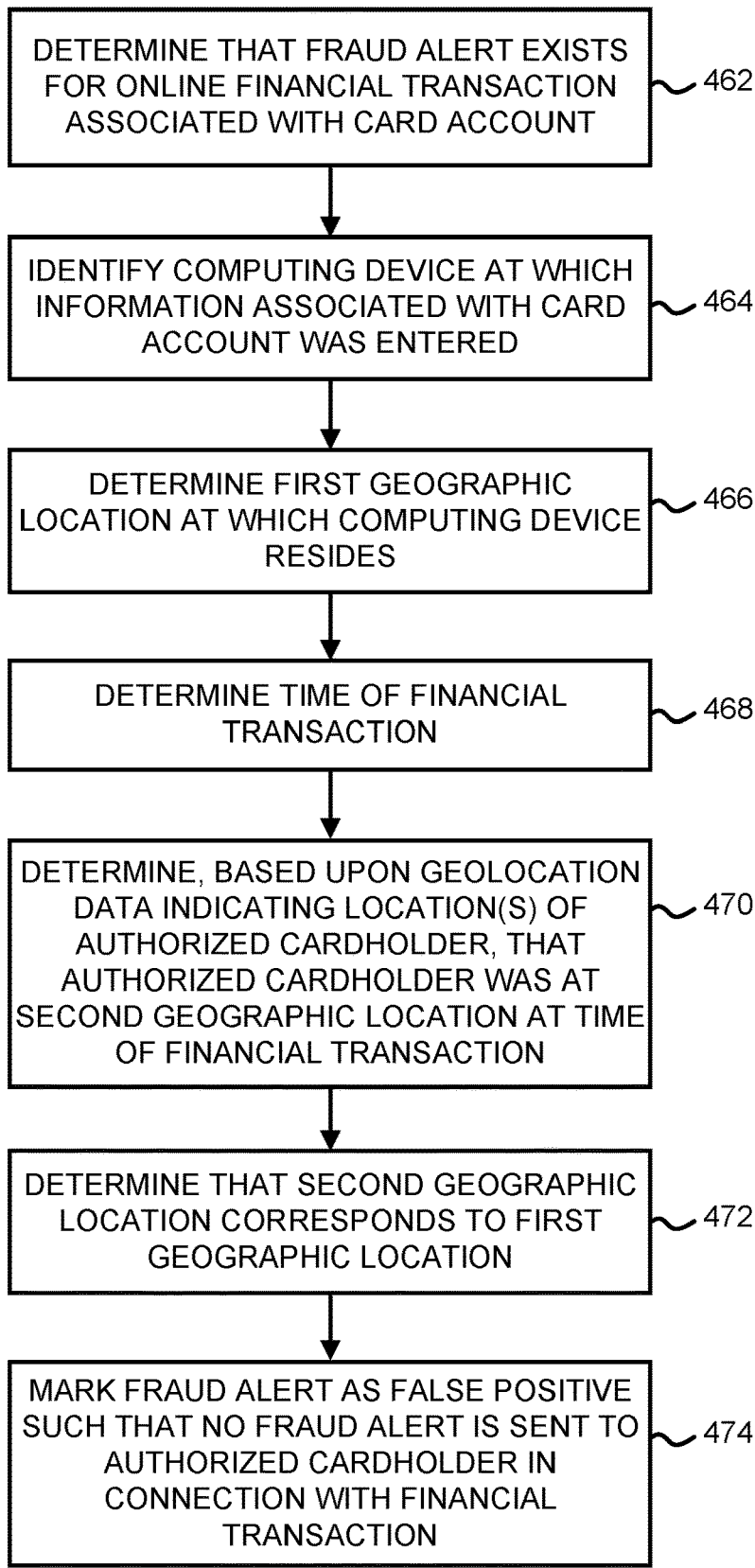

Generally, the methods of FIGS. 7 and 10 may provide the benefit of avoiding unnecessary network communications and/or computer processing associated with false positive fraud alerts, while the methods of FIGS. 8 and 9 may provide the benefit of avoiding fraudulent transactions in the first instance, without requiring more cumbersome and/or time-consuming techniques (e.g., sending an authorization code to the authorized cardholder to verify a suspicious transaction). Moreover, all of the methods in FIGS. 7 through 10 may more accurately detect fraud by using the geographic location of the authorized cardholder in conjunction with the location of the transaction or the location of the computer used to enter card information. For example, while a $30 gas purchase 50 miles from the authorized cardholder's home may not look suspicious to a fraud detection algorithm, the transaction may become much more suspect if the cardholder is 10 miles away from that gas station at the time of the purchase. Similarly, an online purchase for an item that the authorized cardholder has often bought in the past may not look suspicious to some fraud detection algorithms, but may become much more suspect if the authorized cardholder was, at the time the card information was entered at a computer, located a significant distance away from that computer. Further, the methods of FIGS. 7 through 10 may detect and/or prevent fraudulent transactions even when the physical debit or credit card has been stolen (as opposed to only copying down the card number or "skimming," etc.).

Referring first to FIG. 7, in an exemplary computer-implemented method 400, it may be determined that a fraud alert exists for a financial transaction (block 402). The fraud alert may be an electronic fraud alert generated by the device or system implementing the method 400, or received from another device or system (e.g., from a card issuer system, such as FAMS 14 of FIG. 1, via a network such as network 26 of FIG. 1), for example. The financial transaction may be a card-present transaction that is associated with a debit or credit card account, and was purportedly entered into by an authorized cardholder associated with the account.

A first geographic location, at which information associated with the account was obtained, may be determined (block 404). The information associated with the account may have been obtained by swiping or inserting the card in a device (e.g., part of one of merchant computing systems 22 of FIG. 1) in connection with the financial transaction, for example. In some embodiments and/or scenarios, the first geographic location may be identified based upon location information included in a field of transaction data associated with the financial transaction, such as transaction data that was retrieved from an account records database (e.g., database 30 of FIG. 1).

In some embodiments and/or scenarios, block 404 may occur prior to block 402, in which case block 402 may include comparing the first geographic location to a set of one or more locations known to be typical or expected for the authorized cardholder (e.g., a home address, city and/or state), and/or may include generating the fraud alert in response to determining that the first geographic location does not correspond to (e.g., is not at, or not within a threshold distance of) the set of typical/expected locations.

The time of the financial transaction may also be determined (block 406). In some embodiments and/or scenarios, the time may be identified based upon time information (e.g., a time stamp) included in a particular field of transaction data associated with the financial transaction, such as the transaction data described above.

It may also be determined, based upon geolocation data indicating one or more geographic locations of the authorized cardholder (e.g., over a period of time), that the authorized cardholder was at a second geographic location at the time of the financial transaction (block 408). The geolocation data may be time-stamped data received from a third party server with the express consent of the authorized cardholder, or retrieved from a database in which the data was stored (with the cardholder's express consent) after being received from a mobile device of the cardholder, for example. The geolocation data may include GPS data (e.g., collected by a smartphone or other mobile device of the authorized cardholder), data indicating identifiers and/or signal strengths of WiFi access points that were near the cardholder (e.g., collected by a smartphone or other mobile device of the authorized cardholder), data indicating that the authorized cardholder had "checked in" at a particular location (e.g., via a social media or other application), data indicating that the authorized cardholder used a smart appliance at a known location (e.g., at the cardholder's home), and/or other types of data indicative of the cardholder's locations at particular times. The location of the cardholder at the time of the financial transaction may be determined by matching a time-stamp to the time determined at block 406, using a location with a time-stamp that corresponds to a nearest time (e.g., so long as that time is within some threshold time of the time determined at block 406), or in another suitable manner.

It may then be determined that the second geographic location corresponds to the first geographic location (block 410). For example, it may be determined at block 410 that the first and second geographic locations are the same (e.g., the same city), are within a same geographic territory (e.g., cities within the same state), or are within a threshold distance of each other (e.g., cities or more precise locations within 50 miles of each other, 100 miles of each other, etc.).

In response to the determination at block 410, the fraud alert may be marked as a false positive (block 412), such that no fraud alert is sent to the authorized cardholder in connection with the financial transaction. For example, a "verified" flag or field associated with the fraud alert may be set to a value of "0" or "false" at block 412, and a notification unit (e.g., notification unit 56 of FIG. 1) may decide not to send the fraud alert to the authorized cardholder's mobile device and/or other computing device (e.g., as an email or text message) based upon the flag or field value.

Referring next to FIG. 8, in an exemplary computer-implemented method 420, a request to authorize a financial transaction may be received (block 422). The financial transaction may be a card-present transaction that is associated with a debit or credit card account, and is purportedly being entered into by an authorized cardholder associated with the account. As will be understood from the description that follows, the financial transaction, in the method 420, is one that has not yet been fully executed. The request may have been automatically or manually generated by the card issuer when deciding whether to clear the transaction, or automatically or manually generated by a merchant shortly after receiving credit card information (e.g., by a swipe or insertion of the card), for example. The request may include the credit card information (e.g., credit card number, expiration date and/or security code) and/or other information relating to the financial transaction.

A first geographic location, at which information associated with the account was obtained (e.g., by swiping or inserting the card in connection with the financial transaction), may be determined (block 424). Block 424 may be similar to block 404 of the method 400, for example. In some embodiments and/or scenarios, however, the first geographic location is determined by identifying the location as specified in the request received at block 422.

It may also be determined, based upon geolocation data indicating one or more geographic locations of the authorized cardholder, that the authorized cardholder was at a second geographic location at the time of the financial transaction (block 426). The geolocation data and/or the source of such data may be similar to that described above in connection with block 408 of the method 400, for example. In some embodiments and/or scenarios, however, the geolocation data may not be time-stamped, or such time stamps may exist but not be utilized. For example, it may be known that the financial transaction is currently in process, and therefore the second geographic location may be the current location of the authorized cardholder.

It may then be determined that the second geographic location does not correspond to the first geographic location (block 428). For example, it may be determined at block 428 that the first and second geographic locations are not the same (e.g., not the same city), are not within a same geographic territory (e.g., not cities within the same state), or are not within a threshold distance of each other (e.g., not cities or other, more specific locations within 50 miles of each other, 100 miles of each other, etc.).

In response to the determination at block 428, the financial transaction may be prevented from being executed (block 430). If the method 420 is implemented by a computing system of the card issuer, for example, block 430 may include not clearing the financial transaction. As another example, a merchant terminal (e.g., part of one of merchant computing systems 22 of FIG. 1) sending the request received at block 422 (or that is otherwise associated with the financial transaction) may be sent a fraud alert indicating that the transaction may be fraudulent and/or should not be completed. In yet another example embodiment, the fraud alert may be sent to a computing system of the card issuer (e.g., if the request received at block 422 was received from such a computing system).

Referring next to FIG. 9, in an exemplary computer-implemented method 440, a request to authorize a financial transaction may be received (block 442). The financial transaction may be an online transaction that is associated with a debit or credit card account, and is purportedly being entered into by an authorized cardholder associated with the account. As with the method 420, the financial transaction, in the method 440, is one that has not yet been fully executed. The request may have been automatically or manually generated by the card issuer when deciding whether to clear the transaction, or automatically or manually generated by a merchant shortly after receiving credit card information (e.g., shortly after the merchant computing system received credit card information that was manually entered by a person purporting to be the authorized cardholder), for example. The request may include the credit card information (e.g., credit card number, expiration date and/or security code) and/or other information relating to the financial transaction.

A computing device at which information associated with the card account (e.g., the card number, expiration date, and/or three- or four-digit security code) was entered in connection with the financial transaction may be identified (block 444). The computing device may be identified by receiving an IP address of the computing device from the computing system of the merchant associated with the financial transaction (either directly, or via the card issuer), for example.

A first geographic location, at which the computing device identified at block 444 resides, may be determined (block 446). In some embodiments and/or scenarios, the first geographic location is determined by using the IP address of the computing device. For example, the IP address itself may indicate physical location (at a high level of generality), or the IP address may be used as a key to a location database that relates IP addresses to more specific physical locations.

With respect to the latter embodiment, for instance, a computing system implementing the method 440 may, as a part of its fraud prevention services, ask cardholders to voluntarily register any fixed-location computers (e.g., desktop computers) that they expect to use for online purchases, with the registration process including sending (from each such computer) a message specifying the physical location of the computer. In still other embodiments and/or scenarios, the first geographic location is determined by identifying a location specified in the request received at block 442, or in another suitable manner.

It may also be determined, based upon geolocation data indicating one or more geographic locations of the authorized cardholder, that the authorized cardholder was at a second geographic location at the time of the financial transaction (block 448). The geolocation data and/or the source of such data may be similar to that described above in connection with block 408 of the method 400, for example. In some embodiments and/or scenarios, however, the geolocation data may not be time-stamped, or such time stamps may exist but not be utilized. For example, it may be known that the financial transaction is currently in process, and therefore the second geographic location may be the current location of the authorized cardholder.

It may then be determined that the second geographic location does not correspond to the first geographic location (block 450). Block 450 may be similar to block 428 of the method 420, for example. In response to the determination at block 450, the financial transaction may be prevented from being executed (block 452). Block 452 may be similar to block 430 of the method 420, for example.

Referring next to FIG. 10, in an exemplary computer-implemented method 460, it may be determined that a fraud alert exists for a financial transaction (block 462). The fraud alert may be an electronic fraud alert generated by the device or system implementing the method 460, or received from another device or system (e.g., from a card issuer system, such as FAMS 14 of FIG. 1, via a network such as network 26 of FIG. 1), for example. The financial transaction may be an online transaction that is associated with a debit or credit card account, and is purportedly entered into by an authorized cardholder associated with the account.

A computing device at which information associated with the card account (e.g., the card number, expiration date, and/or three- or four-digit security code) was entered in connection with the financial transaction may be identified (block 464). Block 464 may be similar to block 444 of the method 440, for example.

A first geographic location, at which the computing device identified at block 464 resides, may be determined (block 466). In some embodiments and/or scenarios, the first geographic location may be identified based upon an IP address, of the computing device, that may be specified in a particular field of transaction data that is retrieved from an account records database (e.g., database 30 of FIG. 1). In other embodiments and/or scenarios, the first geographic location itself may be specified in such a field.

In some embodiments and/or scenarios, block 466 may occur prior to block 462, in which case block 462 may include comparing the first geographic location to a set of one or more locations known to be typical or expected for the authorized cardholder (e.g., a home address, city and/or state), and/or may include generating the fraud alert in response to determining that the first geographic location does not correspond to (e.g., is not at, or not within a threshold distance of) the set of typical/expected locations.

The time of the financial transaction may also be determined (block 468). In some embodiments and/or scenarios, the time may be identified based upon time information (e.g., a time stamp) included in a particular field of transaction data associated with the financial transaction, such as transaction data that is retrieved from an account records database (e.g., database 30 of FIG. 1).

It may also be determined, based upon geolocation data indicating one or more geographic locations of the authorized cardholder (e.g., over a period of time), that the authorized cardholder was at a second geographic location at the time of the financial transaction (block 470). Block 470 may be similar to block 408 of the method 400, for example.

It may then be determined that the second geographic location corresponds to the first geographic location (block 472). Block 472 may be similar to block 410 of the method 400, for example. In response to the determination at block 472, the fraud alert may be marked as a false positive (block 474), such that no fraud alert is sent to the authorized cardholder in connection with the financial transaction. Block 474 may be similar to block 412 of the method 400, for example.

VI. Exemplary System for Fraud Detection & Classification

Figure 11:
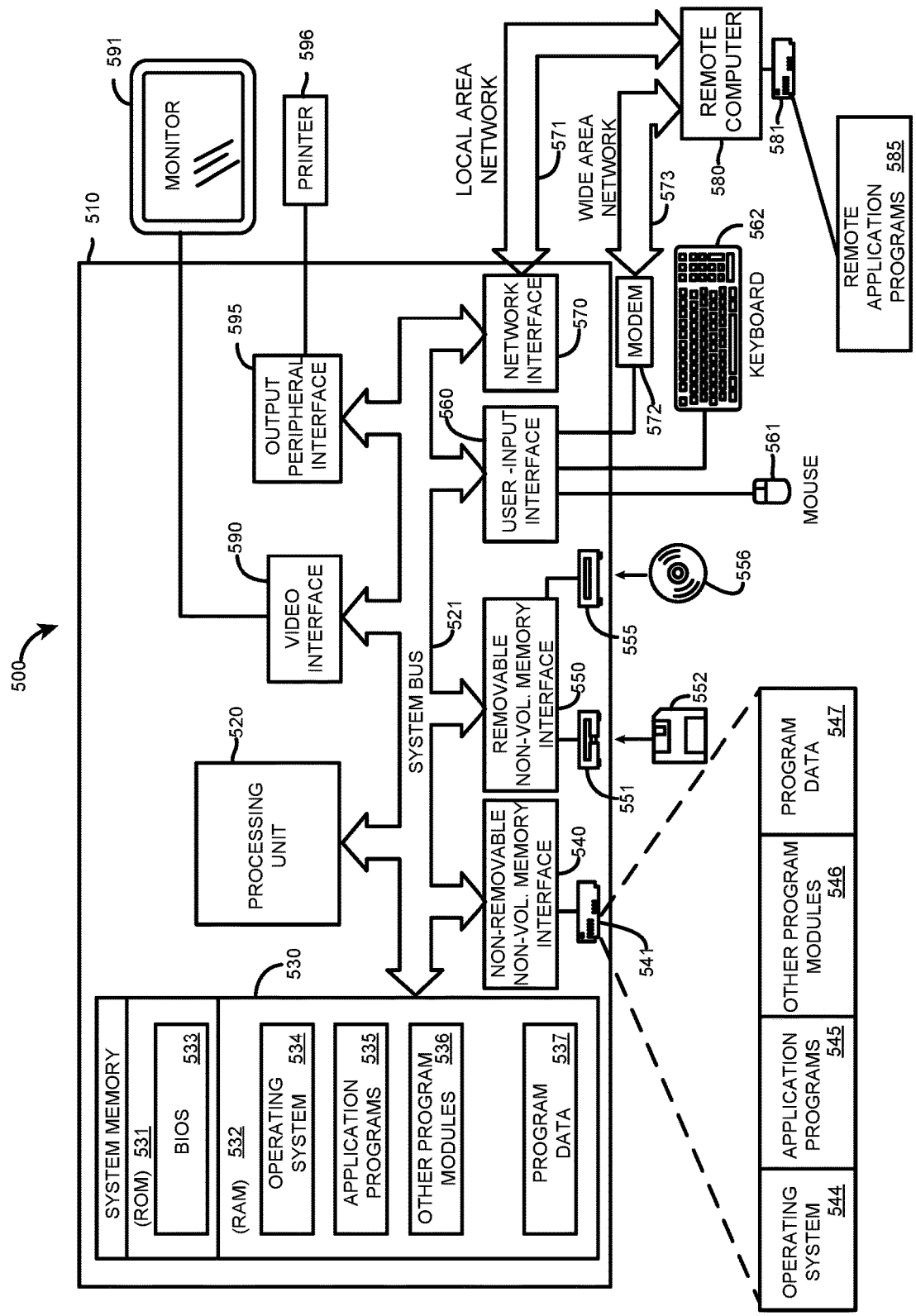
FIG. 11 depicts an exemplary computer system in which the techniques described herein may be implemented, according to one embodiment.

FIG. 11 depicts an exemplary computer system 500 in which the techniques described herein may be implemented, according to one embodiment. The computer system 500 of FIG. 11 may include a computing device in the form of a computer 510. Components of the computer 510 may include, but are not limited to, a processing unit 520, a system memory 530, and a system bus 521 that couples various system components including the system memory 530 to the processing unit 520. The system bus 521 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 may include a variety of computer-readable media. Computer-readable media may be any available media that can be accessed by computer 510 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 530 may include computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to, and/or presently being operated on, by processing unit 520. By way of example, and not limitation, FIG. 11 illustrates operating system 534, application programs 535, other program modules 536, and program data 537.

The computer 510 may also include other removable/non-removable, volatile/nonvolatile computer storage media. By way of example only, FIG. 11 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 may be connected to the system bus 521 through a non-removable memory interface such as interface 540, and magnetic disk drive 551 and optical disk drive 555 may be connected to the system bus 521 by a removable memory interface, such as interface 550.

The drives and their associated computer storage media discussed above and illustrated in FIG. 11 provide storage of computer-readable instructions, data structures, program modules and other data for the computer 510. In FIG. 11, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as cursor control device 561 (e.g., a mouse, trackball, touch pad, etc.) and keyboard 562. A monitor 591 or other type of display device is also connected to the system bus 521 via an interface, such as a video interface 590. In addition to the monitor, computers may also include other peripheral output devices such as printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and may include many or all of the elements described above relative to the computer 510, although only a memory storage device 581 has been illustrated in FIG. 11. The logical connections depicted in FIG. 11 include a local area network (LAN) 571 and a wide area network (WAN) 573, but may also include other networks. Such networking environments are commonplace in hospitals, offices, enterprise-wide computer networks, intranets and the Internet.

When used in a LAN networking environment, the computer 510 is connected to the LAN 571 through a network interface or adapter 570. When used in a WAN networking environment, the computer 510 may include a modem 572 or other means for establishing communications over the WAN 573, such as the Internet. The modem 572, which may be internal or external, may be connected to the system bus 521 via the input interface 560, or other appropriate mechanism. The communications connections 570, 572, which allow the device to communicate with other devices, are an example of communication media, as discussed above. In a networked environment, program modules depicted relative to the computer 510, or portions thereof, may be stored in the remote memory storage device 581. By way of example, and not limitation, FIG. 11 illustrates remote application programs 585 as residing on memory device 581.

The techniques for detecting and/or classifying fraud described above may be implemented in part or in their entirety within a computer system such as the computer system 500 illustrated in FIG. 11. The computer 510 may be included in AFSS 12 of FIG. 1, for example, and/or the remote application programs 585 may include one or more applications of either FAMS 14, one of cardholder computing device 20, one of merchant computing systems 22, or a computing device of other sources 24. Moreover, the functionality of fraud detection/classification unit 36 of FIG. 1 may be implemented by one or more of application programs 535 and/or other program modules 536. As another example, ML rules database 58, account holder behaviors database 60 and/or chargeback rules database 62 of FIG. 1 may be stored in hard disk drive 541 (e.g., as program data 547), magnetic disk 552 and/or optical disk drive 555, and/or the data retrieved by fraud detection/classification unit 36 of FIG. 1 may be stored in hard disk drive 541 (e.g., as program data 547) and/or RAM 532 (e.g., as program data 537).

VII. Exemplary Method Embodiments

In one aspect, a computer-implemented method of using customer data to determine that geolocation-based fraud alerts are false positives may be implemented in one or more servers or other computing devices. The method may include (1) determining, by one or more processors, that an electronic fraud alert is a geolocation-based fraud alert generated based upon an unexpected or abnormal transaction location; (2) in response to determining that the electronic fraud alert is a geolocation-based fraud alert, obtaining, by the one or more processors and via one or more radio frequency links, customer data from two or more sources; (3) determining, by the one or more processors, that the customer data from the two or more sources indicates that a customer is traveling; (4) in response to determining that the customer data indicates that the customer is traveling, determining, by the one or more processors, that a customer location indicated by the customer data corresponds to the transaction location; and/or (5) in response to determining that the customer location corresponds to the transaction location, (i) marking, by the one or more processors, the electronic fraud alert as a false positive and (ii) causing, by the one or more processors, the electronic fraud alert to not be transmitted to a mobile device of the customer in order to reduce an amount of false positives that are transmitted to customers. The method may include additional, fewer or alternative actions, such as any of those discussed elsewhere herein.

For instance, determining that the electronic fraud alert is a geolocation-based fraud alert may include inputting, by the one or more processors, one or both of (i) the electronic fraud alert, and (ii) transaction data corresponding to a financial transaction associated with the electronic fraud alert, into a machine learning program that is trained to identify geolocation-based fraud alerts.

Additionally or alternatively, the method may further include obtaining, by the one or more processors and via a wireless communication channel, transaction data corresponding to a financial transaction associated with the electronic fraud alert, and/or inputting, by the one or more processors, the transaction data into a rules engine to identify the financial transaction as potentially fraudulent and generate the electronic fraud alert.

Additionally or alternatively, the customer data may be collected or generated by one or both of (i) the mobile device and (ii) one or more sensors of the mobile device, and/or may include one or more current or past GPS locations.

Additionally or alternatively, the customer data may be collected or generated by one or both of (i) a vehicle controller or processor and (ii) one or more vehicle-mounted sensors, and/or may include one or more current or past GPS locations.

Additionally or alternatively, the customer data may be collected or generated by one or both of (i) a smart home controller and (ii) one or more home-mounted sensors, and/or may include data indicating one or both of (i) whether a home of the customer is presently occupied or vacant and (ii) how long the home of the customer has been vacant.

Additionally or alternatively, the customer data may include an IP address of a customer computing device, and/or may include one or more current or past GPS locations. Additionally or alternatively, the customer data may include one or more of (i) online data received from a customer computing device, (ii) browsing data received from the customer computing device, or (iii) social media activity data received from the customer computing device. Additionally or alternatively, the customer data may include vehicle telematics data that includes one or more past or current GPS locations.

Additionally or alternatively, the method may include: determining, by the one or more processors, that another electronic fraud alert is a geolocation-based fraud alert generated based upon another unexpected or abnormal transaction location; in response to determining that the other electronic fraud alert is a geolocation-based fraud alert, obtaining, by the one or more processors and via one or more other radio frequency links, additional customer data from two or more other sources; determining, by the one or more processors, that the additional customer data from the two or more other sources indicates that another customer is traveling; in response to determining that the additional customer data indicates that the other customer is traveling, determining, by the one or more processors, that another customer location indicated by the additional customer data does not correspond to the other transaction location; and/or in response to determining that the other customer location does not correspond to the other transaction location, (i) marking, by the one or more processors, the other electronic fraud alert as verified and (ii) causing, by the one or more processors, the electronic fraud alert to be transmitted to a mobile device of the other customer to facilitate sending only confirmed fraud alerts to customers.

Additionally or alternatively, determining that the electronic fraud alert is a geolocation-based fraud alert may include determining that the transaction location is not within a predetermined distance of a customer home address. Additionally or alternatively, determining that the electronic fraud alert is a geolocation-based fraud alert may include determining that the transaction location does not correspond to travel activity or locations associated with the customer.

In another aspect, a computer-implemented method of reducing false positives among geolocation-based fraud alerts issued in connection with card-present financial transactions may be implemented in one or more servers or other computing devices. The method may include: (1) determining, by one or more processors of the one or more servers, that a fraud alert exists for a financial transaction, wherein the financial transaction (i) is associated with a debit or credit card account and (ii) is a card-present transaction purportedly entered into by an authorized cardholder associated with the debit or credit card account; (2) determining, by the one or more processors, a first geographic location at which information associated with the debit or credit card account was obtained by swiping or inserting a debit or credit card in connection with the financial transaction; (3) determining, by the one or more processors, a time of the financial transaction; (4) determining, by the one or more processors and based upon geolocation data indicating one or more geographic locations of the authorized cardholder, that the authorized cardholder was at a second geographic location at the time of the financial transaction; (5) determining, by the one or more processors, that the second geographic location corresponds to the first geographic location; and/or (6) in response to determining that the second geographic location corresponds to the first geographic location, marking, by the one or more processors, the fraud alert as a false positive such that no fraud alert is sent to the authorized cardholder in connection with the financial transaction. The method may include additional, fewer or alternative actions, such as any of those discussed elsewhere herein.

For instance, determining the first geographic location may occur prior to determining that the fraud alert exists, and determining that the fraud alert exists may include comparing the first geographic location to a set of one or more typical locations of the authorized cardholder, and/or generating the fraud alert in response to determining that the first geographic location does not correspond to the set of one or more typical locations.

Additionally or alternatively, the method may further include retrieving, by the one or more processors and from an account records database, transaction data associated with the financial transaction, and/or determining the first geographic location may include identifying the first geographic location based upon location information included in a first field of the transaction data.

Additionally or alternatively, determining the time of the financial transaction may include identifying the time of the financial transaction based upon time information included in a second field of the transaction data. Additionally or alternatively, determining that the authorized cardholder was at the second geographic location at the time of the financial transaction may include receiving the geolocation data from a third party server.

Additionally or alternatively, determining that the authorized cardholder was at the second geographic location at the time of the financial transaction may include receiving the geolocation data from a mobile device of the authorized cardholder, storing the geolocation data in a database, and/or retrieving the geolocation data from the database. Additionally or alternatively, receiving the geolocation data from a mobile device of the authorized cardholder may include receiving GPS location data from the mobile device.

Additionally or alternatively, determining that the second geographic location corresponds to the first geographic location may include determining that the first geographic location and the second geographic location are within a threshold distance of each other. Additionally or alternatively, determining that the second geographic location corresponds to the first geographic location may include determining that the first geographic location and the second geographic location are within a same geographic territory.

In another aspect, a computer-implemented method of preventing fraudulent card-present financial transactions may be implemented in one or more servers. The method may include: (1) receiving, by one or more processors of the one or more servers, a request to authorize a financial transaction, wherein the financial transaction (i) is associated with a debit or credit card account and (ii) is a card-present transaction purportedly being entered into by an authorized cardholder associated with the debit or credit card account; (2) determining, by the one or more processors, a first geographic location at which information associated with the debit or credit card account was obtained by swiping or inserting a debit or credit card in connection with the financial transaction; (3) determining, by the one or more processors and based upon geolocation data indicating one or more geographic locations of the authorized cardholder, that the authorized cardholder was at a second geographic location at a time of the financial transaction; (4) determining, by the one or more processors, that the second geographic location does not correspond to the first geographic location; and/or (5) in response to determining that the second geographic location does not correspond to the first geographic location, preventing, by the one or more processors, the financial transaction from being executed. The method may include additional, fewer or alternative actions, such as any of those discussed elsewhere herein.

For instance, determining a first geographic location may include identifying a first geographic location specified in the request. Additionally or alternatively, determining that the authorized cardholder was at the second geographic location at the time of the financial transaction may include receiving the geolocation data from a third party server.

Additionally or alternatively, determining that the authorized cardholder was at the second geographic location at the time of the financial transaction may include receiving the geolocation data from a mobile device of the authorized cardholder, storing the geolocation data in a database, and/or retrieving the geolocation data from the database. Additionally or alternatively, determining that the second geographic location does not correspond to the first geographic location may include one or both of determining that the first geographic location and the second geographic location are not within a threshold distance of each other, and determining that the first geographic location and the second geographic location are not within a same geographic territory.

Additionally or alternatively, preventing the financial transaction from being executed may include one or both of causing a fraud alert to be sent to a merchant terminal associated with the financial transaction, and causing a fraud alert to be sent to a computing system of a card issuer associated with the debit or credit card account.

In another aspect, a computer-implemented method of preventing fraudulent online financial transactions may be implemented in one or more servers. The method may include: (1) receiving, by one or more processors of the one or more servers, a request to authorize a financial transaction, wherein the financial transaction (i) is associated with a debit or credit card account and (ii) is an online transaction purportedly being entered into by an authorized cardholder associated with the debit or credit card account; (2) identifying, by the one or more processors, a computing device at which information associated with the debit or credit card account was entered in connection with the financial transaction; (3) determining, by the one or more processors, a first geographic location at which the computing device resides; (4) determining, by the one or more processors and based upon geolocation data indicating one or more geographic locations of the authorized cardholder, that the authorized cardholder was at a second geographic location at a time of the financial transaction; (5) determining, by the one or more processors, that the second geographic location does not correspond to the first geographic location; and/or (6) in response to determining that the second geographic location does not correspond to the first geographic location, preventing, by the one or more processors, the financial transaction from being executed. The method may include additional, fewer or alternative actions, such as any of those discussed elsewhere herein.

For instance, receiving the request to authorize the financial transaction may include receiving the request to authorize the financial transaction from a computing system of a merchant associated with the financial transaction. Additionally or alternatively, identifying the computing device at which information associated with the debit or credit card account was entered may include receiving an IP address of the computing device from the computing system of the merchant associated with the financial transaction.

Additionally or alternatively, determining the first geographic location may include determining the first geographic location by using the IP address as a key to a location database. Additionally or alternatively, determining that the authorized cardholder was at the second geographic location at the time of the financial transaction may include receiving the geolocation data from a third party server.

Additionally or alternatively, determining that the authorized cardholder was at the second geographic location at the time of the financial transaction may include receiving the geolocation data from a mobile device of the authorized cardholder, storing the geolocation data in a database, and/or retrieving the geolocation data from the database. Additionally or alternatively, receiving the geolocation data from a mobile device of the authorized cardholder may include receiving GPS location data from the mobile device.

Additionally or alternatively, determining that the second geographic location does not correspond to the first geographic location may include one or both of determining that the first geographic location and the second geographic location are not within a threshold distance of each other, and/or determining that the first geographic location and the second geographic location are not within a same geographic territory.

In another aspect, a computer-implemented method of reducing false positives among geolocation-based fraud alerts issued in connection with online financial transactions may be implemented in one or more servers. The method may include: (1) determining, by one or more processors of the one or more servers, that a fraud alert exists for a financial transaction, wherein the financial transaction (i) is associated with a debit or credit card account and (ii) is an online transaction purportedly entered into by an authorized cardholder associated with the debit or credit card account; (2) identifying, by the one or more processors, a computing device at which information associated with the debit or credit card account was entered in connection with the financial transaction; (3) determining, by the one or more processors, a first geographic location at which the computing device resides; (4) determining, by the one or more processors, a time of the financial transaction; (5) determining, by the one or more processors and based upon geolocation data indicating one or more geographic locations of the authorized cardholder, that the authorized cardholder was at a second geographic location at the time of the financial transaction; (6) determining, by the one or more processors, that the second geographic location corresponds to the first geographic location; and/or (7) in response to determining that the second geographic location corresponds to the first geographic location, marking, by the one or more processors, the fraud alert as a false positive such that no fraud alert is sent to the authorized cardholder in connection with the financial transaction. The method may include additional, fewer or alternative actions, such as any of those discussed elsewhere herein.

For instance, determining the first geographic location may occur prior to determining that the fraud alert exists, and determining that the fraud alert exists may include comparing the first geographic location to a set of one or more typical locations of the authorized cardholder, and/or generating the fraud alert in response to determining that the first geographic location does not correspond to the set of one or more typical locations.

Additionally or alternatively, the method may further include retrieving, by the one or more processors and from an account records database, transaction data associated with the financial transaction, determining the first geographic location may include identifying the first geographic location based upon location information included in a first field of the transaction data, and/or determining the time of the financial transaction may include identifying the time of the financial transaction based upon time information included in a second field of the transaction data.

Additionally or alternatively, determining that the authorized cardholder was at the second geographic location at the time of the financial transaction may include receiving the geolocation data from a third party server. Additionally or alternatively, determining that the authorized cardholder was at the second geographic location at the time of the financial transaction may include receiving GPS location data from a mobile device of the authorized cardholder, storing the GPS location data in a database, and/or retrieving the GPS location data from the database.

Additionally or alternatively, determining that the second geographic location corresponds to the first geographic location may include determining that the first geographic location and the second geographic location are within a threshold distance of each other. Additionally or alternatively, determining that the second geographic location corresponds to the first geographic location may include determining that the first geographic location and the second geographic location are within a same geographic territory.

VIII. Exemplary System Embodiments

In one aspect, a computer system configured to use customer data to determine that geolocation-based fraud alerts are false positives may include one or more processors and a memory. The memory may store instructions that, when executed by the one or more processors, cause the computer system to: (1) determine that an electronic fraud alert is a geolocation-based fraud alert generated based upon an unexpected or abnormal transaction location; (2) in response to determining that the electronic fraud alert is a geolocation-based fraud alert, obtain, via one or more radio frequency links, customer data from two or more sources; (3) determine that the customer data from the two or more sources indicates that a customer is traveling; (4) in response to determining that the customer data indicates that the customer is traveling, determine that a customer location indicated by the customer data corresponds to the transaction location; and/or (5) in response to determining that the customer location corresponds to the transaction location, (i) mark the electronic fraud alert as a false positive and (ii) cause the electronic fraud alert to not be transmitted to a mobile device of the customer in order to reduce an amount of false positives that are transmitted to customers. The system may include additional, fewer or alternative components, configurations and/or functionality, such as any of those discussed elsewhere herein.

For instance, the instructions may cause the computing system to determine that the electronic fraud alert is a geolocation-based fraud alert at least by inputting one or both of (i) the electronic fraud alert, and (ii) transaction data corresponding to a financial transaction associated with the electronic fraud alert, into a machine learning program that is trained to identify geolocation-based fraud alerts.

Additionally or alternatively, the instructions may further cause the computing system to obtain, via a wireless communication channel, transaction data corresponding to a financial transaction associated with the electronic fraud alert, and/or input the transaction data into a rules engine to identify the financial transaction as potentially fraudulent and generate the electronic fraud alert. Additionally or alternatively, the customer data may include vehicle telematics data that includes one or more past or current GPS locations.

In another aspect, a computer system for reducing false positives among geolocation-based fraud alerts issued in connection with card-present financial transactions may include a location database configured to store geolocation data indicating geographic locations of authorized cardholders over time, one or more processors, and a non-transitory memory. The memory may store instructions that, when executed by the one or more processors, cause the one or more processors to: (1) determine that a fraud alert exists for a financial transaction, wherein the financial transaction (i) is associated with a debit or credit card account and (ii) is a card-present transaction purportedly entered into by an authorized cardholder associated with the debit or credit card account; (2) determine a first geographic location at which information associated with the debit or credit card account was obtained by swiping or inserting a debit or credit card in connection with the financial transaction; (3) determine a time of the financial transaction; (4) determine, based upon first geolocation data stored in the location database and indicating one or more geographic locations of the authorized cardholder, that the authorized cardholder was at a second geographic location at the time of the financial transaction; (5) determine that the second geographic location corresponds to the first geographic location; and/or (6) in response to determining that the second geographic location corresponds to the first geographic location, mark the fraud alert as a false positive such that no fraud alert is sent to the authorized cardholder in connection with the financial transaction. The system may include additional, fewer or alternative components, configurations and/or functionality, such as any of those discussed elsewhere herein.

For instance, the instructions may further cause the one or more processors to retrieve, from an account records database, transaction data associated with the financial transaction, the instructions may cause the one or more processors to determine the first geographic location at least by identifying the first geographic location based upon location information included in a first field of the transaction data, and/or the instructions may cause the one or more processors to determine the time of the financial transaction at least by identifying the time of the financial transaction based upon time information included in a second field of the transaction data.

Additionally or alternatively, the instructions may cause the one or more processors to determine that the authorized cardholder was at the second geographic location at the time of the financial transaction at least by receiving the first geolocation data from a mobile device of the authorized cardholder, storing the first geolocation data in the location database, and/or retrieving the first geolocation data from the location database. Additionally or alternatively, receiving the first geolocation data may include GPS location data.

Additionally or alternatively, the instructions may cause the one or more processors to determine that the second geographic location corresponds to the first geographic location by at least one of determining that the first geographic location and the second geographic location are within a threshold distance of each other, or determining that the first geographic location and the second geographic location are within a same geographic territory.

In another aspect, a computer system for preventing fraudulent online financial transactions may include a location database configured to store geolocation data indicating geographic locations of authorized cardholders over time, one or more processors, and a non-transitory memory. The memory stores instructions that, when executed by the one or more processors, may cause the one or more processors to: (1) receive a request to authorize a financial transaction, wherein the financial transaction (i) is associated with a debit or credit card account and (ii) is an online transaction purportedly being entered into by an authorized cardholder associated with the debit or credit card account; (2) identify a computing device at which information associated with the debit or credit card account was entered in connection with the financial transaction; (3) determine a first geographic location at which the computing device resides; (4) determine, based upon geolocation data indicating one or more geographic locations of the authorized cardholder, that the authorized cardholder was at a second geographic location at a time of the financial transaction; (5) determine that the second geographic location does not correspond to the first geographic location; and/or (6) in response to determining that the second geographic location does not correspond to the first geographic location, prevent the financial transaction from being executed. The system may include additional, fewer or alternative components, configurations and/or functionality, such as any of those discussed elsewhere herein.

For instance, the instructions may cause the one or more processors to receive the request to authorize the financial transaction from a computing system of a merchant associated with the financial transaction. Additionally or alternatively, the instructions may cause the one or more processors to identify the computing device at which information associated with the debit or credit card account was entered at least by receiving an IP address of the computing device from the computing system of the merchant associated with the financial transaction.

Additionally or alternatively, the instructions may cause the one or more processors to determine the first geographic location at least by determining the first geographic location by using the IP address as a key to a location database. Additionally or alternatively, the instructions may cause the one or more processors to determine that the authorized cardholder was at the second geographic location at the time of the financial transaction at least by receiving the geolocation data from either (i) a third party server; or (ii) a mobile device of the authorized cardholder.

Additionally or alternatively, the instructions may cause the one or more processors to determine that the second geographic location does not correspond to the first geographic location at least by one or both of determining that the first geographic location and the second geographic location are not within a threshold distance of each other, and determining that the first geographic location and the second geographic location are not within a same geographic territory.

IX. Exemplary Computer-Readable Medium Embodiments

In one aspect, a non-transitory, computer-readable medium stores instructions that, when executed by one or more processors, may cause the one or more processors to: (1) determine that an electronic fraud alert is a geolocation-based fraud alert generated based upon an unexpected or abnormal transaction location; (2) in response to determining that the electronic fraud alert is a geolocation-based fraud alert, obtain, via one or more radio frequency links, customer data from two or more sources; (3) determine that the customer data from the two or more sources indicates that a customer is traveling; (4) in response to determining that the customer data indicates that the customer is traveling, determine that a customer location indicated by the customer data corresponds to the transaction location; and/or (5) in response to determining that the customer location corresponds to the transaction location, (i) mark the electronic fraud alert as a false positive and (ii) cause the electronic fraud alert to not be transmitted to a mobile device of the customer in order to reduce an amount of false positives that are transmitted to customers. The non-transitory, computer-readable medium may store instructions that include additional, fewer or alternative functions, such as any of those discussed elsewhere herein.

For instance, the instructions may cause the computing system to determine that the electronic fraud alert is a geolocation-based fraud alert at least by inputting one or both of (i) the electronic fraud alert, and (ii) transaction data corresponding to a financial transaction associated with the electronic fraud alert, into a machine learning program that is trained to identify geolocation-based fraud alerts.

Additionally or alternatively, the instructions may further cause the computing system to obtain, via a wireless communication channel, transaction data corresponding to a financial transaction associated with the electronic fraud alert, and/or input the transaction data into a rules engine to identify the financial transaction as potentially fraudulent and generate the electronic fraud alert. Additionally or alternatively, the customer data may include vehicle telematics data that includes one or more past or current GPS locations.

X. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

What is claimed is:

1. A computer system configured to use customer data to determine that geolocation-based fraud alerts are false positives, the computer system comprising:
    one or more processors; and
    a memory storing instructions that, when executed by the one or more processors, cause the computer system to perform acts comprising:
        receiving transaction data associated with a transaction, wherein the transaction data includes a transaction time and a transaction location, and wherein the transaction is associated with a customer;
        determining a location-based electronic fraud alert associated with the transaction, based upon the transaction location;
        in response to determining the location-based electronic fraud alert, retrieving customer data relating to the customer from a plurality of data sources, including receiving one or more current or past GPS locations of a vehicle controller associated with the customer or of a processor associated with a vehicle of the customer;
        determining, based on the customer data, a travel location associated with the customer at a time corresponding to the transaction time;
        in response to determining that the travel location corresponds to the transaction location, determining that the location-based electronic fraud alert is a false positive; and
        refraining from transmitting the location-based electronic fraud alert to the customer, based at least in part on determining that the location-based electronic fraud alert is a false positive.

2. The computer system of claim 1, wherein determining the travel location associated with the customer comprises:
    determining, based on first data from a smart home controller associated with the customer, a first location of the customer at a first time;
    determining, based on second data from a GPS device associated with the customer, a second location of the customer at a second time; and
    determining the travel location associated with the customer at the time corresponding to the transaction time, based at least in part on the first data and the second data.

3. The computer system of claim 1, wherein retrieving the customer data comprises:
    retrieving, from a first location data source, a first location of the customer at a first time; and
    retrieving, from a second location data source, a second location of the customer at a second time,
    wherein determining the travel location associated with the customer is based at least in part on the first location and the second location.

4. The computer system of claim 3, wherein determining the travel location associated with the customer comprises matching the transaction time to a nearest time of the first time and the second time.

5. The computer system of claim 1, the acts further comprising:
    inputting at least a portion of the transaction data corresponding to the transaction into a machine learning program that is trained to identify location location-based fraud alerts; and
    receiving, from the machine learning program, an indication of the location-based electronic fraud alert.

6. The computer system of claim 1, wherein retrieving the customer data further comprises:
    receiving additional customer data from at least one of a smart home controller or a home-mounted sensor associated with the customer, the acts further comprising:
    determining, based at least in part on the additional customer data, at least one of whether a home of the customer is presently occupied or vacant or how long the home of the customer has been vacant.

7. The computer system of claim 1, wherein retrieving the customer data further comprises:
    receiving an IP address associated with a computing device used to complete the transaction.

8. The computer system of claim 1, wherein retrieving the customer data further comprises one or more of:
    receiving online data received from a customer computing device,
    receiving browsing data received from the customer computing device, or
    receiving social media activity data associated with the customer.

9. The computer system of claim 1, wherein retrieving the customer data comprises:
    receiving vehicle telematics data that includes the one or more current or past GPS locations.

10. The computer system of claim 1, wherein retrieving the customer data comprises:
    receiving travel data comprising at least one of a planned travel destination or normal travel activity associated with customer.

11. A computer-implemented method comprising:
    receiving, by one or more processors, transaction data associated with a transaction, wherein the transaction data includes a transaction time and a transaction location, and wherein the transaction is associated with a customer;
    determining, by the one or more processors, a location-based electronic fraud alert associated with the transaction, based upon the transaction location;
    in response to determining the location-based electronic fraud alert, retrieving customer data relating to the customer from a plurality of data sources, including receiving one or more current or past GPS locations of a vehicle controller associated with the customer or of a processor associated with a vehicle of the customer;

determining, by the one or more processors and based on the customer data, a travel location associated with the customer at a time corresponding to the transaction time;

in response to determining that the travel location corresponds to the transaction location, determining, by the one or more processors, that the location-based electronics fraud alert is a false positive; and refraining from transmitting the location-based electronic fraud alert to the customer, based at least in part on determining that the location-based electronic fraud alert is a false positive.

12. The computer-implemented method of claim 11, further comprising:

inputting at least a portion of the transaction data corresponding to the transaction into a machine learning program that is trained to identify location location-based fraud alerts; and receiving, from the machine learning program, an indication of the location-based electronic fraud alert.

13. The computer-implemented method of claim 11, further comprising:

obtaining the transaction data with the transaction;

inputting the transaction data into a rules engine;

receiving, from the rules engine, an indication that the transaction is potentially fraudulent; and generating, based at least in part on the indication, the location-based electronic fraud alert.

14. The computer-implemented method of claim 11, wherein retrieving the customer data further comprises:

receiving additional customer data from at least one of a smart home controller or a home-mounted sensor associated with the customer, the method further comprising:

determining, based at least in part on the additional customer data, at least one of whether a home of the customer is presently occupied or vacant and how long the home of the customer has been vacant.

15. A non-transitory, computer-readable medium storing instructions that, when executed by one or more processors, cause the one or more processors to perform acts comprising:

receiving transaction data associated with a transaction, wherein the transaction data includes a transaction time and a transaction location, and wherein the transaction is associated with a customer;

determining a location-based electronic fraud alert associated with the transaction, based upon the transaction location;

in response to determining the location-based electronic fraud alert, retrieving customer data relating to the customer from a plurality of data sources, including receiving one or more current or past GPS locations of a vehicle controller associated with the customer or of a processor associated with a vehicle of the customer;

determining, based on the customer data, a travel location associated with the customer at a time corresponding to the transaction time;

in response to determining that the travel location corresponds to the transaction location, determining that the location-based electronic fraud alert is a false positive; and refraining from transmitting the location-based electronic fraud alert to the customer, based at least in part on determining that the location-based electronic fraud alert is a false positive.

16. The non-transitory, computer-readable medium of claim 15, the acts further comprising:

inputting at least a portion of the transaction data corresponding to the transaction into a machine learning program that is trained to identify location location-based fraud alerts; and receiving, from the machine learning program, an indication of the location-based electronic fraud alert.

17. The non-transitory, computer-readable medium of claim 15, the acts further comprising:

obtaining transaction data associated with the transaction;

inputting the transaction data into a rules engine;

receiving, from the rules engine, an indication that the transaction is potentially fraudulent; and generating, based at least in part on the indication, the location-based electronic fraud alert.

18. The non-transitory, computer-readable medium of claim 15, wherein retrieving the customer data further comprises:

receiving one or more additional current or past GPS locations of a mobile device associated with the customer.

19. The non-transitory, computer-readable medium of claim 15, wherein:

retrieving the customer data further comprises receiving additional customer data from at least one of a smart home controller or a home-mounted sensor associated with the customer; and the acts further comprise:

determining, based at least in part on the additional customer data, at least one of whether a home of the customer is presently occupied or vacant or how long the home of the customer has been vacant.

\* \* \* \* \*